(12) United States Patent
Matsuo et al.

(10) Patent No.: US 8,439,508 B2
(45) Date of Patent: May 14, 2013

(54) PROJECTOR AND PROJECTOR SYSTEM

(75) Inventors: Shuji Matsuo, Shiojiri (JP); Takeshi Ishikawa, Azumino (JP); Hirofumi Kasuga, Matsumoto (JP); Hiroshi Midorikawa, Shiojiri (JP); Masahiko Nunokawa, Chikuma-gun (JP)

(73) Assignee: Seiko Epson Corporation, Tokyo (JP)

( * ) Notice: Subject to any disclaimer, the term of this patent is extended or adjusted under 35 U.S.C. 154(b) by 243 days.

(21) Appl. No.: 12/623,019

(22) Filed: Nov. 20, 2009

(65) Prior Publication Data

US 2010/0128228 A1    May 27, 2010

(30) Foreign Application Priority Data

| Nov. 26, 2008 | (JP) | 2008-300435 |
| Dec. 1, 2008 | (JP) | 2008-306290 |
| Dec. 4, 2008 | (JP) | 2008-309777 |
| Dec. 10, 2008 | (JP) | 2008-314174 |
| Dec. 16, 2008 | (JP) | 2008-319164 |
| Sep. 3, 2009 | (JP) | 2009-203400 |

(51) Int. Cl.
*G03B 21/14* (2006.01)

(52) U.S. Cl.
USPC ............ 353/119; 353/72; 353/94; 353/99; 353/82; 353/122; 349/7; 345/1.3

(58) Field of Classification Search ............ 353/30, 353/34, 37, 69, 70, 72, 82, 83, 94, 98, 99, 353/102, 119, 122; 348/745, 750, E9.025, 348/E9.027; 345/1.3, 629, 589, 631; 349/5, 349/7–9
See application file for complete search history.

(56) References Cited

U.S. PATENT DOCUMENTS

| 5,153,621 A * | 10/1992 | Vogeley ............... 353/30 |
| 6,337,724 B1 * | 1/2002 | Itoh et al. ............ 349/75 |
| 6,456,339 B1 * | 9/2002 | Surati et al. ........... 348/745 |
| 6,733,138 B2 * | 5/2004 | Raskar ................ 353/94 |
| 7,724,205 B2 * | 5/2010 | Inazumi .............. 345/1.3 |
| 7,724,206 B2 * | 5/2010 | Saito ................ 345/1.3 |
| 7,907,790 B2 * | 3/2011 | Inazumi ............. 382/274 |
| 2002/0154069 A1 | 10/2002 | Nishio |
| 2005/0280784 A1 * | 12/2005 | Katase et al. ........ 353/94 |
| 2007/0058140 A1 * | 3/2007 | Kobayashi et al. ..... 353/94 |
| 2007/0171375 A1 * | 7/2007 | Mizuuchi et al. ...... 353/30 |
| 2007/0211225 A1 * | 9/2007 | Kondo et al. ......... 353/94 |
| 2008/0212038 A1 * | 9/2008 | Hirata et al. ......... 353/70 |
| 2008/0259223 A1 * | 10/2008 | Read et al. .......... 348/745 |

FOREIGN PATENT DOCUMENTS

| JP | A-05-142655 | 6/1993 |
| JP | A-05-316454 | 11/1993 |
| JP | A-08-154222 | 6/1996 |
| JP | A-09-162562 | 6/1997 |
| JP | A-09-279967 | 10/1997 |
| JP | A-2001-111917 | 4/2001 |
| JP | A-2002-311501 | 10/2002 |
| JP | A-2004-198602 | 7/2004 |
| JP | A-2005-229282 | 8/2005 |
| JP | A-2006-235156 | 9/2006 |
| JP | A-2008-225212 | 9/2008 |

* cited by examiner

*Primary Examiner* — Georgia Y Epps
*Assistant Examiner* — Sultan Chowdhury
(74) *Attorney, Agent, or Firm* — Oliff & Berridge, PLC

(57) ABSTRACT

A projector that projects an image on a screen, includes: plural image generating units that generate an image lights representing the image; a main body housing that houses the plural image generating units; and plural projection optical units that are provided in the main body housing to respectively correspond to the plural image generating units and project the image lights generated by the image generating units on the screen.

17 Claims, 37 Drawing Sheets

PROJECTOR AND PROJECTOR SYSTEM

BACKGROUND

1. Technical Field

The present invention relates to a projector (a projecting apparatus) that projects images on a screen.

2. Related Art

In the past, various techniques concerning projectors are proposed.

For example, JP-A-5-142655 and JP-A-2002-311501 disclose the technique for setting plural projectors and joining, on a screen, images respectively projected from the projectors to thereby project a relatively large image on the screen.

JP-A-2004-198602 discloses the stationary screen and the movable stand-alone screen as screens used for projection of images.

JP-A-9-162562, JP-A-2001-111917, and JP-A-2006-235156 disclose the stand having the structure in which plural wheels are provided on the bottom surface of a box, on which a projector is installed, in order to make it easy to set and carry the projector.

However, the techniques in the past have various problems in setting projectors.

For example, in the techniques in the past, since alignment work for images respectively projected from the plural projectors takes labor and time, it is difficult to carry a projection system set including the plural projectors and use the projection system in other places. Therefore, it is necessary to respectively set projection system sets in places where projection of images is required, leading to an increase in cost.

When the stationary screen is used, places where images and images can be clearly projected by using the screen are limited. When the stand-alone screen is used, a user is forced to perform extremely troublesome work because the user has to carry and set the screen in addition to a projector and adjust a positional relation between the projector and the screen to a suitable state.

With the stand in the past, the projector can be smoothly carried on a flat floor surface. However, because of the structure in which the plural wheels are provided on the bottom surface of the box, it is difficult to smoothly carry the projector on steps and stairs. Therefore, in places where projection of images is required, it is necessary to prepare and maintain a projector set including the stand in each of plural sections divided by steps and stairs (e.g., in each of floors of buildings), leading to an increase in cost.

SUMMARY

An advantage of some aspects of the invention is to provide a technique for making it possible to easily set a projector.

The invention can be realized as forms or application examples explained below.

Application Example A1

A projector according to Application Example A1 is a projector that projects an image on a screen, including: plural imaging optical units that generate projection lights representing the image; a main body housing that houses the plural imaging optical units; and plural projecting units that are provided in the main body housing to respectively correspond to the plural imaging optical units and project the projection lights generated by the imaging optical units on the screen. With the projector according to Application Example A1, since the plural imaging optical units and the plural projecting units are positioned in the main body housing, it is possible to reduce a load for aligning plural images respectively projected from the plural projecting units.

Application Example A2

It is preferable that, in the projector according to Application Example A1, each of the plural imaging optical units generates projection light representing a partial image corresponding to a part of a display area in an image projected on the screen, and each of the plural projecting units projects the projection light generated by the imaging optical unit on the display area corresponding to the partial image on the screen. With the projector according to Application Example A2, it is possible to realize an increase in the size of an image projected on the screen while reducing a load for aligning plural images respectively projected from the plural projecting units.

Application Example A3

It is preferable that, in the projector according to Application Example A1 or A2, the main body housing has plural planes that form an outer surface, and the plural projecting units are provided on the same plane in the main body housing. With the projector according to Application Example A3, it is possible to reduce a load for aligning plural images respectively projected from the plural projecting units compared with a load applied when the plural projecting units are provided over the plural planes.

Application Example A4

It is preferable that, in the projector according to any one of Application Examples A1 to A3, the plural imaging optical units and the plural projecting units line up substantially in a straight line. With the projector according to Application Example A4, it is possible to efficiently house the plural imaging optical units and the plural projecting units in the inside of the main body housing.

Application Example A5

It is preferable that, in the projector according to any one of Application Examples A1 to A4, an optical axis of projection light projected from the projecting unit located at an end of the line of the plural projecting units inclines in a direction opposite to a direction in which the other projecting units adjacent to the projecting unit are located. With the projector according to Application Example A5, it is possible to project projection light in a wider range and realize an increase in the size of an image projected on the screen.

Application Example A6

It is preferable that the projector according to any one of Application Examples A1 to A5 further includes: a light source that radiates light; and a light distributing unit that distributes the light radiated from the light source to the respective plural imaging optical units. With the projector according to Application Example A6, it is possible to prevent lights supplied to the respective plural imaging optical units from becoming non-uniform because of an individual difference of the light source. This makes it possible to suppress color unevenness and luminance unevenness among plural images projected from the respective plural projecting units.

Concerning Application Examples A1 to A6, a form of the invention is not limited to the projector. The invention can also be applied to other forms such as a system including the projector and a projection method for projecting an image on the screen. The invention is not limited to the forms explained above. It goes without saying that the invention can be carried out in various forms without departing from the spirit of the invention.

Application Example B1

A projector according to Application Example B1 is a projector that projects an image on a screen, including: plural imaging optical units that generate projection lights representing the image; a main body housing that houses the plural imaging optical units; plural projecting units that are provided in the main body housing to respectively correspond to the plural imaging optical units and project the projection lights generated by the imaging optical units on the screen; and an extending and retracting unit that extends and retracts the main body housing in a direction in which the plural projecting units are connected. With the projector according to Application Example B1, it is possible to increase and decrease spaces among the plural projecting units with the extending and retracting unit of the main body housing after aligning the plural projecting units in the main body housing. As a result, it is possible to realize an increase in the size of an image projected on the screen while reducing a load for aligning plural images respectively projected from the plural projecting units.

Application Example B2

It is preferable that, in the projector according to Application Example E1, the extending and retracting unit includes a holding unit that holds a state in which the main body housing is extended or retracted. With the projector according to Application Example B2, since the plural projecting units are held in a state in which spaces among the plural projecting units are increased or decreased, it is possible to further reduce a load for aligning plural images respectively projected from the plural projecting units.

Application Example B3

It is preferable that the projector according to Application Example B1 or B2 further includes: an extension and retraction detecting unit that detects an extension/retraction distance of the extended or retracted main body housing; and an image adjusting unit that adjusts, according to the extension/retraction distance detected by the extension and retraction detecting unit, an image projected on the screen. With the projector according to Application Example B3, since an image projected on the screen is adjusted according to spaces among the plural projecting units, it is possible to further reduce a load for aligning plural images respectively projected from the plural projecting units.

Application Example B4

It is preferable that, in the projector according to Application Example B3, the image adjusting unit includes an expansion and reduction adjusting unit that expands and reduces, according to the extension/retraction distance detected by the extension and retraction detecting unit, an image projected on the screen. With the projector according to Application Example B4, it is possible to expand and reduce, according to spaces among the plural projecting units, an image projected on the screen.

Application Example B5

It is preferable that, in the projector according to Application Example B3 or B4, the image adjusting unit includes an optical-axis adjusting unit that moves, according to the extension/retraction distance detected by the extension and retraction detecting unit, optical axes of projection lights projected from the plural projecting units. With the projector according to Application Example B5, it is possible to move, according to spaces among the plural projecting units, optical axes of projection lights projected from the plural projecting units.

Application Example B6

It is preferable that, in the projector according to any one of Application Examples B3 to B5, the image adjusting unit includes a focus adjusting unit that moves, according to the extension/retraction distance detected by the extension and retraction detecting unit, focuses of projection lights projected from the plural projecting units. With the projector according to Application Example B6, it is possible to move, according to spaces among the plural projecting units, focuses of projection lights projected from the plural projecting units.

Application Example B7

It is preferable that, in the projector according to any one of Application Examples B3 to B6, the image adjusting unit includes a keystone-distortion adjusting unit that corrects, according to the extension/retraction distance detected by the extension and retraction detecting unit, a keystone distortion of an image projected on the screen. With the projector according to Application Example B7, it is possible to correct, according to spaces among the plural projecting units, a keystone distortion of an image projected on the screen.

Application Example B8

It is preferable that, in the projector according to any one of Application Examples B1 to B7, each of the plural imaging optical units generates projection light representing a partial image corresponding to a part of a display area in an image projected on the screen, and each of the plural projecting units projects the projection light generated by the imaging optical unit on the display area corresponding to the partial image on the screen. With the projector according to Application Example B8, it is possible to realize an increase in the size of an image projected on the screen while reducing a load for aligning plural images respectively projected from the plural projecting units.

Concerning Application Examples B1 to B8, a form of the invention is not limited to the projector. The invention can also be applied to other forms such as a system including the projector and a projection method for projecting an image on the screen. The invention is not limited to the forms explained above. It goes without saying that the invention can be carried out in various forms without departing from the spirit of the invention.

Application Example C1

An image projection system according to Application Example C1 includes: a sheet-like screen that can be wound and unwound; a screen winding unit that performs winding and unwinding of the sheet-like screen; a main body housing that can house the wound sheet-like screen; and a projector that projects an image on the unwound sheet-like screen housed in the main body housing.

With the image projection system according to Application Example C1, since the projector can be housed in the main body housing and the sheet-like screen is wound and housed in the inside of the main body housing, a user can easily carry the projector and the screen. Since a positional relation between the screen and the projector does is not substantially different depending on a setting place, the user can easily perform adjustment for projection.

Application Example C2

It is preferable that the image projection system according to Application Example C1 includes a plurality of the projectors, the sheet-like screen is unwound to thereby form a projection area on which the image is projected, the projection area has opposed two sides, length of which is not changed by winding and unwinding of the sheet-like screen, and the plural projectors are arranged on the two sides.

This makes it possible to dividedly project an image with the plural projectors and simultaneously project different images.

Application Example C3

It is preferable that the image projection system according to Application Example C1 or C2 further includes an oscillating element for sound output, and the sheet-like screen functions as a speaker employing the oscillating element.

Consequently, since the sheet-like screen functions as the speaker, it is possible to easily construct an environment for sound reproduction compared with a configuration in which a speaker device is prepared separately from the projector and the sheet-like screen. Since the sheet-like screen is caused to function as the speaker, it is possible to secure a large acoustic area and perform large-volume sound output.

Application Example C4

It is preferable that, in the image projection system according to Application Example C3, the oscillating element is arranged in the inside of the sheet-like screen.

This makes it possible to easily wind the sheet-like screen compared with a configuration in which the oscillating element is arranged on a front surface or a rear surface of the sheet-like screen.

Application Example C5

It is preferable that, in the image projection system according to any one of Application Examples C1 to C4, the projector includes plural projection mechanisms that emit image lights representing an image, and each of the projection mechanisms emits image light of a partial image corresponding to a part of an image projected on the screen.

Consequently, even when a projection distance (an optical distance) between the sheet-like screen and each of the projection mechanisms is small, it is possible to show an image in a large size by combining partial images.

Application Example C6

It is preferable that, in the image projection system according to Application Example C5, the main body housing has plural planes forming an outer surface, and each of the projection mechanisms emits the image light of the partial image from the same plane in the main body housing.

This makes it possible to reduce a load for aligning plural images projected by the projection mechanisms compared with a configuration in which image lights are emitted from the plural planes.

Application Example C7

It is preferable that, in the image projection system according to Application Example C5 or C6, the plural projection mechanisms are arranged to line up in a straight line in the main body housing.

This makes it possible to efficiently house the projection mechanisms in the inside of the main body housing. Since large spaces can be secured among image lights emitted from the projection mechanisms, it is possible to project an image in a large size even if a projection distance (an optical distance) between the main body housing and the sheet-like screen is small.

Application Example D1

A stand according to Application Example D1 is a stand on which a projector is set, including: a pedestal on which the projector is installed; first and second support legs that are foldably connected to the pedestal and rise from a floor surface to support the pedestal in cooperation with each other; a handle that is provided in the first support leg, comes into contact with the floor surface in a state in which the first support leg supports the pedestal, and projects from the pedestal in a state in which the first support leg is folded to the pedestal; and a wheel that is provided in the second support leg, comes into contact with the floor surface in a state in which the second support leg supports the pedestal, and projects from the pedestal in a state in which the second support leg is folded to the pedestal. With the stand according to Application Example D1, it is possible to easily carry a projector set including the stand by folding the first and second support legs to the pedestal, bringing the wheel provided in the second support leg into contact with the ground, and gripping the handle provided in the first support leg to tug the projector set.

Application Example D2

It is preferable that, in the stand according to Application Example D1, the first and second support legs are foldable generally along a longitudinal direction of the pedestal, the handle projects from one end in the longitudinal direction of the pedestal, and the wheel projects from an end on the opposite side of the one end in the longitudinal direction of the pedestal. With the stand according to Application Example D2, when first and second support legs are drawn out from the pedestal to set the projector, it is possible to secure sufficient height from the floor surface to the projector. When the first and second support legs are folded to the pedestal to carry the projector, it is possible to secure sufficient length from the wheel to the handle.

Application Example D3

It is preferable that the stand according to Application Example D1 or D2 further includes: a first connecting unit that connects the pedestal and the first support leg; and a second connecting unit that connects the pedestal and the second support leg, and the first support leg is foldable toward the second connecting unit, and the second support leg is foldable toward the first connecting unit. With the stand according to Application Example D3, when the first and second connecting units are folded to the pedestal to carry the projector, it is possible to reduce a load applied to the first and second connecting units.

Application Example D4

It is preferable that, in the stand according to any one of Application Examples D1 to D3, the handle has a bar-like section connected to the wheel and substantially parallel to the wheel. With the stand according to Application Example D4, when the first and second connecting units are drawn out from the pedestal to carry the projector, it is possible to bring the bar-like section into contact with the floor surface to halt the rotation of the wheel. When the first and second connecting units are folded to the pedestal to carry the projector, it is possible to grip the bar-like section to easily tug the projector.

Application Example D5

It is preferable that the stand according to any one of Application Examples D1 to D4 further includes a position fixing unit that fixes, in multiple stages, positions where the handle and the wheel are set farther away from the pedestal stepwise. With the stand according to Application Example D5, it is possible to adjust, in multiple stages, height at which the projector is set.

Application Example D6

It is preferable that the stand according to any one of Application Examples D1 to D5 further includes a height adjusting unit that adjusts height at which the projector is installed on the pedestal. With the stand according to Application Example D6, it is possible to adjust height at which the projector is set while keeping the first and second support legs fixed.

Application Example D7

It is preferable that, in the stand according to any one of Application Examples D1 to D6, the handle comes into contact with the floor surface via a non-slip member having a coefficient of friction higher than that of the first support leg. With the stand according to Application Example D7, it is possible to prevent the stand from shifting from the floor surface.

Application Example D8

A projector system according to Application Example D8 includes a projector attached to the stand according to any one of Application Examples D1 to D7. With the projector system according to Application Example D8, it is possible to easily carry a projector set including the stand by folding the first and second support legs to the pedestal, bringing the wheel provided in the second support leg into contact with the ground, and gripping the handle provided in the first support leg to tug the projector set.

Concerning Application Examples D1 to D8, the form of the invention is not limited to the stand and the projector system. For example, the invention can also be applied to a projection method for projecting an image on the screen, a setting method for setting the projector, and a carrying method for carrying the projector. The invention is not limited to the forms explained above. It goes without saying that the invention can be carried out in various forms without departing from the spirit of the invention.

Application Example E1

A projector according to Application Example E1 includes: a projector main body that projects image light representing an image on a projection surface; and a connecting unit for connecting the projector to another projector with a positional relation thereof fixed.

The projector itself includes the connecting unit. Therefore, if a plurality of the projectors are prepared and connected via connecting units, it is possible to easily connect the plural projectors without using special devices, instruments, and the like other than the projectors to be connected. The connecting unit of the projector fixes a positional relation with another projector connected thereto. Therefore, if a plurality of the projectors are connected, it is possible to accurately arrange the plural projectors. As a result, it is possible to obtain a highly accurate image.

Application Example E2

It is preferable that, in the projector according to Application Example E1, the connecting unit is detachably attachable.

With the projector, since the connecting unit is detachably attachable, it is possible to easily connect projectors in a positional relation corresponding to a setting state by changing the length and the shape of the connecting unit.

Application Example E3

It is preferable that, in the projector according to Application Example E1 or E2, the connecting unit includes a signal line for transmitting and receiving an electric signal and electrically connects the projector to the other projector.

The projector is electrically connected to the other projector by the connecting unit. Therefore, for example, it is possible to perform communication among the connected projectors. As a result, the trouble of connecting plural projectors using wires separate from the projectors is reduced. Since the wires separate from the projectors for connecting the plural projectors are reduced, the projectors are connectedly neatly in appearance.

Application Example E4

It is preferable that the projector according to any one of Application Examples E1 to E3 further includes an exhaust port for discharging the air in the inside of a main body of the projector to the outside of the projector, and the exhaust port is arranged in a position where, when the projector is connected to another projector via the connecting unit, exhaust from the projector does not blow on the other projector.

With the projector, when plural projectors are connected, exhaust does not blow on projectors adjacent to the projector. Therefore, it is possible to reduce the likelihood of failure of the projector due to heated exhaust.

Concerning Application Examples E1 to E4, the invention can be realized in various forms. For example, the invention can be realized in a form of a projector system or the like in which plural same projector main bodies are connected via connecting units.

BRIEF DESCRIPTION OF THE DRAWINGS

The invention will be described with reference to the accompanying drawings, wherein like numbers reference like elements.

DESCRIPTION OF EXEMPLARY EMBODIMENTS

Projectors as projecting apparatuses to which the invention is applied are explained below in order to further clarify the configurations and actions of the invention explained above.

First Embodiment

A. Example A1

A1. Configuration of a Projector

Figure 1:
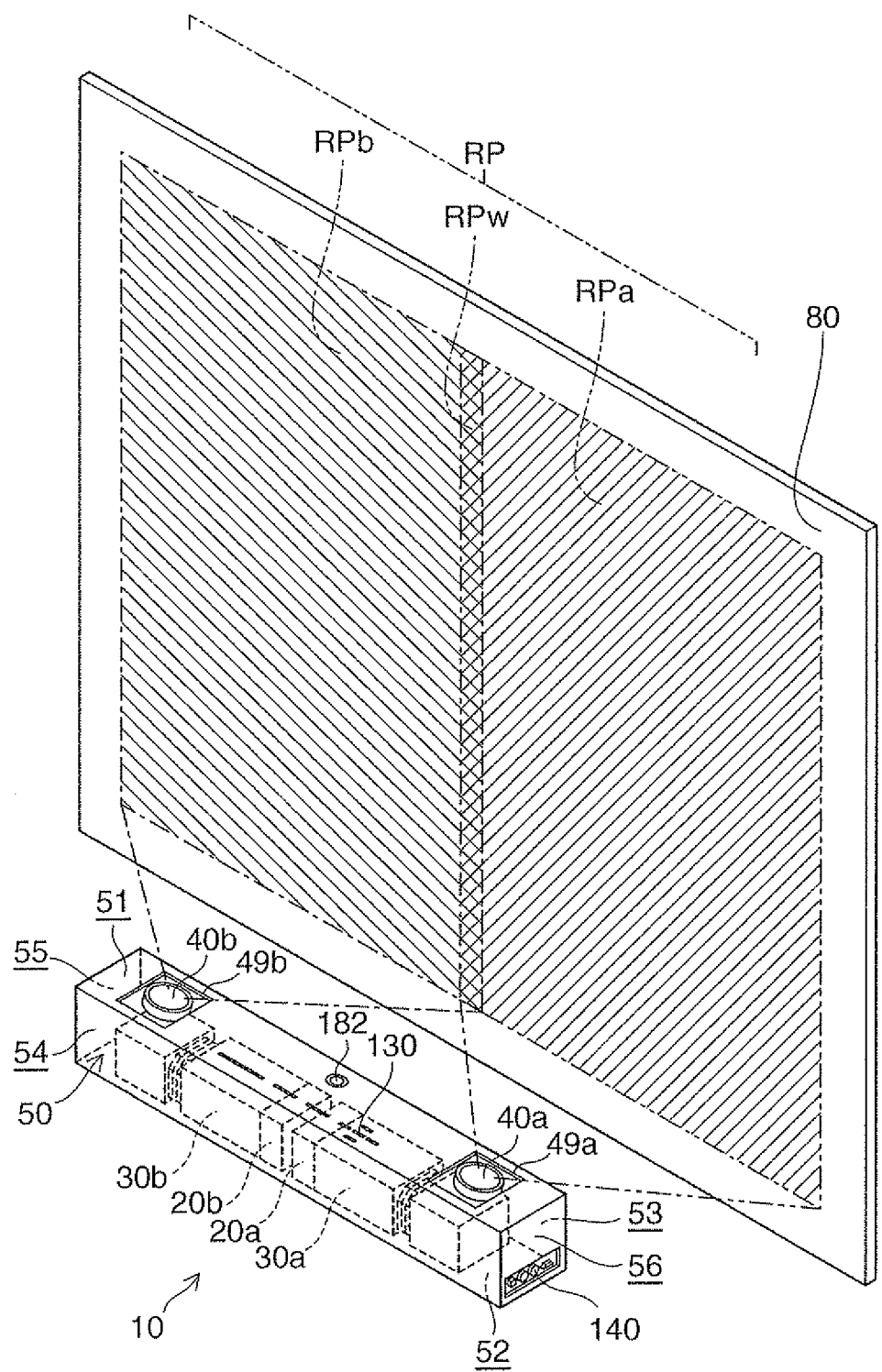
FIG. 1 is a diagram for mainly explaining the external configuration of a projector according to a first embodiment of the invention.

FIG. 1 is a diagram for mainly explaining the external configuration of a projector 10. The projector 10 projects an image RP on a screen 80. The screen 80 is a plane on which the image RP is displayed. The screen 80 may be a movie screen or may be a wall surface. In this example, the image RP projected by the projector 10 is an image formed by joining two partial images RPa and RPb. In this example, an overlapping area RPw where the two partial images RPa and RPb overlap each other is formed in a seam of the partial image RPa and the partial image RPb.

The projector 10 includes light source units 20a and 20b that radiate lights, image generating units 30a and 30b that generate projection lights representing the image RP, and projection optical units 40a and 40b that project the projection lights representing the image RP on the screen 80. The partial image RPa in the image RP is projected by using the light source unit 20a, the image generating unit 30a, and the projection optical unit 40a. Specifically, the light radiated from the light source unit 20a is projected on the screen 80 from the projection optical unit 40a after being modulated into projection light representing the partial image RPa by the image generating unit 30a. The partial image RPb in the image RP is projected by using the light source unit 20b, the imaging optical unit 30b, and the projection optical unit 40b. Specifically, the light radiated from the light source unit 20b is projected on the screen 80 from the projection optical unit 40b after being modulated into projection light representing the partial image RPb by the image generating unit 30b. Details of the light source units 20a and 20b, the image generating units 30a and 30b, and the projection optical units 40a and 40b are explained later.

The projector 10 includes a main body housing 50 that houses the light source units 20a and 20b, the image generating units 30a and 30b, and the projection optical units 40a and 40b. In this example, the main body housing 50 is a hexahedron. Outer surfaces forming the hexahedron include a top surface 51, a bottom surface 52, a front surface 53, a back surface 54, a left side 55, and a right side 56. The top surface 51 of the main body housing 50 is an upper end located in an upper part in the main body housing 50. The bottom surface 52 of the main body housing 50 is a bottom end as a surface opposed to the top surface 51. The front surface 53 of the main body housing 50 is a front end facing the screen 80 in the main body housing 50. The back surface 54 of the main body housing 50 is a surface opposed to the front surface 53 and is a rear end with the back thereof facing the screen 80 in the main body housing 50. The left side 55 of the main body housing 50 is a side end located on the left side in front of the screen 80. The right side 56 of the main body housing 50 is a side end located on the right side in front of the screen 80.

In this example, the top surface 51, the bottom surface 52, the front surface 53, and the back surface 54 of the main body housing 50 are rectangles having long sides extending from the left side 55 to the right side 56. In this example, the projection optical unit 40b, the image generating unit 30b, the light source unit 20b, the light source unit 20a, the image generating unit 30a, and the projection optical unit 40a line up substantially in a straight line in this order from the left side 55 to the right side 56 of the main body housing 50.

In the main body housing 50, openings 49a and 49b for exposing the projection optical units 40a and 40b to the outside of the main body housing 50 are provided such that projection lights from the projection optical units 40a and 40b reach the screen 80. In this example, the main body housing 50 houses the entire projection optical units 40a and 40b. However, in other embodiments, the main body housing 50 may house the projection optical units 40a and 40b with a part thereof projecting from the openings 49a and 49b. In this example, both the openings 49a and 49b are provided in the top surface 51 of the main body housing 50. The projection optical units 40a and 40b are also provided on the top surface 51 as the same plane in the main body housing 50.

Figure 2:
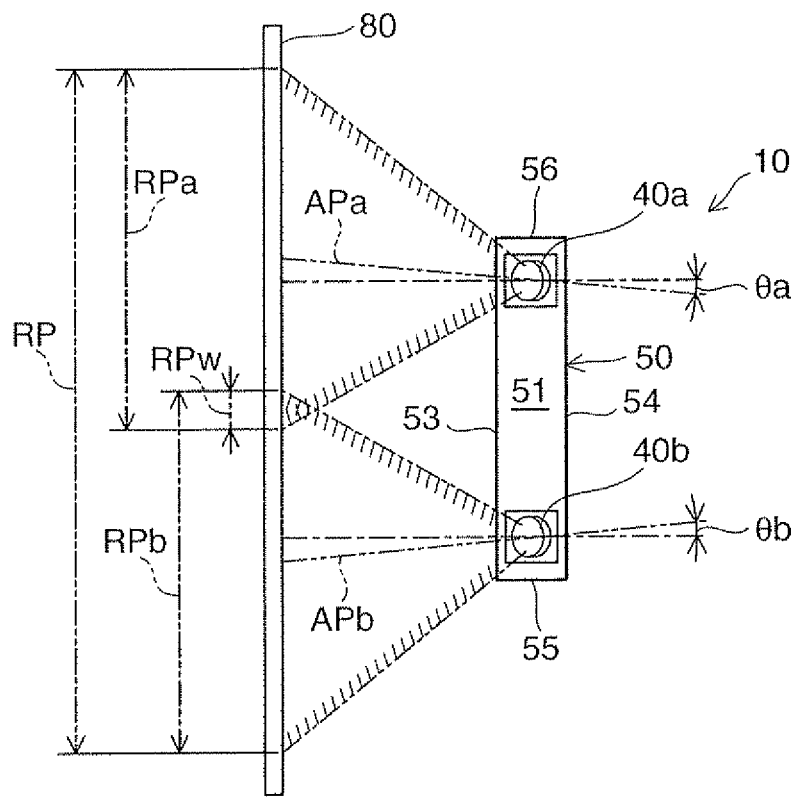
FIG. 2 is a diagram for mainly explaining the configuration of the projector viewed from a top surface of a main body housing.

FIG. 2 is a diagram for mainly explaining the configuration of the main body housing 50 of the projector 10 viewed from the top surface 51. When viewed from the top surface 51 of the main body housing 50, an optical axis APa of projection light projected from the projection optical unit 40a inclines at an angle θa in a direction opposite to a direction in which the projection optical unit 40b adjacent to the projection optical unit 40a is located. When viewed from the top surface 51 of the main body housing 50, an optical axis APb of projection light projected from the projection optical unit 40b inclines at an angle θb in a direction opposite to a direction in which the projection optical unit 40a adjacent to the projection optical unit 40b is located. Therefore, in this example, the optical axes APa and APb incline in the directions opposed to each other.

Figure 3:
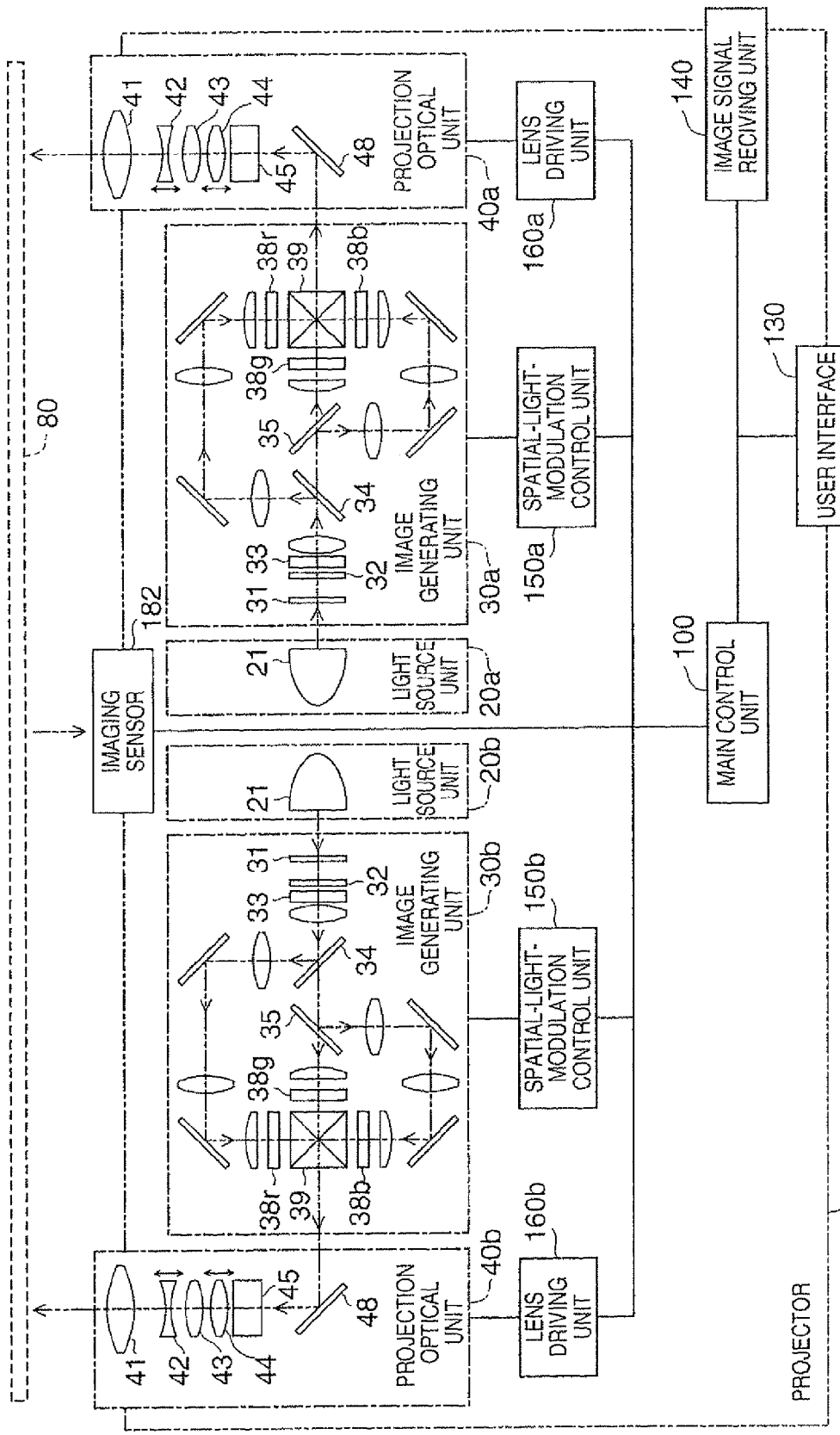
FIG. 3 is a diagram for mainly explaining the detailed configuration of the projector.

FIG. 3 is a diagram for mainly explaining the detailed configuration of the projector 10. The light source unit 20a of the projector 10 includes a light source 21 that radiates light. In this example, the light source 21 is an ultra-high pressure mercury lamp (UHE lamp). However, in other embodiments, the light source 21 may be a light emitting diode (LED). In this example, the configuration of the light source unit 20b is the same as that of the light source unit 20a.

In this example, the image generating unit 30a of the projector 10 is a color separating and combining optical unit. The image generating unit 30a separates light radiated by the light source 21 into red light, green light, and blue light, modulates the respective lights, and then combines these lights as one light again to thereby generate projection light. The image generating unit 30a includes integrator lenses 31 and 32, a polarization converting element 33, dichroic mirrors 34 and 35, spatial light modulators 38r, 38g, and 38b, and a dichroic prism 39. In this example, the number of spatial light modulators is three. However, in other embodiments, the number of spatial light modulators may be equal to or smaller than three or may be equal to or larger than three. In this example, the spatial light modulators are transmissive liquid crystal panels that modulate transmitted light. However, in other embodiments, a reflective liquid crystal panel that modulates reflected light may be used or a micro-mirror type light modulating device such as a digital micro-mirror device (DMD (registered trademark)) may be used. In this example, the configuration of the image generating unit 30b is the same as that of the image generating unit 30a.

The projection optical unit 40a of the projector includes a front lens 41, a zoom lens 42, a master lens 43, a focus lens 44, and a parallel glass 45. These lenses are arrayed in this order to configure a projection lens unit. In this example, the zoom lens 42 and the focus lens 44 move back and forth along an optical axis of the projection optical unit 40a. In this example, the projection optical unit 40a further includes a reflection mirror 48 that makes projection light from the image generating unit 30a incident on the parallel glass 45.

The projector 10 further includes a main control unit 100, a user interface 130, an image input unit 140, spatial-light-modulation control units 150a and 150b, lens driving units 160a and 160b, and an imaging sensor 182.

The user interface 130 of the projector 10 receives instruction input from a user of the projector 10. In this example, the user interface 130 includes, in addition to plural buttons for receiving pressing input from the user, an infrared interface that receives infrared input from a remote controller.

The image input unit 140 of the projector 10 is connected to an external apparatus such as a personal computer or a digital image camera and receives the input of image data representing the image RP projected on the screen 80.

The spatial-light-modulation control units 150a and 150b of the projector 10 control the spatial light modulators 38r, 38g, and 38b of the image generating units 30a and 30b on the basis of the image data received by the image input unit 140.

In this example, the spatial light modulators 38r, 38g, and 38b are liquid crystal panels. The spatial-light-modulation control units 150a and 150b are liquid-crystal-panel driving devices.

The lens driving units 160a and 160b of the projector 10 drive the zoom lenses 42 and the focus lenses 44 of the projection optical units 40a and 40b.

The imaging sensor 182 of the projector 10 is an image sensor that captures an image on the screen 80. In this example, the imaging sensor 182 is a CCD image sensor (Charge Coupled Device Image Sensor) as one of solid-state imaging devices. However, the imaging sensor 182 may be a CMOS image sensor (Complementary Metal Oxide Semiconductor image sensor).

The main control unit 100 of the projector 10 controls the units of the projector 10. In this example, the main control unit 100 is a computer including a central processing unit (hereinafter referred to as CPU) and a memory. Various functions executed by the main control unit 100 are realized by the CPU operating on the basis of software. However, in other embodiments, the functions may be realized by an electronic circuit operating on the basis of a physical circuit configuration thereof.

The main control unit 100 executes image projection processing for projecting the image RP based on image data input from the image input unit 140 on the screen 80. The image projection processing is processing for generating two image data representing the partial images RPa and RPb on the basis of the image data input from the image input unit 140. The image data representing the partial image RPa is output from the main control unit 100 to the spatial-light-modulation control unit 150a. The image data representing the partial image RPb is output from the main control unit 100 to the spatial-light-modulation control unit 150b. Consequently, projection light representing the partial image RPa is generated by the image generating unit 30a and projected on the screen 80 from the projection optical unit 40a. Projection light representing the partial image RPb is generated by the image generating unit 30b and projected on the screen 80 from the projection optical unit 40b. Portions corresponding to the overlapping area RPw in the partial images RPa and RPb are formed in a comb tooth shape or a mosaic shape to thereby complement each other to form one image such that the seam of the partial image RPa and the partial image RPb is not conspicuous.

The main control unit 100 executes, on the basis of an image captured by the imaging sensor 182, image adjustment processing for adjusting the image RP projected on the screen 80. In the image adjustment processing, keystone correction processing, focus adjustment processing, expansion and reduction adjustment processing, unevenness adjustment processing, and the like are applied to each of the partial images RPa and RPb. The keystone correction processing is processing for correcting, according to the shape of an image projected on the screen 80 and a distance from the projector 10 to the screen 80, image data output from the main control unit 100 to the spatial-light-modulation control units 150a and 150b such that distortion of the partial images RPa and RPb caused by the tilt of the screen 80 with respect to the projector 10 is reduced. The focus adjustment processing is processing for adjusting a focus of projection light according to the distance from the projector 10 to the screen 80. The expansion and reduction adjustment processing is processing for adjusting, according to the size of the screen 80, the size of the partial images RPa and RPb projected on the screen 80. The unevenness adjustment processing is processing for suppressing color unevenness and luminance unevenness between the partial image RPa and the partial image RPb to thereby obtain uniform color reproducibility over the entire display area of the image RP.

A2. Effects

With the projector 10 explained above, since the plural image generating units 30a and 30b and the plural projection optical units 40a and 40b are positioned in the main body housing 50, it is possible to reduce a load for aligning the plural partial images RPa and RPb respectively projected from the plural projection optical units 40a and 40b.

The plural partial images RPa and RPb are combined to project one image RP on the screen 80. This makes it possible to realize an increase in the size of the image RP projected on the screen 80 while reducing a load for aligning the plural partial images RPa and RPb respectively projected from the plural projection optical units 40a and 40b.

The plural projection optical units 40a and 40b are provided on the top surface 51 as the same plane in the main body housing 50. This makes it possible to reduce a load for aligning the plural partial images RPa and RPb compared with a load applied when the plural projection optical units 40a and 40b are provided over the plural planes.

The plural image generating units 30a and 30b and the plural projection optical units 40a and 40b line up substantially in a straight line. This makes it possible to efficiently house the plural image generating units 30a and 30b and the plural projection optical units 40a and 40b in the inside of the main body housing 50.

The optical axis APa of the projection optical unit 40a inclines at the angle θa to the opposite side of the direction in which the projection optical unit 40b is located. The optical axis APb of the projection optical unit 40b inclines at the angle θb to the opposite side of the direction in which the projection optical unit 40a is located. This makes it possible to project projection light in a wider range and realize an increase in the size of the image RP projected on the screen 80.

A3. First Modification

Figure 4:
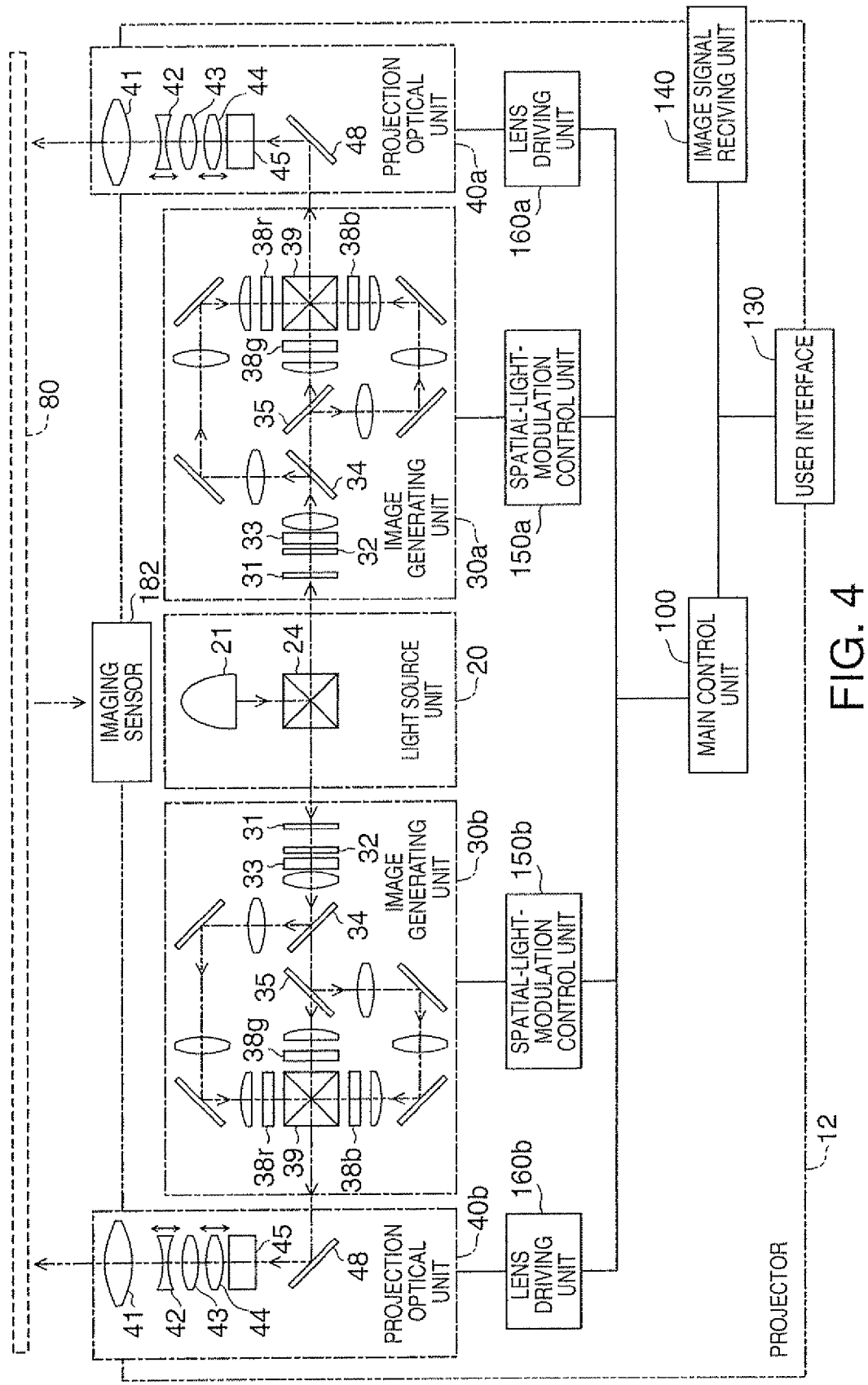
FIG. 4 is a diagram for mainly explaining the detailed configuration of a projector in a first modification.

FIG. 4 is a diagram for mainly explaining the detailed configuration of the projector 12 in a first modification. A projector 12 in the first modification is the same as the projector 10 explained above except that the projector 12 includes, instead of the light source units 20a and 20b in the projector 10, a light source unit 20 that supplies light to both the image generating unit 30a and the image generating unit 30b in common.

The light source unit 20 of the projector 12 includes a light source 21 and a light distributing unit 24. In the first modification, the light source 21 of the light source unit 20 is an ultra-high pressure mercury lamp (UHE lamp). However, in other embodiments, the light source 21 may be a light emitting diode (LED). The light distributing unit 24 of the light source unit 20 distributes light radiated from the light source 21 to each of the image generating units 30a and 30b. In the first modification, the light distributing unit 24 distributes the light using a prism. However, in other embodiments, the light distributing unit 24 may distribute the light using an optical fiber.

With the projector 12 in the first modification explained above, it is possible to prevent lights supplied to the plural image generating units 30a and 30b from becoming non-uniform because of an individual difference of a light source.

This makes it possible to suppress color unevenness and luminance unevenness between the plural partial images RPa and RPb respectively projected from the plural projection optical units 40a and 40b.

A4. Second Modification

Figure 5:
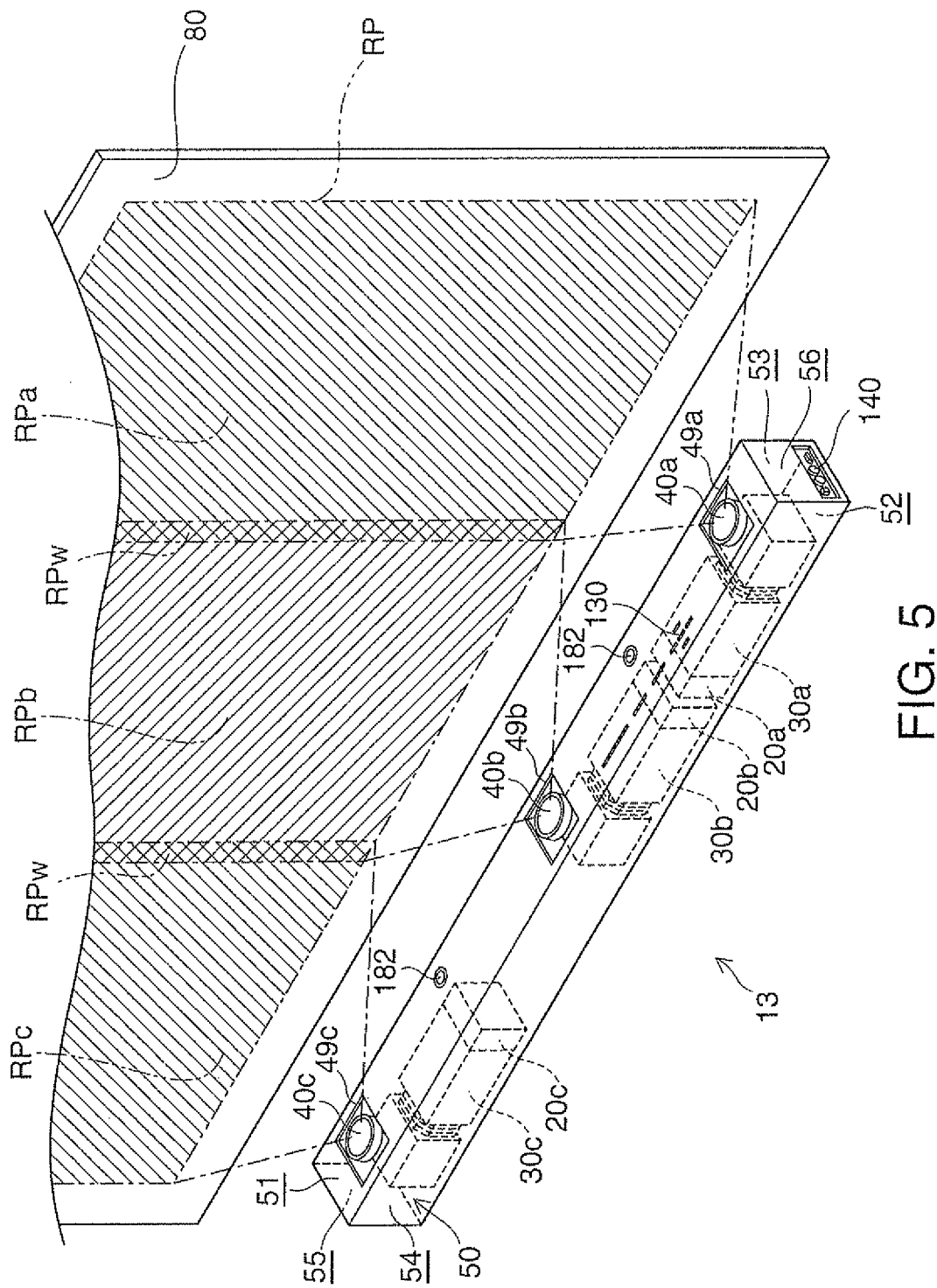
FIG. 5 is a diagram for mainly explaining the external configuration of a projector in a second modification.

FIG. 5 is a diagram for mainly explaining the external configuration of a projector 13 in a second modification. The projector 10 explained above includes the two light source units 20a and 20b, the two image generating units 30a and 30b, and the two projection optical units 40a and 40b. However, the projector 13 in the second modification includes three light source units 20a, 20b, and 20c, three image generating units 30a, 30b, and 30c, and three projection optical units 40a, 40b, and 40c. In the second modification, the image RP projected by the projector 13 is an image obtained by joining three partial images RPa, RPb, and RPc. In this example, the overlapping area RPw where the two partial images RPa and RPb overlap each other is formed in a seam of the partial image RPa and the partial image RPb. The overlapping area RPw where the two partial images RPb and RPc overlap each other is formed in a seam of the partial image RPb and the partial image RPc.

In this example, the light source unit 20c, the imaging optical unit 30c, and the projection optical unit 40c in the projector 13 in the second modification are the same as the light source unit 20b, the image generating unit 30b, and the projection optical unit 40b in the projector 10 explained above. The partial image RPc in the image RP is projected by using the light source unit 20c, the imaging optical unit 30c, and the projection optical unit 40c. Specifically, light radiated from the light source unit 20c is projected on the screen 80 from the projection optical unit 40c after being modulated into projection light representing the partial image RPc by the imaging optical unit 30c.

The main body housing 50 of the projector 13 in the second modification houses the light source units 20a, 20b, and 20c, the image generating units 30a, 30b, and 30c, and the projection optical units 40a, 40b, and 40c. In the second modification, the projection optical unit 40c, the imaging optical unit 30c, the light source unit 20c, the projection optical unit 40b, the image generating unit 30b, the light source unit 20b, the light source unit 20a, the image generating unit 30a, and the projection optical unit 40a line up substantially in a straight line in this order from the left side 55 to the right side 56 of the main body housing 50.

In the main body housing 50 in the second modification, openings 49a, 49b, and 49c for exposing the projection optical units 40a, 40b, and 40c to the outside of the main body housing 50 are provided such that projection lights from the projection optical units 40a, 40b, and 40c reach the screen 80. In the second modification, the openings 49a, 49b, and 49c are provided at an equal interval in the top surface 51 of the main body housing 50. The projection optical units 40a, 40b, and 40c are also provided at an equal interval on the top surface 51 as the same plane in the main body housing 50.

In the second modification, when viewed from the top surface 51 of the main body housing 50, an optical axis of the projection optical unit 40b located in the center among the projection optical units 40a, 40b, and 40c crosses a line connecting the projection optical units 40a and 40c at a substantial right angle. In the second modification, when viewed from the top surface 51 of the main body housing 50, an optical axis of the projection optical unit 40a located on the outer side at an end of the line of the projection optical units 40a, 40b, and 40c inclines in a direction opposite to the projection optical units 40b and 40c. An optical axis of the projection optical unit 40c located on the outer side at an end of the line of the projection optical units 40a, 40b, and 40c inclines in a direction opposite to the projection optical units 40a and 40b.

With the projector 13 in the third modification explained above, since the three image generation units 30a, 30b, and 30c and the three projection optical units 40a, 40b, and 40c are positioned in the main body housing 50, it is possible to reduce a load for aligning the plural partial images RPa, RPb, and RPc respectively projected from the plural projection optical units 40a, 40b, and 40c.

The three partial images RPa, RPb, and RPc are combined to project one image RP on the screen 80. This makes it possible to realize a further increase in the size of the image RP projected on the screen 80 while reducing a load for aligning the plural partial images RPa, RPb, and RPc respectively projected from the plural projection optical units 40a, 40b, and 40c.

B. Other Embodiments

The embodiment of the invention is explained above. However, the invention is not limited by the embodiment. It goes without saying that the invention can be carried out in various forms without departing from the spirit of the invention. For example, the number of projecting units and imaging optical units is not limited to two or three and may be equal to or larger than four. A light source unit in a projector including three or more imaging optical units may be plural light source units respectively corresponding to the three or more imaging optical units or may be a light source unit that supplies light to each of the three or more imaging optical units in a distributed manner.

A plane for arranging the projecting units in the main body housing 50 is not limited to the top surface 51. The projecting units may be arranged on any one of the bottom surface 52, the front surface 53, the back surface 54, the left side 55, and the right side 56 according to a setting form of the projector, an external shape of the projector, relative positions of the projector and the screen, and the like or may be arranged over two or more planes. In this example, the projecting units and the imaging optical units are arranged substantially in a straight line. However, in other embodiments, the projecting units and the imaging optical units may be arranged in a lattice shape in which vertical columns and horizontal columns cross each other.

The projecting units are not limited to projection lens units in which plural lenses are arrayed. The projecting units may be optical units that reflect projection lights generated by the imaging optical units to the screen 80 using at least one of an aspherical lens, a magnifying lens, a diffusion glass, an aspherical mirror, and a reflection mirror.

In FIGS. 1 and 5, the image RP is projected in the state in which the projectors 10 and 13 are placed on the stand or the floor. However, the image RP may be projected in a state in which the projectors 10 and 13 are hung from the ceiling or may be projected in a state in which the projectors 10 and 13 are set on the wall.

Second Embodiment

A. Example B1

A1. Configuration of a Projector

Figure 6:
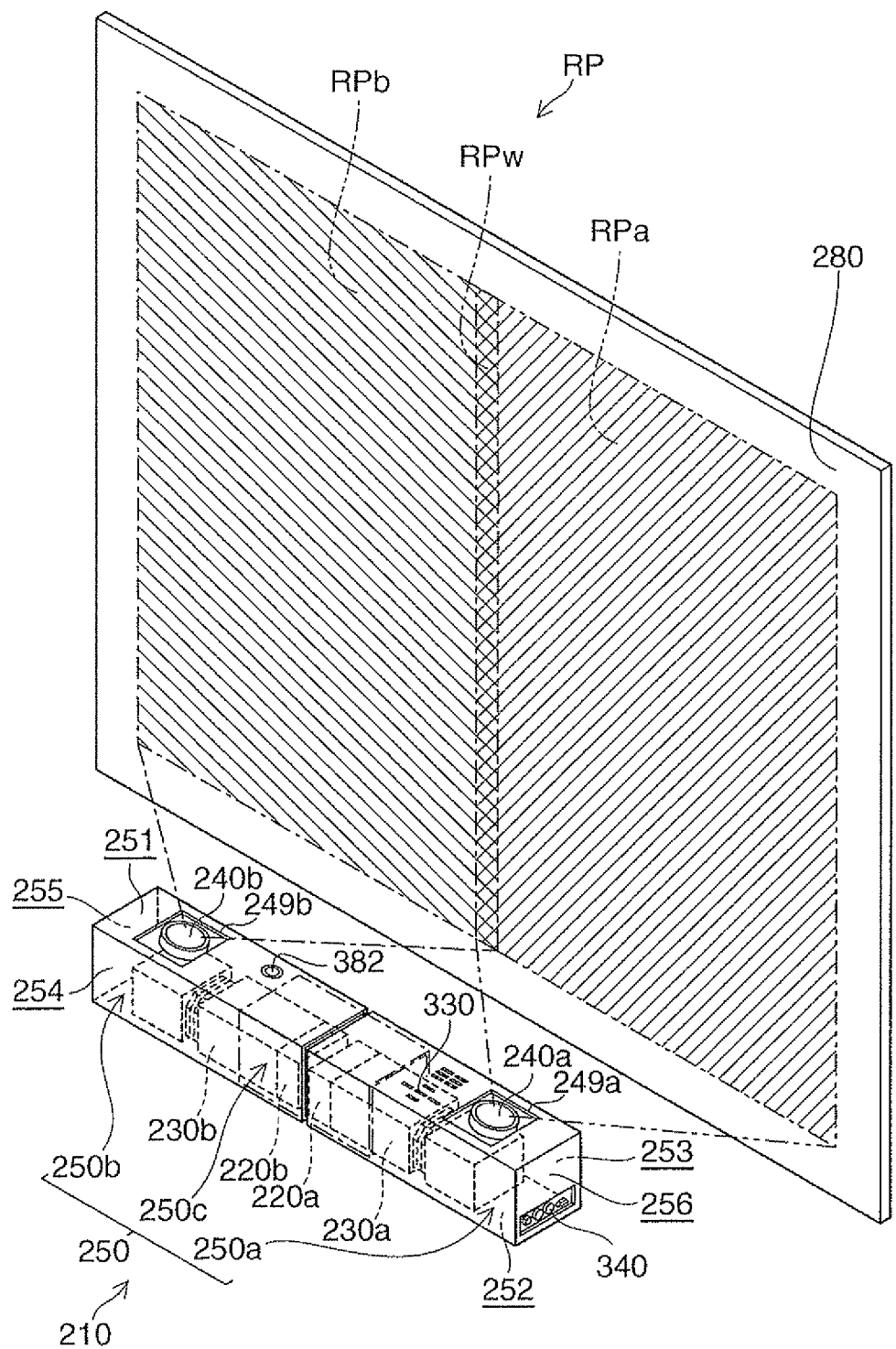
FIG. 6 is diagram for mainly explaining the external configuration of a projector according to a second embodiment of the invention.

FIG. 6 is a diagram for mainly explaining the external configuration of a projector 210. The projector 210 projects the image RP on a screen 280. The screen 280 is a plane on which the image RP is displayed. The screen 280 may be a movie screen or may be a wall surface. In this example, the image RP projected by the projector 210 is an image formed by joining the two partial images RPa and RPb. In this example, the overlapping area RPw where the two partial images RPa and RPb overlap each other is formed in the seam of the partial image RPa and the partial image RPb.

The projector 210 includes light source units 220a and 220b that radiate lights, image generating units 230a and 230b that generate projection lights representing the image RP, and projection optical units 240a and 240b that project the projection lights representing the image RP on the screen 280. The partial image RPa in the image RP is projected by using the light source unit 220a, the image generating unit 230a, and the projection optical unit 240a. Specifically, the light radiated from the light source unit 220a is projected on the screen 280 from the projection optical unit 240a after being modulated into projection light representing the partial image RPa by the image generating unit 230a. The partial image RPb in the image RP is projected by using the light source unit 220b, the image generating unit 230b, and the projection optical unit 240b. Specifically, the light radiated from the light source unit 220b is projected on the screen 280 from the projection optical unit 240b after being modulated into projection light representing the partial image RPb by the image generating unit 230b. Details of the light source units 220a and 220b, the image generating units 230a and 230b, and the projection optical units 240a and 240b are explained later.

The projector 210 includes a main body housing 250 that houses the light source units 220a and 220b, the image generating units 230a and 230b, and the projection optical units 240a and 240b. In this example, the main body housing 250 is a hexahedron. Outer surfaces forming the hexahedron include a top surface 251, a bottom surface 252, a front surface 253, a back surface 254, a left side 255, and a right side 256. The top surface 251 of the main body housing 250 is an upper end located in an upper part in the main body housing 250. The bottom surface 252 of the main body housing 250 is a bottom end as a surface opposed to the top surface 251. The front surface 253 of the main body housing 250 is a front end facing the screen 280 in the main body housing 250. The back surface 254 of the main body housing 250 is a surface opposed to the front surface 253 and is a rear end with the back thereof facing the screen 280 in the main body housing 250. The left side 255 of the main body housing 250 is a side end located on the left side in front of the screen 280. The right side 256 of the main body housing 250 is a side end located on the right side in front of the screen 280.

In this example, the top surface 251, the bottom surface 252, the front surface 253, and the back surface 254 of the main body housing 250 are rectangles having long sides extending from the left side 255 to the right side 256. In this example, the projection optical unit 240b, the image generating unit 230b, the light source unit 220b, the light source unit 220a, the image generating unit 230a, and the projection optical unit 240a line up substantially in a straight line in this order from the left side 255 to the right side 256 of the main body housing 250.

In the main body housing 250, openings 249a and 249b for exposing the projection optical units 240a and 240b to the outside of the main body housing 250 are provided such that projection lights from the projection optical units 240a and 240b reach the screen 280. In this example, the main body housing 250 houses the entire projection optical units 240a and 240b. However, in other embodiments, the main body housing 250 may house the projection optical units 240a and 240b with a part thereof projecting from the openings 249a and 249b. In this example, both the openings 249a and 249b are provided in the top surface 251 of the main body housing 250. The projection optical units 240a and 240b are also provided on the top surface 251 as the same plane in the main body housing 250.

Figure 7:
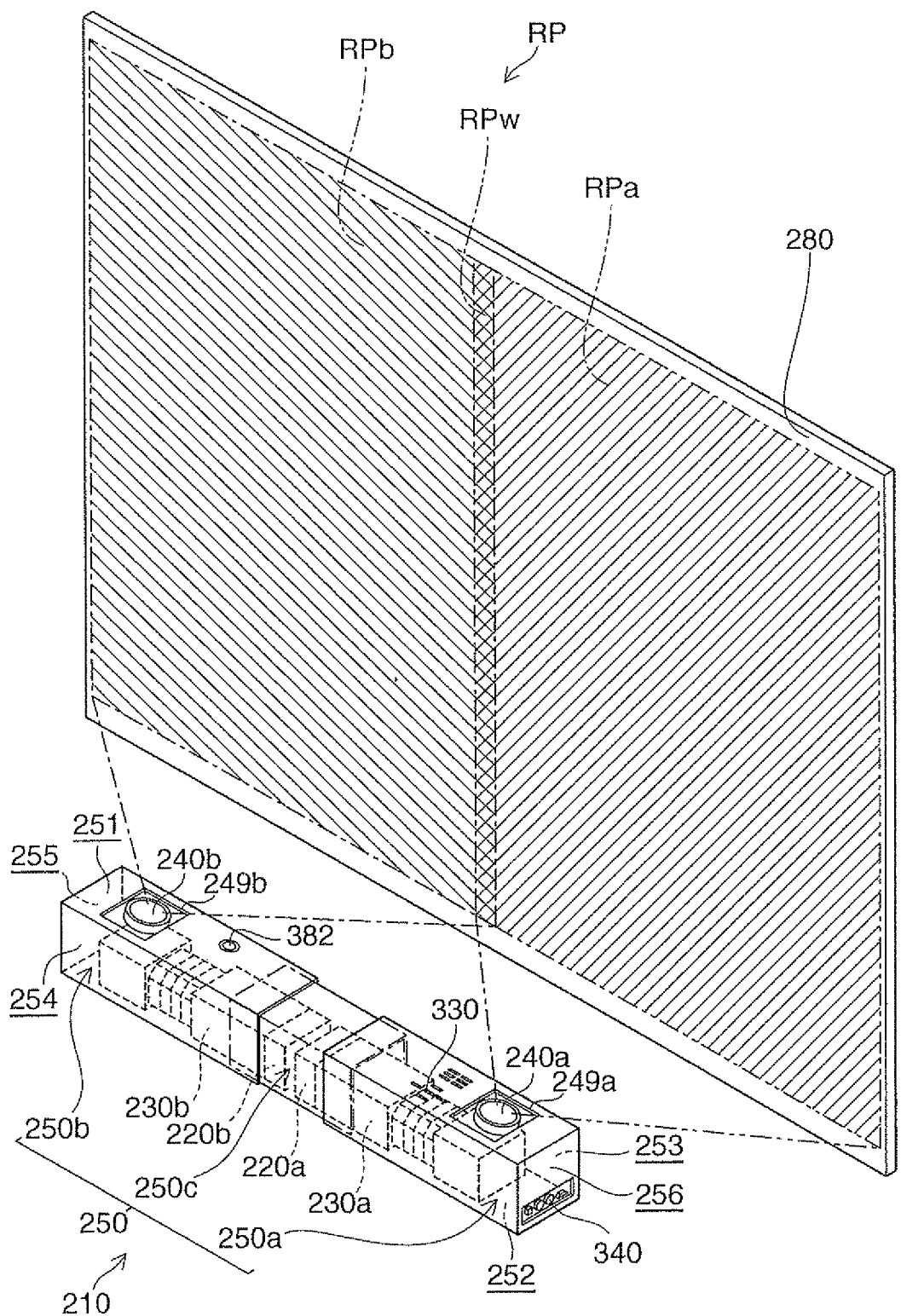
FIG. 7 is a diagram for mainly explaining the external configuration of the projector in which a main body housing is extended.

FIG. 7 is a diagram for mainly explaining the external configuration of the projector 210 in which the main body housing 250 is extended. The main body housing 250 includes a first housing 250a, a second housing 250b, and a third housing 250c. The first housing 250a forms a section that houses the projection optical unit 240a. The second housing 250b forms a section that houses the projection optical unit 240b. The third housing 250c is located between the first housing 250a and the second housing 250b and slidably connected to each of the first housing 250a and the second housing 250b in directions for connecting the first housing 250a and the second housing 250b. In other words, a connection structure for the first and second housings 250a and 250b and the third housing 250c configure an extending and retracting unit that extends and retracts the main body housing 250 in the directions for connecting the projection optical unit 240a and the projecting unit 240b.

In this example, the projection optical unit 240a is fixed to the first housing 250a, the projection optical unit 240b is fixed to the second housing 250b, and the light source units 220a and 220b and the image generating units 230a and 230b are fixed to the third housing 250c. According to the slide movement of the first housing 250a and the second housing 250b, a space between the projection optical unit 240a and the image generating unit 230a and a space between the projecting unit 240b and the image generating unit 230b increases and decreases. In other embodiments, the light source unit 220a, the image generating unit 230a, and the projection optical unit 240a may be fixed to the first housing 250a, the light source unit 220b, the image generating unit 230b, and the projection optical unit 240b may be fixed to the second housing 250b, and, according to the slide movement of the first housing 250a and the second housing 250b, the sections respectively fixed to the first housing 250a and the second housing 250b may move.

In this example, the first housing 250a and the second housing 250b are two rectangular parallelepipeds obtained by cutting the retracted main body housing 250 in the center in a longitudinal direction thereof as shown in FIG. 6. The first housing 250a is a square cylinder having the right side 256 and the second housing 250b is a square cylinder having the left side 255. In this example, the third hosing 250c is a square cylinder having an external shape slightly smaller than the first housing 250a and the second housing 250b. In this example, in a state in which the main body housing 250 is retracted as shown in FIG. 6, the third housing 250c enters the first housing 250a and the second housing 250b. In a state in which the main body housing 250 is extended as shown in FIG. 7, the third housing 250c is exposed from the first housing 250a and the second housing 250b. In other embodiments, the third housing 250c may be a square cylinder having an external shape slightly larger than the first housing 250a and the second housing 250b and may be connected to the first housing 250a and the second housing 250b to be exposed to the outside through the extension and retraction of the main body housing 250.

Figure 8:
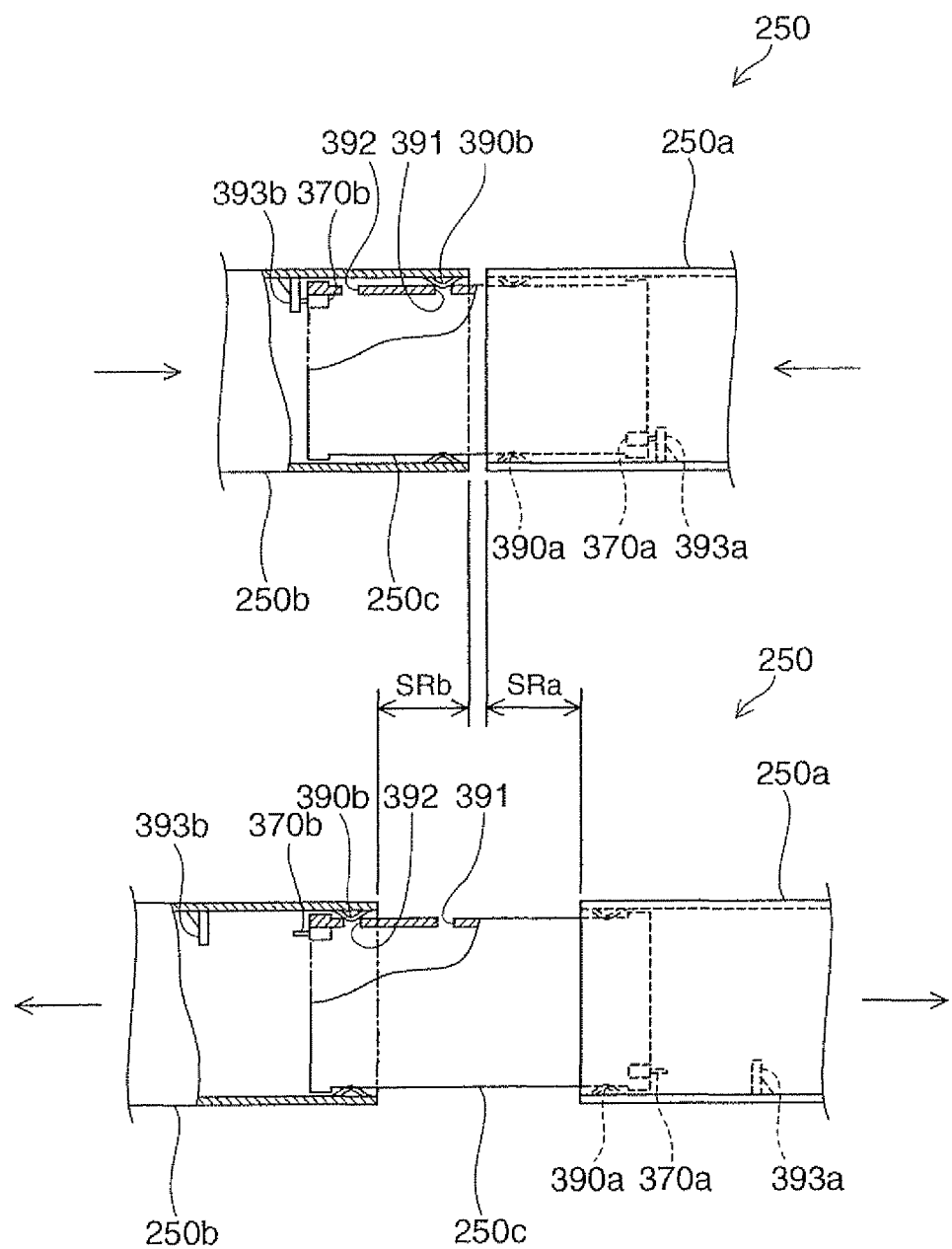
FIG. 8 is a diagram for explaining details of an extending and retracting unit in the main body housing.

FIG. 8 is a diagram for explaining details of the extending and retracting unit in the main body housing 250. The main body housing 250 in a retracted state is shown in the upper part of FIG. 8. The main body housing 250 in an extended state is shown in the lower part of FIG. 8. The first housing 250a includes a projection 390a and the second housing 250b includes a projection 390b. The third housing 250c includes a first recess 391 and a second recess 392. The projection 390a of the first housing 250a and the projection 390b of the second hosing 250b are set in contact with the third housing 250c. The first recess 391 of the third housing 250c fits with the projection 390a of the first housing 250a and the projection 390b of the second housing 250b to thereby locate the first housing 250a and the second housing 250b in a retracted position. The second recess 392 of the third housing 250c fits with the projection 390a of the first housing 250a and the projection 390b of the second housing 250b to thereby locate the first housing 250a and the second housing 250b in an extended position. In other words, the projections 390a and 390b, the first recess 391, and the second recess 392 configure a holding unit that holds a state in which the main body housing 250 is extended or retracted.

In this example, the first housing 250a slides relatively to the third housing 250c by a distance SRa specified by a space between the first recess 391 and the second recess 392. The second housing 250b slides relatively to the third housing 250c by a distance SRb specified by a space between the first recess 391 and the second recess 392. Therefore, in this example, there are a first state (an extension/retraction distance=0) in which the first housing 250a and the second housing 250b are in the retracted position, a second state (an extension/retraction distance=SRa) in which only the first housing 250a is in the extended position, a third state (an extension/retraction distance=SRb) in which only the second housing 250b is in the extended position, and a fourth state (an extension/retraction distance=SRa+SRb) in which the first housing 250a and the second housing 250b are in the extended position. The main body housing 250 can be extended and retracted according to the extension/retraction distances in four stages in total.

As shown in FIG. 8, the projector 210 includes extension and retraction detecting units 370a and 370b that detect an extension/retraction distance of the main body housing 250. In this example, the extension and retraction detecting unit 370a is a pressing switch provided on a side of the third housing 250c connected to the first housing 250a. The extension and retraction detecting unit 370b is a pressing switch provided on a side of the third housing 250c connected to the second housing 250b. In this example, in the first housing 250a, a pressing unit 393a is provided in a position corresponding to the extension and retraction detecting unit 370a of the third housing 250c. The pressing unit 393a presses the extension and retraction detecting unit 370a in a state in which the first housing 250a is in the retracted position. The pressing unit 393a separates from the extension and retraction detecting unit 370a in a state in which the first housing 250a is in the extended position. Similarly, in the second housing 250b, a pressing unit 393b is provided in a position corresponding to the extension and retraction detecting unit 370b of the third housing 250c. The pressing unit 393b presses the extension and retraction detecting unit 370b in a state in which the second housing 250b is in the retracted position. The pressing unit 393b separates from the extension and retraction detecting unit 370b in a state in which the second housing 250b is in the extended position. This makes it possible to detect extension/retraction distance of the main body housing 250 on the basis of a combination of ON and OFF of the switches in the extension and retraction detecting units 370a and 370b.

Figure 9:
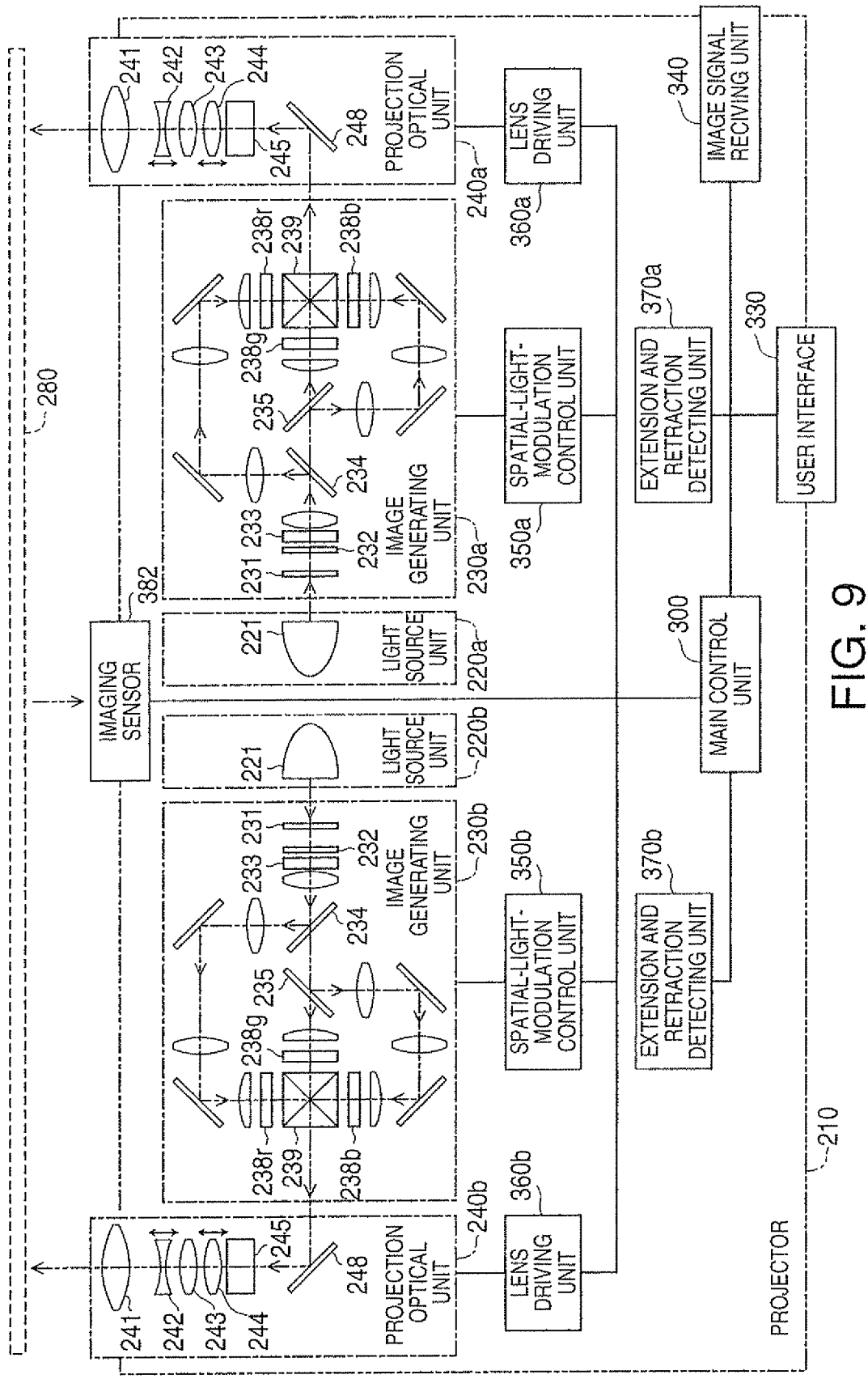
FIG. 9 is a diagram for mainly explaining the detailed configuration of the projector.

FIG. 9 is a diagram for mainly explaining the detailed configuration of the projector 210. The light source unit 220a of the projector 210 includes a light source 221 that radiates light. In this example, the light source 221 is an ultra-high pressure mercury lamp (UHE lamp). However, in other embodiments, the light source 221 may be a solid-state light source (e.g., a light emitting diode (LED) or a laser beam source). In this example, the configuration of the light source unit 220b is the same as that of the light source unit 220a.

In this example, the image generating unit 230a of the projector 210 is a color separating and combining optical unit. The image generating unit 230a separates light radiated from the light source 221 into red light, green light, and blue light, modulates the respective lights, and then combines the lights as one light again to thereby generate projection light. The image generating unit 230a includes integrator lenses 231 and 232, a polarization converting element 233, dichroic mirrors 234 and 235, spatial light modulators 238r, 238g, and 238b, and a dichroic prism 239. In this example, the number of spatial light modulators is three. However, in other embodiments, the number of spatial light modulators may be equal to or smaller than three or may be equal to or larger than three. In this example, the spatial light modulators are transmissive liquid crystal panels that modulate transmitted light. However, in other embodiments, a reflective liquid crystal panel that modulates reflected light may be used or a micromirror type light modulating device such as a digital micromirror device (DMD (registered trademark)) may be used. In this example, the configuration of the image generating unit 230b is the same as that of the image generating unit 230a.

The projection optical unit 240a of the projector 210 includes a front lens 241, a zoom lens 242, a master lens 243, a focus lens 244, and a parallel glass 245. These lenses are arrayed in this order to configure a projection lens unit. In this example, the zoom lens 242 and the focus lens 244 move back and forth along an optical axis of the projection optical unit 240a. In this example, the projection optical unit 240a further includes a reflection mirror 248 that makes projection light from the image generating unit 230a incident on the parallel glass 245.

The projector 210 further includes a main control unit 300, a user interface 330, an image input unit 340, spatial-light-modulation control units 350a and 350b, lens driving units 360a and 360b, and an imaging sensor 382.

The user interface 330 of the projector 210 receives instruction input from a user of the projector 210. In this example, the user interface 330 includes, in addition to plural buttons for receiving pressing input from the user, an infrared interface that receives infrared input from a remote controller.

The image input unit 340 of the projector 210 is connected to an external apparatus such as a personal computer and a digital image camera and receives the input of image data representing the image RP projected on the screen 280.

The spatial-light-modulation control units 350a and 350b of the projector 210 controls the spatial light modulators 238r, 238g, and 238b of the image generating units 230a and 230b on the basis of the image data received by the image input unit 340. In this example, the spatial light modulators 238r, 238g, and 238b are liquid crystal panels. The spatial-light-modulation control units 350a and 350b are liquid-crystal-panel driving devices.

The lens driving units 360a and 360b of the projector 210 drive the zoom lenses 242 and the focus lenses 244 of the projection optical units 240a and 240b.

The imaging sensor 382 of the projector 210 is an image sensor that captures an image of the screen 280. In this example, the imaging sensor 382 is a CCD image sensor (Charge Coupled Device Image Sensor) as one of solid-state imaging devices. However, the imaging sensor 382 may be a CMOS image sensor (Complementary Metal Oxide Semiconductor image sensor).

Figure 10:
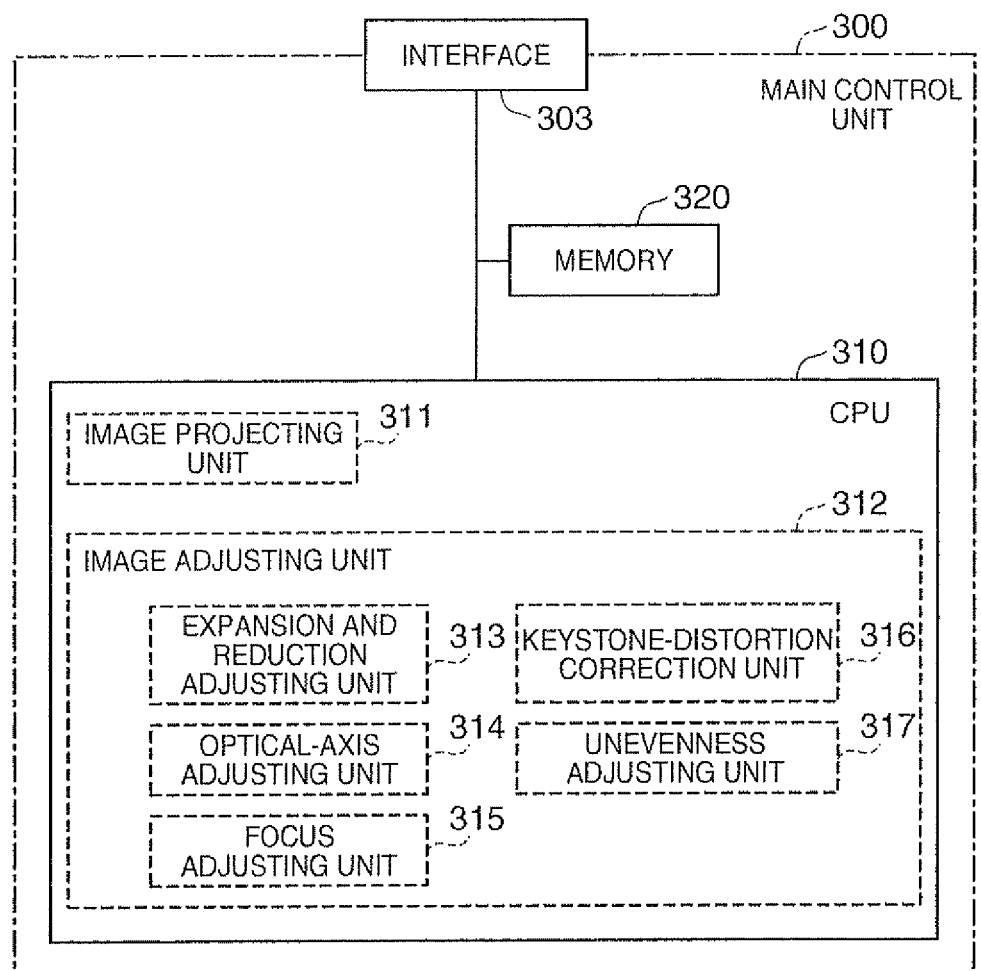
FIG. 10 is a diagram for explaining the detailed configuration of a main control unit.

FIG. 10 is a diagram for explaining the detailed configuration of the main control unit 300. The main control unit 300 of the projector 210 controls the units of the projector 210. The main control unit 300 includes an image projecting unit 311 and an image adjusting unit 312.

The image projecting unit 311 of the main control unit 300 executes image projection processing for projecting an image based on image data input from the image input unit 340 on the screen 280. The image projection processing is processing for generating two image data representing the partial images RPa and RPb on the basis of the image data input from the image input unit 340. The image data representing the partial image RPa is output from the main control unit 300 to the spatial-light-modulation control unit 350a. The image data representing the partial image RPb is output from the main control unit 300 to the spatial-light-modulation control unit 350b. Consequently, projection light representing the partial image RPa is generated by the image generating unit 230a and projected on the screen 280 from the projection optical unit 240a. Projection light representing the partial image RPb is generated by the image generating unit 230b and projected on the screen 280 from the projection optical unit 240b. Portions corresponding to the overlapping area RPw in the partial images RPa and RPb are formed in a comb tooth shape or a mosaic shape to thereby complement each other to form one image such that the seam of the partial image RPa and the partial image RPb is not conspicuous.

The image adjusting unit 312 of the main control unit 300 includes an expansion and reduction adjusting unit 313, an optical-axis adjusting unit 314, a focus adjusting unit 315, a keystone-distortion correction unit 316, and an unevenness adjusting unit 317. The image adjusting unit 312 executes image adjustment processing for adjusting an image projected on the screen 280.

The expansion and reduction adjusting unit 313 of the image adjusting unit 312 performs expansion and reduction adjustment processing for expanding or reducing an image projected on the screen 280 according to an extension/retraction distance of the main body housing 250 detected by the extension and retraction detecting units 370a and 370b. In this example, the expansion and reduction adjustment processing is processing for adjusting the size of the partial images RPa and RPb projected on the screen 280 by controlling the lens driving units 360a and 360b according to the extension/retraction distance of the main body housing 250 detected by the extension and retraction detecting units 370a and 370b.

The optical-axis adjusting unit 314 of the image adjusting unit 312 performs optical axis adjustment processing for moving optical axes of projection lights projected from the projection optical units 240a and 240b according to the extension/retraction distance of the main body housing 250 detected by the extension and retraction detecting units 370a and 370b. In this example, the optical axis adjustment processing is processing for moving the optical axes of the projection optical units 240a and 240b by controlling the lens driving units 360a and 360b according to the extension/retraction distance of the main body housing 250 detected by the extension and retraction detecting units 370a and 370b.

The focus adjusting unit 315 of the image adjusting unit 312 performs focus adjustment processing for moving focuses of the projection lights projected from the projection optical units 240a and 240b according to the extension/retraction distance of the main body housing 250 detected by the extension and retraction detecting units 370a and 370b. In this example, the focus adjustment processing is processing for moving the focuses of the projection optical units 240a and 240b by controlling the lens driving units 360a and 360b according to the extension/retraction distance of the main body housing 250 detected by the extension and retraction detecting units 370a and 370b.

The keystone-distortion correction unit 316 of the image adjusting unit 312 performs keystone distortion adjustment processing for correcting a keystone distortion of an image projected on the screen 280 according to the extension/retraction distance of the main body housing 250 detected by the extension and retraction detecting units 370a and 370b. In this example, the keystone distortion adjustment processing is processing for keystone-correcting video data output from the main control unit 300 to the spatial-light-modulation control units 350a and 350b according to the extension/retraction distance of the main body housing 250 detected by the extension and retraction detecting units 370a and 370b such that distortion of the partial videos RPa and RPb caused by the tilt of the screen 280 with respect to the projector 210.

The unevenness adjusting unit 317 of the video adjusting unit 312 performs unevenness adjustment processing for obtaining uniform color reproducibility over the entire display area of the video RP by suppressing color unevenness and luminance unevenness between the partial video RPa and the partial video RPb. In this example, the unevenness adjustment processing is processing for correcting video data output from the main control unit 300 to the spatial-light-modulation control units 350a and 350b on the basis of an image captured by the imaging sensor 382.

In this example, the main control unit 300 includes a central processing unit (hereinafter referred to as CPU) 310, a memory 320, and an interface 303. The CPU 310 of the main control unit 300 executes various kinds of processing on the basis of computer programs stored in the memory 320. The memory 320 of the main control unit 300 stores data and computer programs treated by the CPU 310. The interface 303 of the main control unit 300 mediates input and output of signals between the CPU 310 and the units of the projector 210. In this example, the functions of the image projecting unit 311 and the video adjusting unit 312 are realized by the CPU 310 operating on the basis of software. However, in other embodiments, the functions may be realized by an electronic circuit of the main control unit 300 operating on the basis of a physical circuit configuration thereof.

Figure 11:
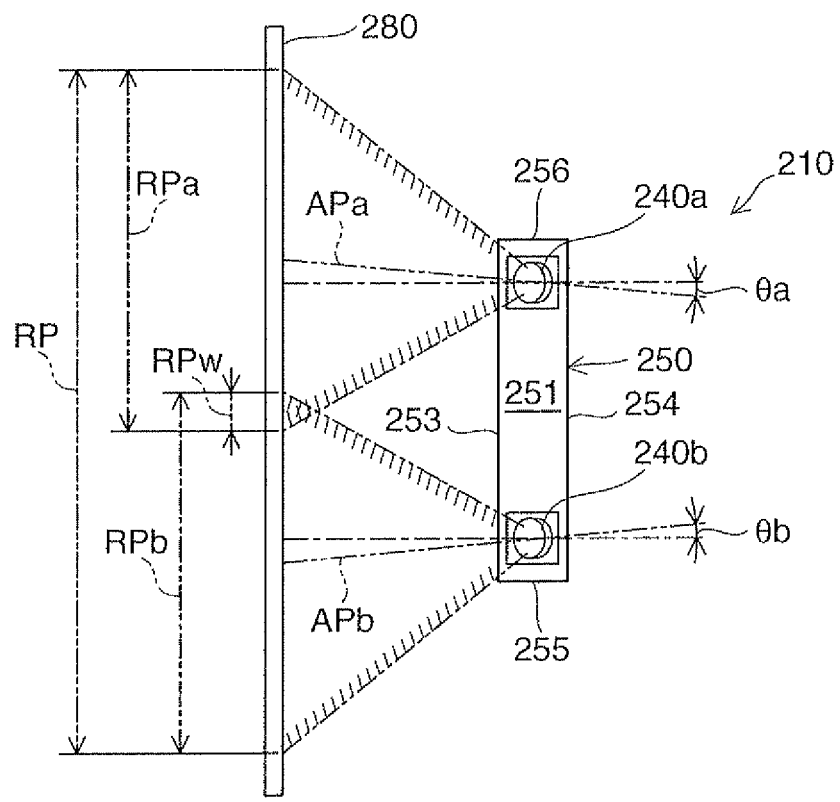
FIG. 11 is a diagram for mainly explaining the configuration of the projector viewed from a top surface of the main body housing.

FIG. 11 is a diagram for mainly explaining the configuration of the projector 210 viewed from the top surface 251 of the main body housing 250. When viewed from the top surface 251 of the main body housing 250, an optical axis APa of projection light projected from the projection optical unit 240a inclines at an angle θa in a direction opposite to a direction in which the projecting unit 240b adjacent to the projection optical unit 240a is located. When viewed from the top surface 251 of the main body housing 250, an optical axis APb of projection light projected from the projection optical unit 240b inclines at an angle θb in a direction opposite to a direction in which the projection optical unit 240a adjacent to the projection optical unit 240b is located. Therefore, in this example, the optical axes APa and APb incline in the directions opposed to each other.

A2. Effects

With the projector 210 explained above, after positioning the plural projection optical units 240a and 240b in the main body housing 250, a space between the plural projection optical units 240*a* and 240*b* can be increased and decreased by the connection structure of the first and second housings 250*a* and 250*b* and the third housing 250*c* in the main body housing 250. As a result, it is possible to realize an increase in the size of an image projected on the screen 280 while reducing a load for aligning the plural partial videos RPa and RPb respectively projected from the plural projection optical units 240*a* and 240*b*.

The projections 390*a* and 390*b*, the first recess 391, and the second recess 392 configure a holding unit that holds a state in which the main body housing 250 is extended or retracted. Consequently, since the plural projection optical units 240*a* and 240*b* are held with a space thereof increased or decreased, it is possible to further reduce a load for aligning the plural partial videos RPa and RPb respectively projected from the plural projection optical units 240*a* and 240*b*.

The video adjusting unit 312 of the main control unit 300 adjusts the video RP projected on the screen 280 according to an extension/retraction distance detected by the extension and retraction detecting units 370*a* and 370*b*. Consequently, since the video RP projected on the screen 280 is adjusted according to the space between the plural projection optical units 240*a* and 240*b*, it is possible to further reduce a load for aligning the plural partial videos RPa and RPb respectively projected from the plural projection optical units 240*a* and 240*b*.

The plural partial videos RPa and RPb are combined to project one video RP on the screen 280. This makes it possible to realize an increase in the size of the video RP projected on the screen 280 while reducing a load for aligning the plural partial videos RPa and RPb respectively projected from the plural projection optical units 240*a* and 240*b*.

The plural projection optical units 240*a* and 240*b* are provided on the top surface 251 as the same plane in the main body housing 250. This makes it possible to reduce a load for aligning the plural partial videos RPa and RPb compared with a load applied when the plural projection optical units 240*a* and 240*b* are provided over the plural planes.

The plural image generating units 230*a* and 230*b* and the plural projection optical units 240*a* and 240*b* line up substantially in a straight line. This makes it possible to efficiently house the plural image generating units 230*a* and 230*b* and the plural projection optical units 240*a* and 240*b* in the inside of the main body housing 250.

The optical axis APa of the projection optical unit 240*a* inclines at the angle θa to the opposite side of the direction in which the projection optical unit 240*b* is located. The optical axis APb of the projection optical unit 240*b* inclines at the angle θb to the opposite side of the direction in which the projection optical unit 240*a* is located. This makes it possible to project projection light on a wider range and realize an increase in the size of the video RP projected on the screen 280.

B. Other Embodiments

The embodiment of the invention is explained above. However, the invention is not limited by the embodiment. It goes without saying that the invention can be carried out in various forms without departing from the spirit of the invention. For example, the number of projecting units and imaging optical units is not limited to two and may be equal to or lager than three. Extending units that extend the main body housing 250 may be provided among the projecting units.

In this example, the extending and retracting unit is formed by the connection structure of the first and second housings 250*a* and 250*b* and the third housing 250*c* in the main body housing 250. However, in other embodiments, the extending and retracting unit may be formed by a repeated structure of a mountain fold and a valley fold (a bellows structure or an accordion structure) or an extension and retraction structure such as a slide rail or a pantograph.

In this example, the main body housing 250 is extended and retracted in the two stages of holding the retracted state with the first recess 391 and holding the extended state with the second recess 392. However, in other embodiments, the main body housing 250 may be extended and retracted in positions in three or more stages. In this example, the projections 390*a* and 390*b* are provided in the first housings 250*a* and 250*b* and the first recess 391 and the second recess 392 are provided in the third housing 250*c*. However, in other embodiments, the projections 390*a* and 390*b* of the first housings 250*a* and 250*b* may be replaced with recesses and the first recess 391 and the second recess 392 of the third housing 250*c* may be replaced with projections.

In this example, the extension and retraction detecting units 370*a* and 370*b* include the pressing switches. However, in other embodiments, an extension/retraction distance of the main body housing 250 may be detected by a displacement sensor or a position sensor that detects the extension/retraction distance using magnetism or light.

In this example, the extending and retracting unit that extends or retracts the main body housing 250 is manually operated by the user to extend or retract the main body housing 250. However, in other embodiments, the extending and retracting unit may extend or retract the main body housing 250 using an electric motor on the basis of an instruction of the main control unit 300.

In this example, the two light source units 220*a* and 220*b* are provided to respectively correspond to the two image generating units 230*a* and 230*b*. However, in other embodiments, a light source unit that supplies light to both the image generating unit 230*a* and the image generating unit 230*b* in common may be provided. This makes it possible to prevent lights supplied to the plural image generating units 230*a* and 230*b* from becoming non-uniform because of an individual difference of a light source. As a result, it is possible to suppress color unevenness and luminance unevenness between the plural partial videos RPa and RPb respectively projected from the plural projection optical units 240*a* and 240*b*.

A plane for arranging the projecting units in the main body housing 250 is not limited to the top surface 251. The projecting units may be arranged on any one of the bottom surface 252, the front surface 253, the back surface 254, the left side 255, and the right side 256 according to the setting form of the projector, an external shape of the projector, relative positions of the projector and the screen, and the like or may be arranged over two or more planes. In this example, the projecting units and the imaging optical units are arranged substantially in a straight line. However, in other embodiments, the projecting units and the projection optical units may be arranged in a lattice shape in which vertical columns and horizontal columns cross each other.

The projecting units are not limited to projection lens units in which plural lenses are arrayed. The projecting units may be optical units that reflect projection lights generated by the imaging optical units to the screen 280 using at least one of an aspherical lens, a magnifying lens, a diffusion glass, an aspherical mirror, and a reflection mirror.

In FIGS. 6 and 7, the video RP is projected in the state in which the projector 210 is placed on the stand or the floor.

However, the video RP may be projected in a state in which the projector 210 is hung from the ceiling or may be projected in a state in which the projector 210 is set on the wall.

Third Embodiment

A. Example C1

A1. Apparatus Configuration

Figure 12:
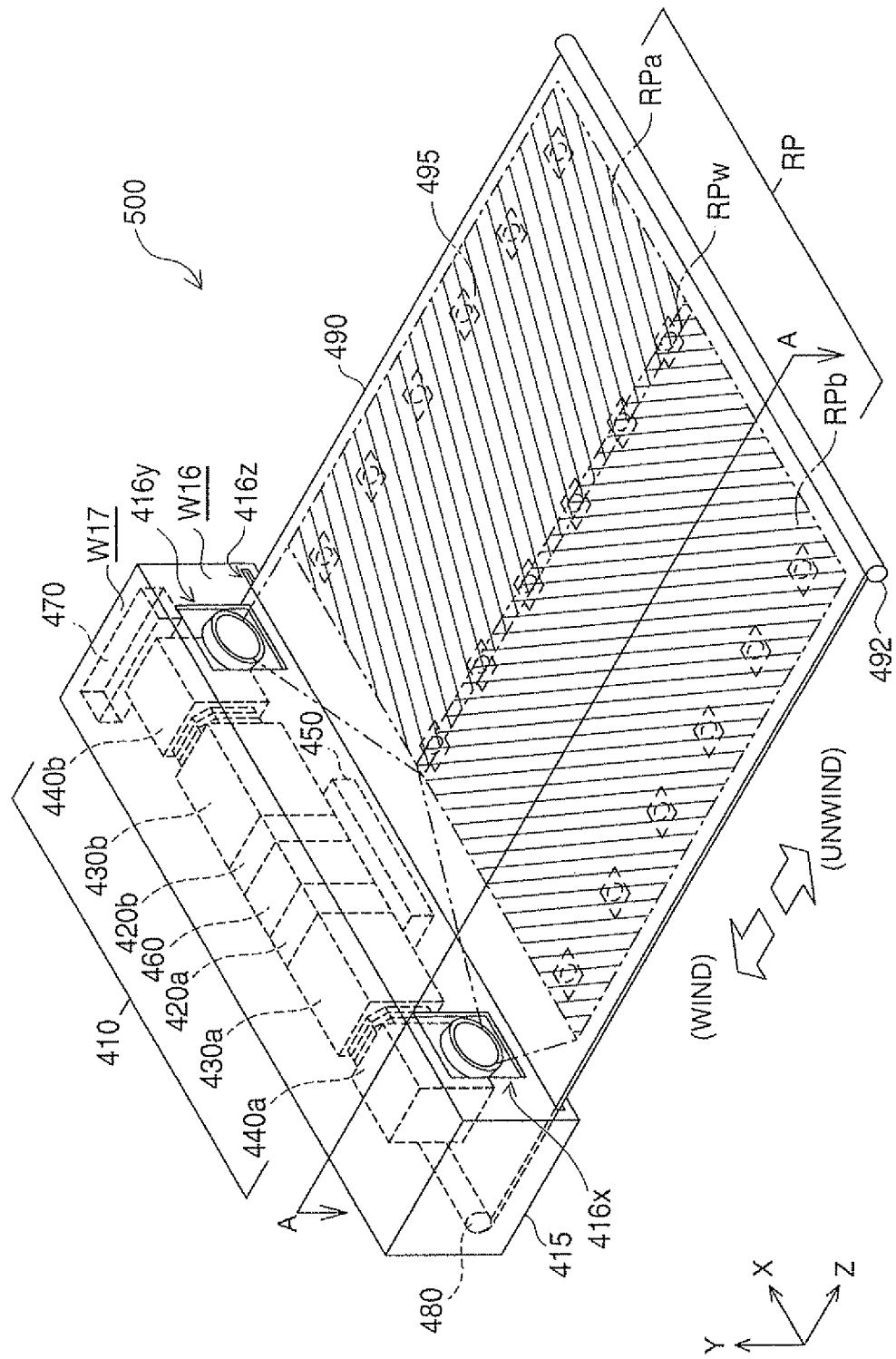
FIG. 12 is a diagram for explaining the schematic configuration of an image projection system according to a third embodiment of the invention.

FIG. 12 is a diagram for explaining a schematic configuration of an image projection system as an example of the invention. An image projection system 500 projects an image and an image on a screen 490 and outputs sound using the screen 490. In this example, the screen 490 is drawn out from the inside of a main body housing 415, unwound, and used. In the example shown in FIG. 12, the video RP projected by the image projection system 500 is an image obtained by joining the two partial images RPa and RPb. The overlapping area RPw where the two partial images RPa and RPb overlap each other is formed in the seam of the partial image RPa and the partial image RPb.

The image projection system 500 includes the main body housing 415, a projecting unit 410, a screen 490, a screen winding unit 480, an oscillating-element-for-speaker driving unit 450, and an external interface unit 470. The main body housing 415 has a hexahedron shape and has three openings 416x, 416y, and 416z in a front surface W16.

The projecting unit 410 is a projector arranged in the main body housing 415 and has the structure formed by combining two projecting mechanisms. Specifically, the projecting unit 410 includes two light source units (a first light source unit 420a and a second light source unit 420b), two imaging optical unit (a first imaging optical unit 430a and a second imaging optical unit 430b), two projection optical units (a first projection optical unit 440a and a second projection optical unit 440b), and a control unit 460. The detailed configuration of the projecting unit 410 is explained later. With such structure, the projecting unit 410 emits image light from the two openings 416x and 416y. In the example shown in FIG. 12, the first projection optical unit 440a emits image light from the opening 416x and projects the partial image RPa on the screen 490. Similarly, the second projection optical unit 440b emits image light from the opening 416y and projects the partial image RPb on the screen 490.

The screen 490 is formed of a sheet-like member that can be wound. Specifically, the screen 490 has the structure obtained by superimposing two sheets. Of the two sheets, a sheet forming a projection area on which an image (a video) is projected when the sheet is unwound is formed as a diffusion type screen with the surface processed into a white mat. One end of the screen 490 is connected to a screen winding unit 480 and the other end is connected to a columnar support member 492. The screen 490 can be wound and housed in the main body housing 415. When the screen 490 is housed, the support member 492 is present in the position of the opening 416z. When a user attempts to project an image (a video), the user can draw out the screen 490 from the opening 416z by pulling the support member 492 in a +Z direction. When the screen 490 is drawn out to the maximum, the screen winding unit 480 maintains an unwound state.

Plural oscillating elements 495 for a speaker are arranged at a predetermined interval between the two sheets included in the screen 490. In the example shown in FIG. 12, three columns in total each including six oscillating elements 495 are formed in the center and at both the ends of the screen 490. In each of the columns, the oscillating elements 495 are arranged at the predetermined interval along a Z direction. The oscillating elements 495 are bonded to the screen 490. Arrangement positions of the oscillating elements 495 in the screen 490 are fixed. Each of the oscillating elements 495 includes an excitation plate, an oscillator, and a voice coil that surrounds the oscillator (all of which are not shown in the figure). The oscillating elements 495 cause the oscillator to oscillate on the basis of an input electric signal and transmits this oscillation to the screen 490 via the excitation plate. The screen 490 oscillates according to the oscillation transmitted from the excitation plate (not shown in the figure) and outputs sound.

The screen winding unit 480 includes a not-shown torsion spring and can wind the unwound screen 490. Specifically, in a state in which the screen 490 is drawn out to the maximum, when the user further pulls the support member 492 in the +Z direction, the screen winding unit 480 winds the screen 490 into the main body housing 415 using urging force of the torsion spring (not shown in the figure). As a specific configuration for such winding and unwinding of the screen 490, the publicly-known configuration (e.g., the configuration described in JP-A-9-279967) can be adopted.

The oscillating-element-for-speaker driving unit 450 is connected to the oscillating elements 495 and transmits sound signal to the oscillating elements 495. The external interface unit 470 is provided on the side 417 of the main body housing 415 and includes an interface for inputting sound and images and a button group for user operation.

Figure 13:
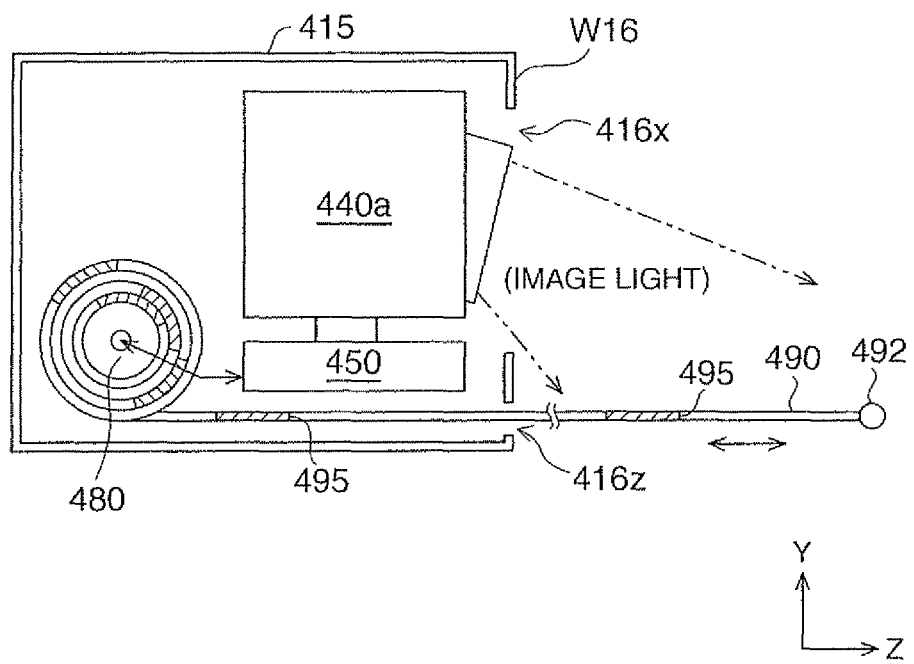
FIG. 13 is a diagram for explaining the image projection system taken along A-A section in FIG. 12.

FIG. 13 is a diagram for explaining the image projection system 500 taken along A-A section in FIG. 12. The first projection optical unit 440a emits image light from the opening 416x downward to the right. An emitting direction of the image light is set in advance such that a projected image (video) does not extend beyond the screen 490 in a state in which the screen 490 is unwound most.

The screen winding unit 480 is formed in a cylindrical shape. In the example shown in FIG. 12, a part of the screen 490 is wound by the screen winding unit 480. The oscillating-element-for-speaker driving unit 450 and the screen winding unit 480 are electrically connected. The screen winding unit 480 and the oscillating elements 495 are electrically connected. Therefore, the oscillating-element-for-speaker driving unit 450 is electrically connected to the oscillating elements 495 via the screen winding unit 480.

Figure 14:
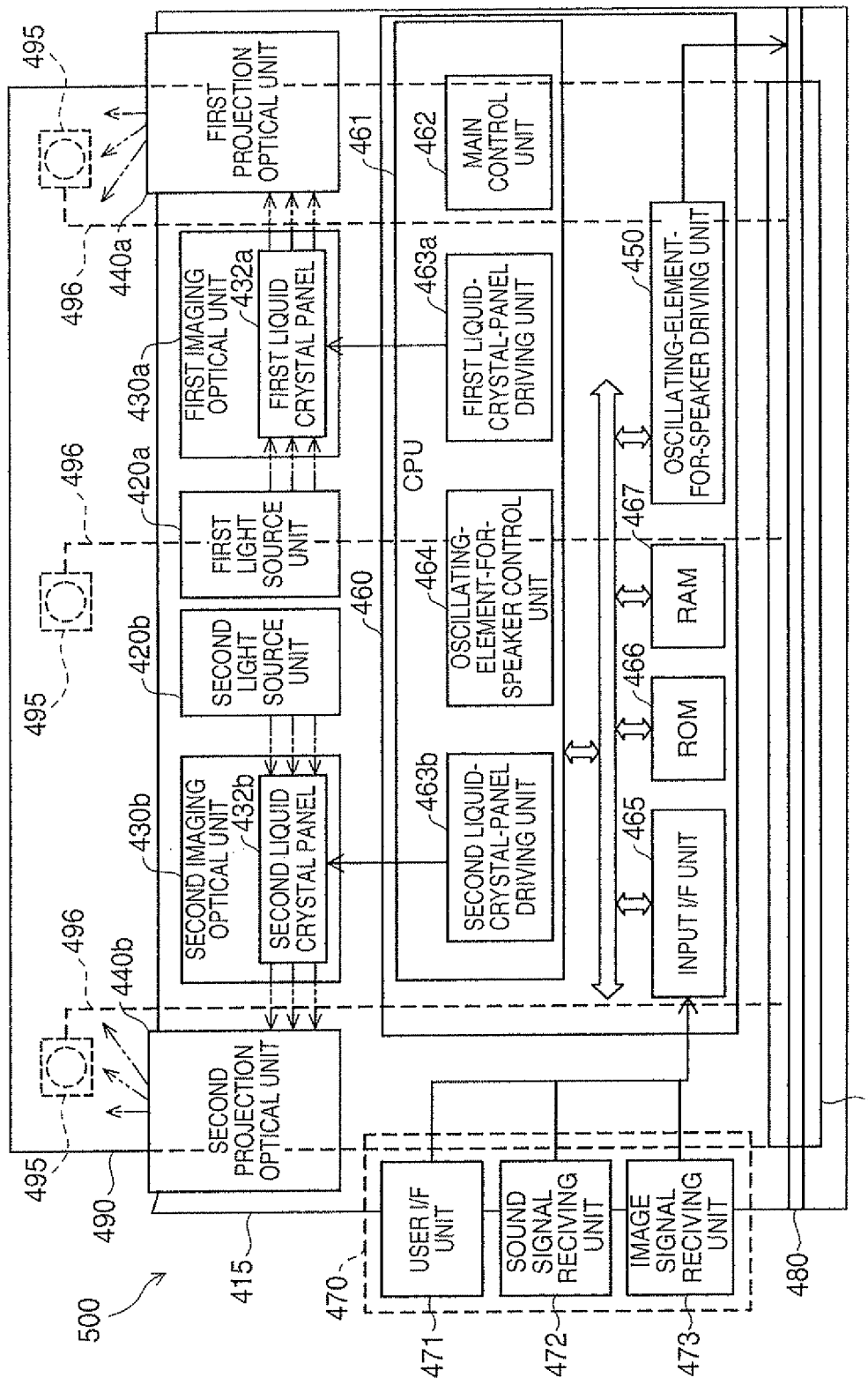
FIG. 14 is a diagram for explaining the detailed configuration of the image projection system.
Figure 15A:
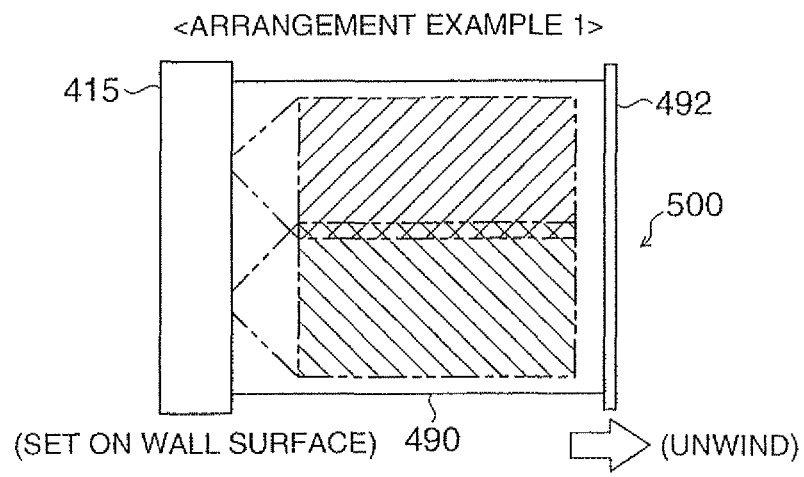
FIG. 15A is a diagram for explaining an arrangement example of the image projection system.
Figure 15B:
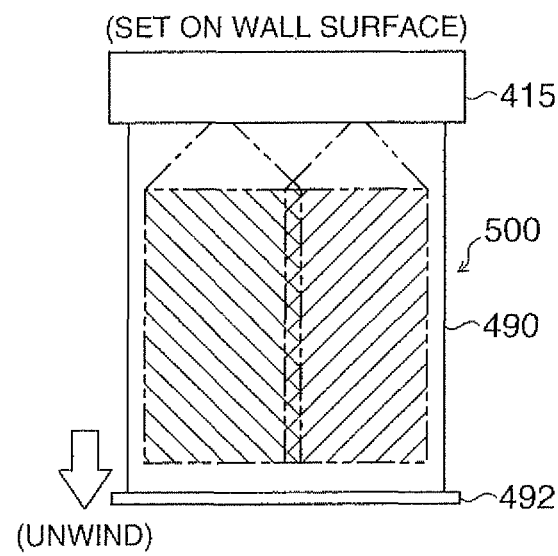
FIG. 15B is a diagram for explaining an arrangement example of the image projection system.
Figure 15C:
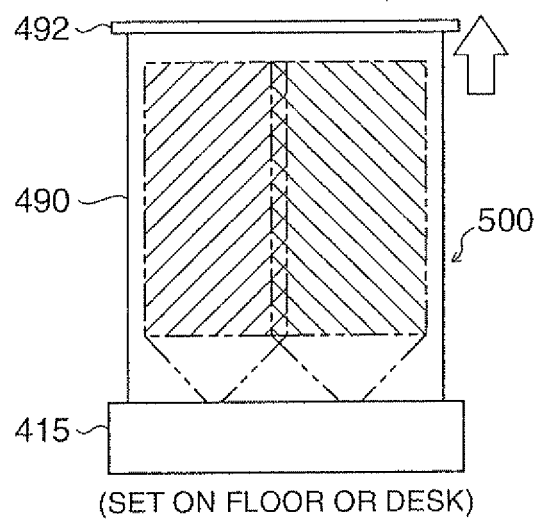
FIG. 15C is a diagram for explaining an arrangement example of the image projection system.
Figure 15D:
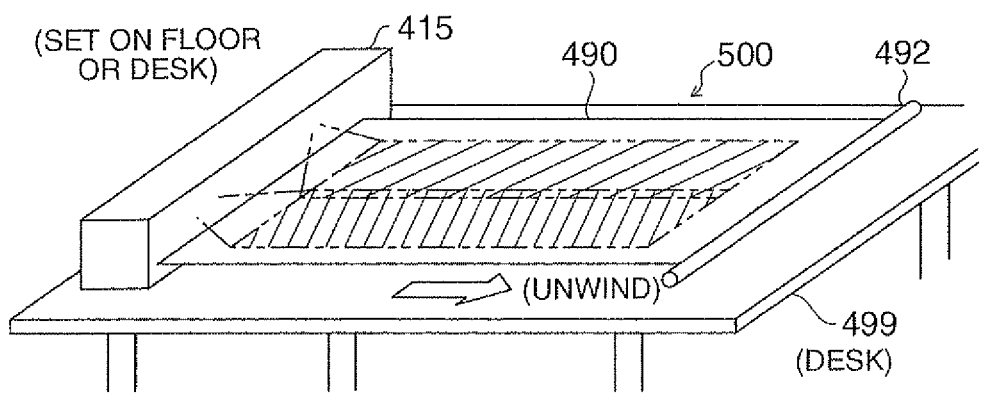
FIG. 15D is a diagram for explaining an arrangement example of the image projection system.

FIG. 14 is a diagram for explaining the detailed configuration of the image projection system 500. The image projection system 500 includes a control unit 460 in addition to the main body housing 415, the projecting unit 410 (the control unit 460, the two light source units 420a and 420b, the two imaging optical units 430a and 430b, and the two projection optical units 440a and 440b), the screen 490, the screen winding unit 480, the oscillating-element-for-speaker driving unit 450, and the external interface unit 470.

The control unit 460 includes an input interface unit 465, a CFU 461, a ROM 466, and a RAM 467. The input interface unit 465 converts an input sound signal or image signal into a format processable by the CPU 461. A projection control program is stored in the ROM 466. The CPU 461 executes the projection control program to thereby function as a main control unit 462, two liquid crystal panel driving units (a first liquid-crystal-panel driving unit 463a and a second liquid-crystal-panel driving unit 463b), and an oscillating-element-for-speaker control unit 464. The main control unit 462 executes overall control of the image projection system 500. The two liquid-crystal-panel driving units 463a and 463b respectively drive liquid crystal panels explained later. The oscillating-element-for-speaker control unit 464 controls the oscillating-element-for-speaker driving unit 450. Specifically, the oscillating-element-for-speaker control unit 464 instructs the oscillating-element-for-speaker driving unit 450 what kind of sound signal should be given to the oscillating elements 495. The oscillating-element-for-speaker driving unit 450 amplifies a sound signal transmitted from the oscillating-element-for-speaker control unit 464 and transmits the sound signal to the oscillating elements 495 via the screen winding unit 480 and internal wiring 496. The screen winding unit 480 is connected to the oscillating elements 495 via the internal wiring 496. The internal wiring 496 is arranged between the two sheets included in the screen 490.

The external interface unit 470 includes a user interface unit 471, a sound signal receiving unit 472, and an image signal receiving unit 473. The user interface unit 471 includes operation buttons and an operation panel (not shown in the figure) and enables display of a menu screen and operation by the user. The user interface unit 471 includes an infrared interface that receives infrared input from a not-shown remote controller. The sound signal receiving unit 472 includes terminals for sound input (e.g., a RCA terminal and an optical digital terminal). The image signal receiving unit 473 includes terminals for image input (e.g., an S terminal and a D terminal). All of the user interface unit 471, the sound signal receiving unit 472, and the image signal receiving unit 473 are connected to the input interface unit 465.

The first light source unit 420a includes a light source lamp and a reflector not shown in the figure and emits illumination light to the first imaging optical unit 430a. As the light source lamp, for example, an ultra-high pressure mercury lamp (UHE lamp) and a light emitting diode (LED) can be adopted. The first imaging optical unit 430a includes a first liquid crystal panel 432a and modulates the illumination light into image light. Not only a liquid crystal panel but also an arbitrary light modulating device can be used. For example, a digital micro-mirror device (DMD (registered trademark)) can also be used.

The first imaging optical unit 430a includes an integrator lens, a dichroic mirror, and a dichroic prism (all of which are not shown in the figure) and transmits the image light to the first projection optical unit 440a. The first projection optical unit 440a includes a not-shown projection lens and emits the image light in a direction decided in advance (see FIG. 13). The second light source unit 420b has a configuration same as that of the first light source unit 420a explained above. Similarly, the second imaging optical unit 430b has a configuration same as that of the first imaging optical unit 430a. The second projection optical unit 440b has a configuration same as that of the first projection optical unit 440a. The second imaging optical unit 430b includes a second liquid crystal panel 432b.

The projecting unit 410 is equivalent to a projector in claims. A set including the first light source unit 420a, the first imaging optical unit 430a, and the first projection optical unit 440a and a set including the second light source unit 420b, the second imaging optical unit 430b, and the second projection optical unit 440b are equivalent to a projecting mechanism in claims. A side connected to the support member 492 and a side formed by the opening 416z in the screen 490 are equivalent to "two opposed sides, length of which is not changed by winding and unwinding of the sheet-like screen" in claims.

A2. Image Projecting Operation

When an image signal is input from an apparatus (e.g., a DVD player or a personal computer) connected to the image signal receiving unit 473 (FIG. 14), the input interface unit 465 A/D (analog/digital)-converts the input image signal, converts the image signal into image data of a predetermined format, and stores the image data in the RAM 467.

The main control unit 462 generates partial images on the basis of the image data stored in the RAM 467 and transmits the image data of the partial images to the two liquid-crystal-panel driving units 463a and 463b. Specifically, the main control unit 462 transmits image data of the partial image RPa (FIG. 12) to the first liquid-crystal-panel driving unit 463a and transmits image data of the partial image RPb to the second liquid-crystal-panel driving unit 463b. Generation of the partial images RPa and RPb can be executed by using, for example, data of pixels in a predetermined range among the image data stored in the RAM 467. In generating the image data of the partial images RPa and RPb, the main control unit 462 generates the overlapping area RPw as, for example, an image of a comb tooth shape or a mosaic shape. This allows the two partial images RPa and RPb to complement each other to form one image such that the seam thereof is not conspicuous. The main control unit 462 transforms the shape of an image and performs so-called keystone correction. The first liquid-crystal-panel driving unit 463a drives the first liquid crystal panel 432a on the basis of the received image data of the partial images. Similarly, the second liquid-crystal-panel driving unit 463b drives the second liquid crystal panel 432b on the basis of the received image data of the partial images.

The first liquid crystal panel 432a modulates illumination light emitted from the first light source unit 420a and generates image light on the basis of a signal received from the first liquid-crystal-panel driving unit 463a. As explained above, the first projection optical unit 440a emits the image light and the partial image RPa (FIG. 12) is shown on the screen 490. Similarly, the second liquid crystal panel 432b modulates illumination light emitted from the second light source unit 420b and generates image light on the basis of a signal received from the second liquid-crystal-panel driving unit 463b. The second projection optical unit 440b emits the image light and the partial image RPb is shown on the screen 490. In the two projection optical units 440a and 440b, the image RP is zoom-adjusted in advance and focus-adjusted in advance to be shown in a predetermined size on the screen 490 unwound to the maximum.

A3. Sound Output Operation

When a sound signal is input from an apparatus connected to the sound signal receiving unit 472 (FIG. 14), the input interface unit 465 A/D (analog/digital)-converts the input sound signal. The oscillating-element-for-speaker control unit 464 generates a sound signal given to the oscillating elements 495 on the basis of sound data after the digital conversion. The oscillating-element-for-speaker driving unit 450 transmits an electric signal for driving to the oscillating elements 495 on the basis of the sound signal generated by the oscillating-element-for-speaker control unit 464. The oscillating elements 495 cause the screen 490 to oscillate on the basis of the received driving signal. In this way, sound is output from the entire screen 490 in time to the image shown on the screen 490.

A4. Setting Example

FIGS. 15A, 15B, 15C, and 15D are diagrams for explaining arrangement examples of the image projection system 500. Four arrangement examples (arrangement examples 1 to 4) are respectively shown in the figures. In the arrangement example 1, the main body housing 415 is set on a wall surface such that a longitudinal direction thereof is parallel to the vertical direction. The setting on the wall surface can be realized by, for example, setting a support fitting (not shown in the figure) on the wall surface in advance and, in attempting to project an image (a video), attaching the main body housing 415 to the support fitting. In the arrangement example 1, the user can draw out the screen 490 sideways (in the right direction) and unwind the screen 490. The unwound state of the screen 490 can be maintained by attaching the support member 492 to a hook (not shown in the figure) provided on the wall surface.

In the arrangement example 2, the main body housing 415 is arranged on the wall surface such that the longitudinal direction is parallel to the horizontal direction. In the arrangement example 2, the user can slide the screen 490 downward and unwind the screen 490. A method of setting the main body housing 415 in the arrangement example 2 can be the same as that in the arrangement example 1. In the arrangement example 3, the main body housing 415 is set on a floor or a desk. In the arrangement example 3, the user can draw out the screen 490 upward and unwind the screen 490. A method of maintaining the unwound state of the screen 490 can be the same as that in the arrangement example 1.

In the arrangement example 4, the main body housing 415 is set on a top plate of a desk 499. In the arrangement example 4, the user can draw out the screen 490 in parallel to the top plate of the desk 499. Unlike the arrangement examples 1 and 3, the unwound state of the screen 490 can be maintained unless the support member 492 is attached to the hook (not shown in the figure). In the arrangement example 4, the user can easily project an image by drawing out the screen 490 placing the carried image projection system 500 (the main body housing 415) on the desk. In the arrangement example 4, a person who views an image can view the image in the manner of looking down the screen 490 while standing around the desk.

As explained above, in the image projection system 500 in the example C1, the projecting unit (the projector) can be arranged in the main body housing 415 and the screen 490 can be wound and housed in the main body housing 415. Therefore, the user can easily carry the projecting unit (the projector) and the screen 490. The projection optical units 440a and 440b are zoom-adjusted and focus-adjusted in advance such that the image RP is shown in a suitable state when the screen 490 is unwound to the maximum. Therefore, the user does not have to perform adjustment for projection. Consequently, even when the image projection system 500 (the main body housing 415) is arranged in various positions, the user can easily set a positional relation between the projector and the screen 490 in a suitable state simply by drawing out the screen 490.

In the image projection system 500, since the screen 490 functions as the speaker, it is possible to easily construct an environment for sound reproduction compared with a configuration in which a speaker device is prepared separately from the image projection system 500. Since the screen 490 is caused to function as the speaker, it is possible to secure a large acoustic area and perform large-volume sound output. Since the oscillating elements 495 are arranged in the inside of the screen 490, it is possible to make it easy to wind the screen 490 compared with a configuration in which the oscillating elements 495 are arranged on the front surface or the rear surface of the screen 490. Further, in the image projection system 500, since the projecting mechanisms (the two light source units 420a and 420b, the two imaging optical units 430a and 430b, and the two projection optical units 440a and 440b) are arranged in a straight line, it is possible to efficiently house the projecting mechanism in the inside of the main body housing 415. A large space can be secured between two image lights by arrange the projecting mechanisms to line up in a straight line. Therefore, even if a projecting distance between the main body housing 415 and the screen 490 is small, it is possible to project the image RP in a large size. The two projection optical units 440a and 440b project image lights from the same front surface W16. Therefore, it is possible to reduce a load on the user for aligning partial images compared with a configuration in which image lights are emitted from different surfaces.

B. Example C2

Figure 16:
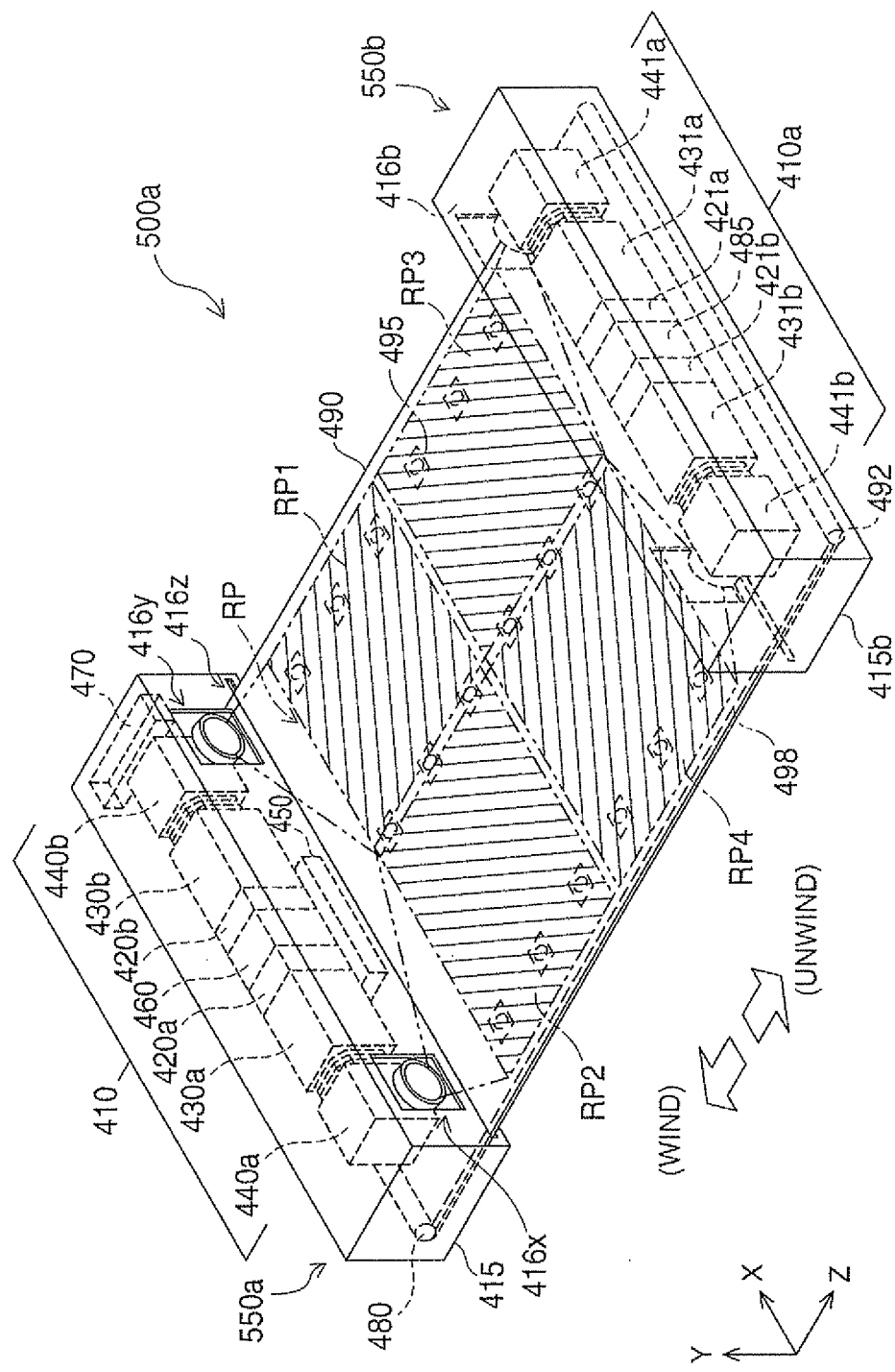
FIG. 16 is a diagram for explaining the schematic configuration of an image projection system in an example C2.

FIG. 16 is a diagram for explaining a schematic configuration of an image projection system in an example C2. An image projection system 500a in the example C2 is different from the image projection system 500 in the example C1 (FIG. 12) in that projecting units (projectors) are provided at both the ends of the screen 490 and in that an image is divided into four and projected. Otherwise, the image projection system 500a is the same as the image projection system 500 in the example C1.

Specifically, a second main body housing 415b that houses a second projecting unit 410a is arranged to be opposed to the main body housing 415 (in this example, hereinafter referred to as first main body housing 415) across the screen 490. The second projecting unit 410a has a configuration same as that of the projecting unit 410 (in this example, hereinafter referred to as first projecting unit 410). The support member 492 is fixed in the first main body housing 145. A user can unwind the screen 490 by moving the second main body housing 415b in the +Z direction. The first main body housing 415 and functional units housed in the first main body housing 415 are referred to as first projection unit 550a. The second main body housing 415b and functional units housed in the second main body housing 415b are referred to as second projection unit 550b.

The image projection system 500a projects four partial images on the screen 490 and joins the partial images to project one image. In the example shown in FIG. 16, the image projection system 500a joins four partial images RP1 to RP4 to project the image RP. Processing same as that in the example C1 is applied to an overlapping area where the partial images overlap one another to prevent a seam of the partial images from becoming conspicuous.

Figure 17:
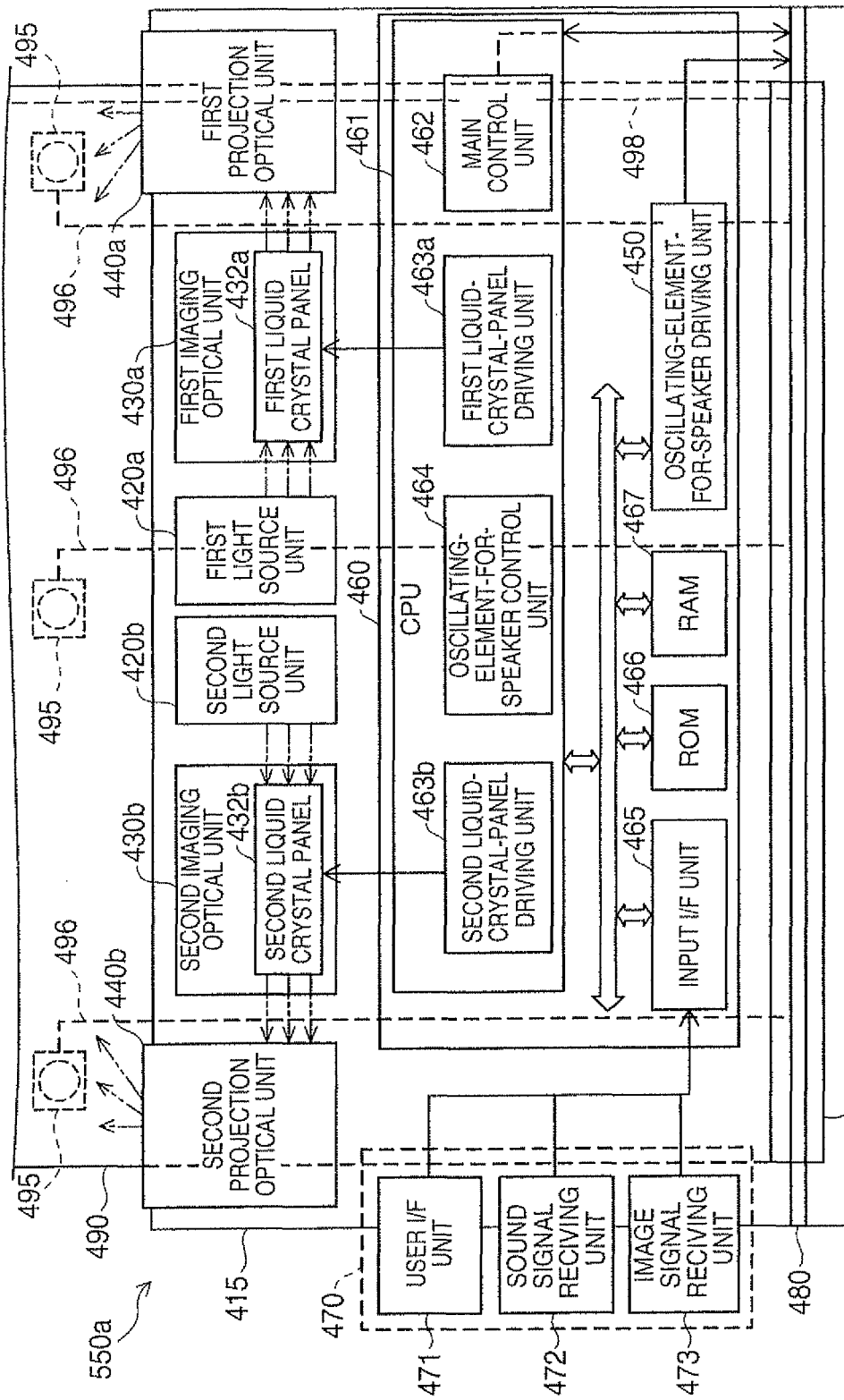
FIG. 17 is a diagram for explaining the detailed configuration of a first projection unit shown in FIG. 16.

FIG. 17 is a diagram for explaining the detailed configuration of the first projection unit 550a shown in FIG. 16. The first projection unit 550a is different from the image projection system 500 in the example C1 (FIG. 14) in that a signal line 498 is embedded in the inside of the screen 490 and in that the signal line 498 is connected to the CPU 461 via the screen winding unit 480. Otherwise, the first projection unit 550a is the same as the image projection system 500. The signal line 498 mediates exchange of signals between the first projection unit 550a and the second projection unit 550b.

Figure 18:
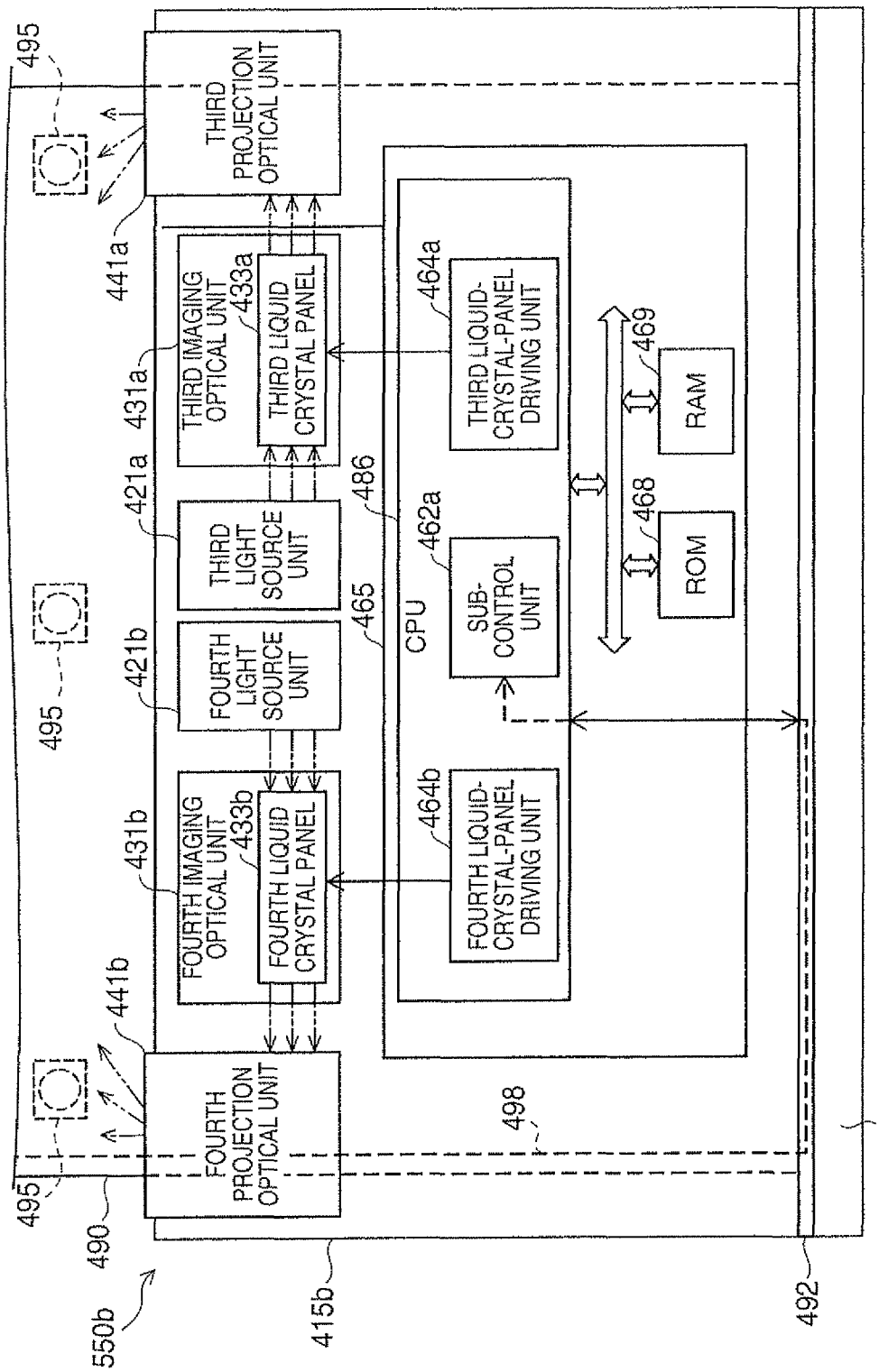
FIG. 18 is a diagram for explaining the detailed configuration of a second projection unit shown in FIG. 16.

FIG. 18 is a diagram for explaining the detailed configuration of the second projection unit 550b shown in FIG. 16. The second projection unit 550b is different from the first projection unit 550a (FIG. 17) in seven points explained below. Otherwise, the second projection unit 550b is the same as the first projection unit 550a. The differences are that the second projection unit 550b does not include the external interface unit 470, does not include the input interface unit 465, does not include the oscillating-element-for-speaker driving unit 450, does not include the oscillating-element-for-speaker control unit 464, does not include the internal wiring 496 and the second projection unit 550b includes the support member 492 as explained above and includes a sub-control unit 462a instead of the main control unit 462.

The second projection unit 550b includes a third light source unit 421a corresponding to the first light source unit 420a in the first projection unit 550a. Similarly, the second projection unit 550b includes a third imaging optical unit 431a corresponding to the first imaging optical unit 430a, a third liquid crystal panel 433a corresponding to the first liquid crystal panel 432a, a third projection optical unit 441a corresponding to the first projection optical unit 440a, a fourth light source unit 421b corresponding to the second light source unit 420b, a fourth imaging optical unit 431b corresponding to the second imaging optical unit 430b, a fourth liquid crystal panel 433b corresponding to the second liquid crystal panel 432b, and a fourth projection optical unit 441b corresponding to the second projection optical unit 440b.

In the second projection unit 550b, a control unit 485 includes a CPU 486, a ROM 468, and a RAM 469. The CPU 486 executes a program for projection control stored in the ROM 468 to thereby function as a sub-control unit 462a, a third liquid-crystal-panel driving unit 464a, and a fourth liquid-crystal-panel driving unit 464b. The signal line 498 is connected to the CPU 486 via the support member 492.

The sub-control unit 462a executes overall control of the second projection unit 550b. However, the main control unit 462 in the first projection unit 550a generates image (video) data. The sub-control unit 462a receives the image (video) data from the main control unit 462 via the signal line 498 and supplies the image (video) data to the two liquid-crystal-panel driving units 464a and 464b.

The image projection system 500a in the example C2 explained above realizes effects same as those of the image projection system 500 in the example C1. Since the image RP is divided into four and projected by using the four projecting mechanisms, even when a distance between the screen 490 and each of the projection optical units 440a, 440b, 441a, and 441b is small, it is possible to show the image RP in a large size.

C. Example C3

Figure 19:
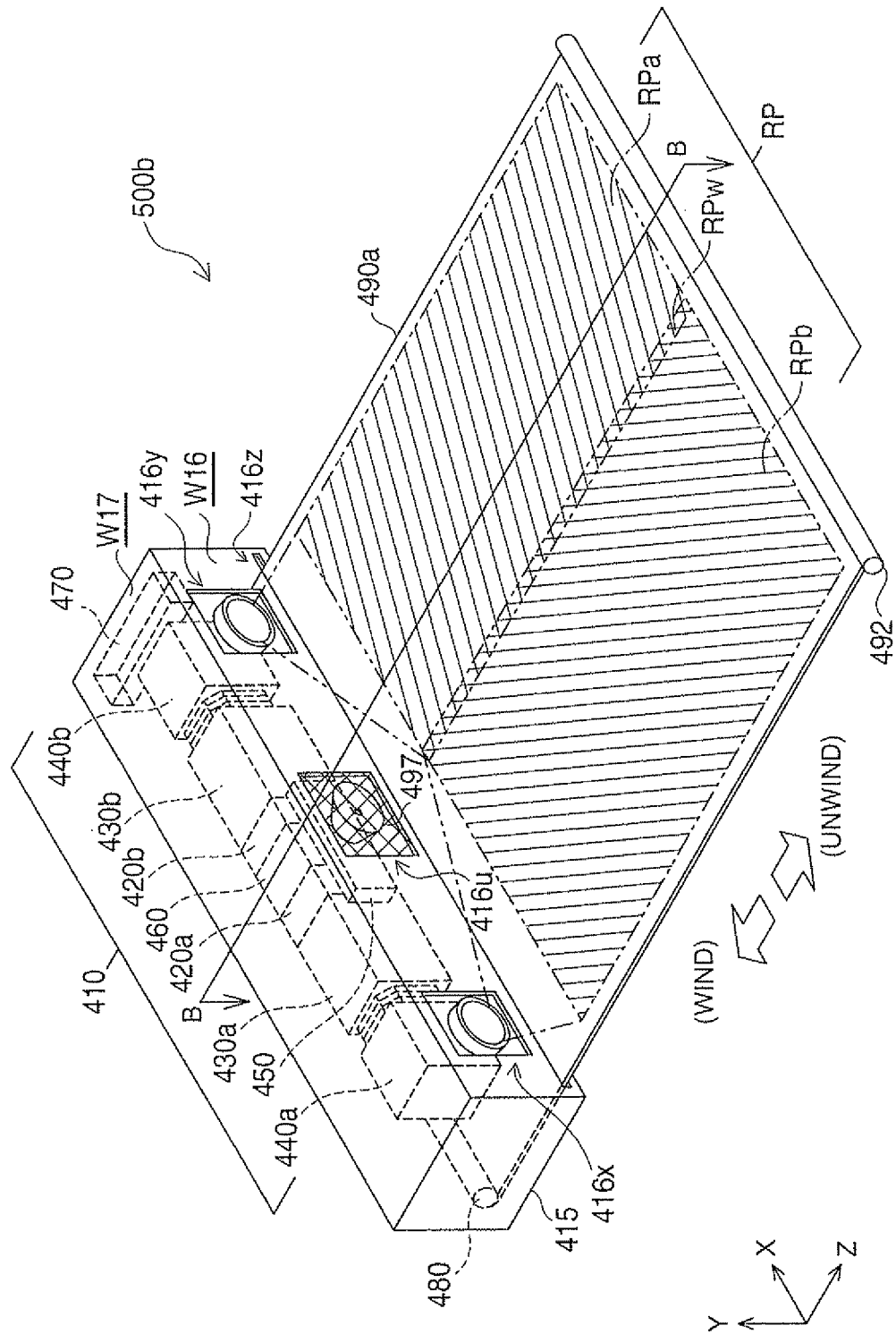
FIG. 19 is a diagram for explaining the schematic configuration of an image projection system in an example C3.

FIG. 19 is a diagram for explaining a schematic configuration of an image projection system in an example C3. An image projection system 500b in the example C3 is different from the image projection system 500 (FIG. 12) in a setting position of oscillating elements for a speaker. Otherwise, the image projection system 500b is the same as the image projection system 500 in the example C1.

Specifically, the image projection system 500b does not include the oscillating elements 495 in the inside of a screen 490a. Therefore, the screen 490a is formed by one sheet. The image projection system 500b includes an acoustic unit 497 in the inside of the main body housing 415. The acoustic unit 497 includes a speaker cone, oscillation elements for a speaker, and a voice coil (all of which are not shown in the figure). The acoustic unit 497 outputs sound according to an input electric signal from the oscillation-element-for-speaker driving unit 450. An opening 416u for a speaker is provided in the front surface W16 of the main body housing 415 in addition to the three openings 416x, 416y, and 416z.

Figure 20:
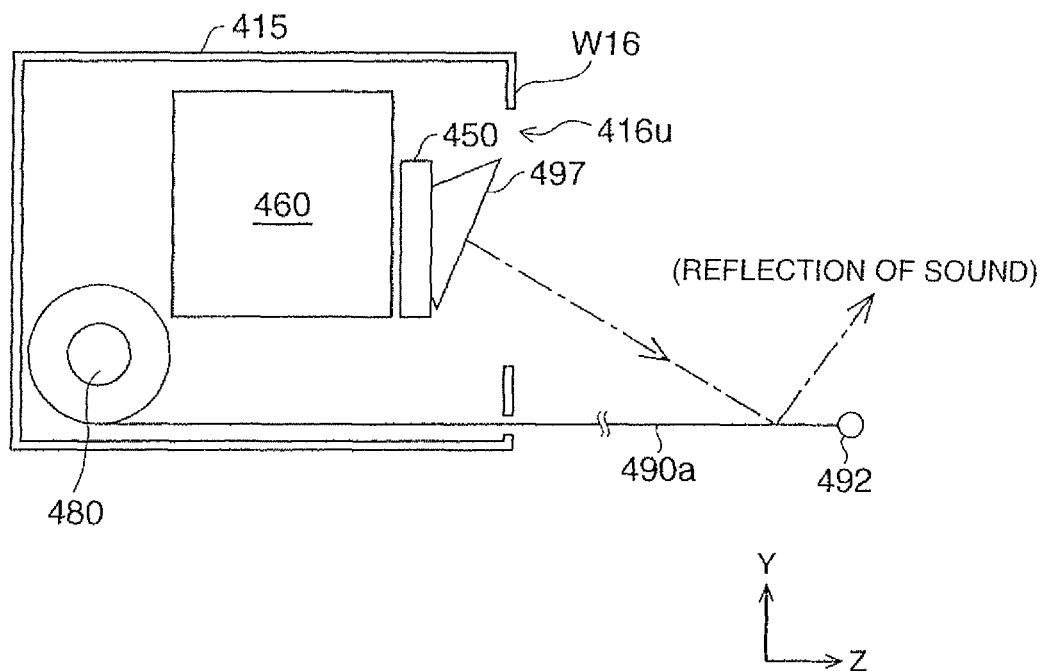
FIG. 20 is a diagram for explaining the image projection system taken along B-B section in FIG. 19.

FIG. 20 is a diagram for explaining the image projection system 500b taken along B-B section in FIG. 19. As in the example C1, in this example, the screen 490a functions as a part of a speaker. Specifically, the acoustic unit 497 outputs sound downward to the right. The screen 490a reflects the sound output from the acoustic unit 497 and outputs the sound to a viewer.

The image projection system 500b in the example C3 explained above realizes effects same as the image projection system 500 in the example C1. Since oscillating elements are not embedded in the screen 490a, the diameter of the screen 490a can be reduced when the screen 490a is wound. Therefore, it is possible to reduce a space for housing the screen 490a in the main body housing 415 and reduce the size of the entire image projection system 500b.

D. Example C4

Figure 21:
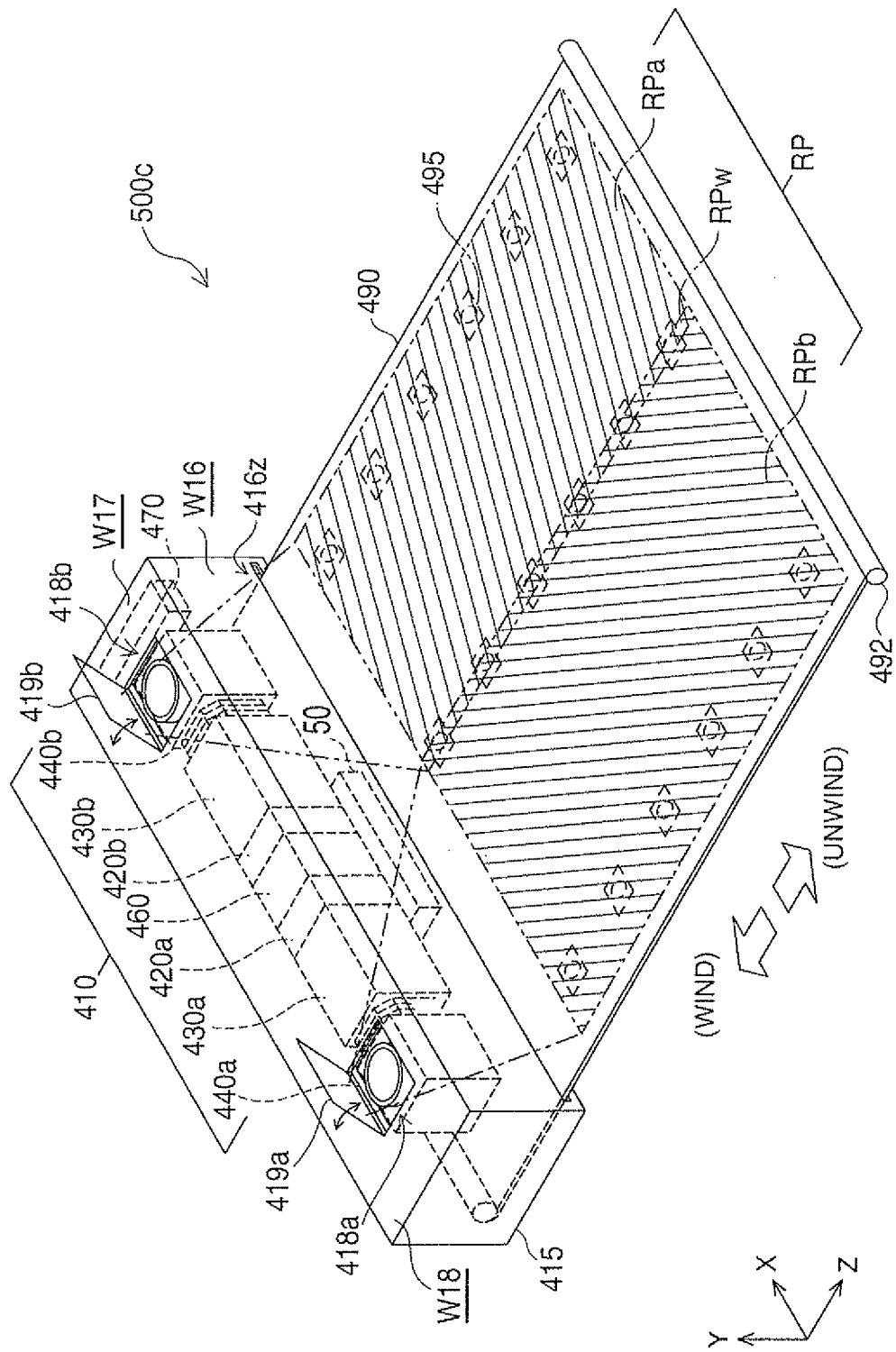
FIG. 21 is a diagram for explaining the schematic configuration of an image projection system in an example C4.

FIG. 21 is a diagram for explaining a schematic configuration of an image projection system in an example C4. An image projection system 500c in the example C4 is different from the image projection system 500 (FIG. 12) in that a surface from which light is emitted among the surfaces of the main body housing 415 is the top surface. Otherwise, the image projection system 500c is the same as the image projection system 500 in the example C1.

Specifically, the first projection optical unit 440a in the example C4 is configured by rotating the first projection optical unit 440a in the image projection system 500 in the example C1 (FIG. 12) 90 degrees with an X axis as a rotation axis. Similarly, the second projection optical unit 440b in the example C4 is configured by rotating the second projection optical unit 440b in the image projection system 500 in the example C1 (FIG. 12) 90 degrees with the X axis as the rotation axis.

Two openings 418a and 418b for emitting image light are provided in a top surface W18 of the main body housing 415. Two projection mirrors 419a and 419b are provided in the main body housing 415. The projection mirror 419a has a rectangular shape and the rear surface of the projection mirror 419a is formed as a mirror. The lower side of the projection mirror 419a is set in contact with one side (a side parallel to the X axis) of the opening 418a. The projection mirror 419a is attached to the main body housing 415 to be rotatable with the lower side as an axis. A user can reflect image light using the mirror of the rear surface by lifting the projection mirror 419a. The user can close the opening 418a using the projection mirror 419a by pushing up the projection mirror 419a to be parallel to the top surface W18. The projection mirror 419b has a configuration same as that of the projection mirror 419a.

In the example shown in FIG. 21, image light emitted upward from the first projection optical unit 440a is reflected by the projection mirror 419a and travels to the screen 490. The partial image RPb is shown on the screen 490 by the image light. Similarly, image light emitted upward from the second projection optical unit 440b is reflected by the projection mirror 419b and travels to the screen 490. The partial image RPa is shown on the screen 490 by the image light.

The image projection system 500c in the example C4 explained above realizes effects same as those of the image projection system 500 in the example C1. The image lights emitted from the two projection optical units 440a and 440b are reflected by using the two projection mirrors 419a and 419b and caused to travel to the screen 490. Therefore, it is possible to increase a projection distance of the image lights (an optical distance from the two projection optical units 440a and 440b to the screen 490) and show a larger image (video) on the screen 490.

E. Modifications

Elements other than elements claimed in independent claims among the components in the examples are additional elements and can be omitted as appropriate. The invention is not limited to the examples and the embodiments. The invention can be carried out in various forms without departing from the spirit of the invention. For example, modifications explained below are also possible.

E1. Modification 1

In the example C1, the total number of oscillating elements 495 is eighteen. However, the number can be an arbitrary number. The image projection system 500 can adopt a configuration including no oscillating element 495. Even in such a configuration, since the screen 490 is wound and housed in the inside of the main body housing 415, the user can easily carry the projecting unit (the projector) and the screen 490. The user does not have to perform adjustment for projecting an image (a video) in a suitable state (size and focus).

E2. Modification 2

In the examples C1, C2, and C4, the oscillating elements 495 are arranged in the inside of the screen 490. However, instead, the oscillating elements 495 can also be arranged on the front surface or the rear surface of the screen 490. The oscillating elements 495 are arranged in the area where the image RP is shown. However, instead, the oscillating elements 495 can also be arranged in other areas. For example, the oscillating elements 495 can also be arranged in a margin area where the image RP is not shown in an area exposed by unwinding in the screen 490. A relatively large oscillating element (an actuator that oscillates the entire screen 490) can also be arranged in an area of the screen 490 unwound in the inside of the main body housing 415. Even in such a configuration, it is possible to cause the entire screen 490 to function as a speaker. In other words, in general, the image projection system of the invention can adopt an arbitrary screen functioning as a speaker employing oscillating elements.

E3. Modification 3

In the examples explained above, the number of projecting units (projectors) is one (the examples C1, C3, and C4) or two (the example C2). However, the number of projecting units is not limited to this and can be an arbitrary number. In other words, in general, the image projection system of the invention can adopt a configuration including an arbitrary number of projectors. The number of projecting mechanisms included in each of the projecting units can also be an arbitrary number. When the number of projecting units (projectors) is one and the number of projecting mechanisms is one, configuration for projecting an image without dividing the image can be adopted. When the projecting unit includes plural projecting mechanisms, an image can be projected without being divided. In this case, it is possible to emit image lights of different images from the projecting mechanisms and project plural images (videos).

In the example C2, the first projection unit 550a and the second projection unit 550b include the same number of (one) projecting unit (projector). However, instead, the first projection unit 550a and the second projection unit 550b can respectively include different numbers of projecting units. For example, the first projection unit 550a can include one projecting unit and the second projection unit 550b can include two projecting units. In other words, in general, the image projection system of the invention can adopt an arbitrary configuration in which plural projecting units (projectors) are provided, the plural projecting units are arranged in a distributed manner on two opposed sides, length of which is not changed by winding or unwinding, in an unwound area (a projection area) in the screen.

In the examples, the two projection optical units 440a and 440b (441a and 441b) emit image lights from the same surface. However, instead, the projection optical units 440a and 440b (441a and 441b) can also emit image lights from different surfaces. In the examples, the projecting unit 410 (410a) includes the two light source units 420a and 420b (421a and 421b). However, instead, the projecting unit 410 (410a) can also include one light source unit. In this case, illumination light emitted by the one light source unit can be distributed to the first imaging optical unit 430a and the second imaging optical unit 430b by using a prism or an optical fiber.

E4. Modification 4

In the examples explained above, the projecting mechanisms (the light source units, the imaging optical units, and the projection optical units) are arranged to line up in a straight line. However, an arrangement form of the projecting mechanisms is not limited to this. The projecting mechanisms can adopt an arbitrary arrangement form. For example, the functional units included in the projecting mechanisms can also be arranged in a lattice shape in which vertical columns and horizontal columns cross each other.

E5. Modification 5

In the examples explained above, the projection optical units 440a and 440b (441a and 441b) perform zoom adjustment and focus adjustment to show, in a predetermined size, the image RP on the screen 490 unwound to the maximum. However, the invention is not limited to this. For example, it is also possible to automatically adjust, according to the size of an area exposed by unwinding in the screen 490, the size, the aspect ratio, and the focus position of an image to be projected. Specifically, the screen 490 is configured to maintain a state of being unwound in an arbitrary position. The screen winding unit 480 is configured to detect the length (the length in the Z direction) of the screen 490 let out by the unwinding and notify the main control unit 462 of the length. The main control unit 462 is configured to adjust the size and the aspect ratio of an image and perform focus adjustment on the basis of the notified let-out amount of the screen 490. A correspondence relation between the led-out amount of the screen 490 and suitable size and aspect ratio of the image and a relation between the let-out amount of the screen 490 and a suitable focus adjustment amount are calculated by experiments in advance and stored in the ROM 466 as a table. The main control unit 462 can also be configured to determine, with the notified let-out amount of the screen 490 as a key, the size, the aspect ratio, and the focus adjustment amount of the image referring to the table.

E6. Modification 6

In the examples explained above, the sheet on the side on which an image (a video) is projected is formed as the diffusion screen, the surface of which is processed into the white mat. However, instead, the sheet can also be formed as other types of screens. For example, the sheet can also be formed as a diffusion screen, the surface of which is processed into a gray mat or a white recursive screen, the surface of which is inlaid with beads.

E7. Modification 7

In the examples explained above, the screens 490 and 490a are automatically wound by the torsion spring included in the screen winding unit 480. However, instead, the screens 490 and 490a can also be manually wound. In this case, for example, the screen winding unit 480 can also include a handle for winding the screens 490 and 490a. In such a configuration, the handle for screen winding is equivalent to a screen winding unit in claims. In the examples, the projection area of the rectangular shape in the unwound state is formed in the screen 490. However, the shape of the projection area is not limited to the rectangular shape and can be formed in an arbitrary shape.

E8. Modification 8

In the examples explained above, the image projection systems 500 and 500a to 500c output sound while projecting an image. However, instead, the image projection systems 500 and 500a to 500c can be configured to project an image (a still image) and not to output sound.

E9. Modification 9

In the examples explained above, the overlapping area is provided in the generation of the partial images RPa and RPb (RP1 to RP4). However, instead, it is also possible to generate the partial images without providing the overlapping area. In this case, it is desirable to adjust emitting directions of image lights in the projection optical units 440a and 440b (441a and 441b) to prevent the partial images RPa and RPb (RP1 to RP4) from overlapping on the screen 490.

E10. Modification 10

In the examples explained above, a part of the configuration realized by hardware may be replaced with software. Conversely, a part of the configuration realized by software may be replaced with hardware.

Fourth Embodiment

A. Example D1

A1. Configuration of a Projector System

Figure 22:
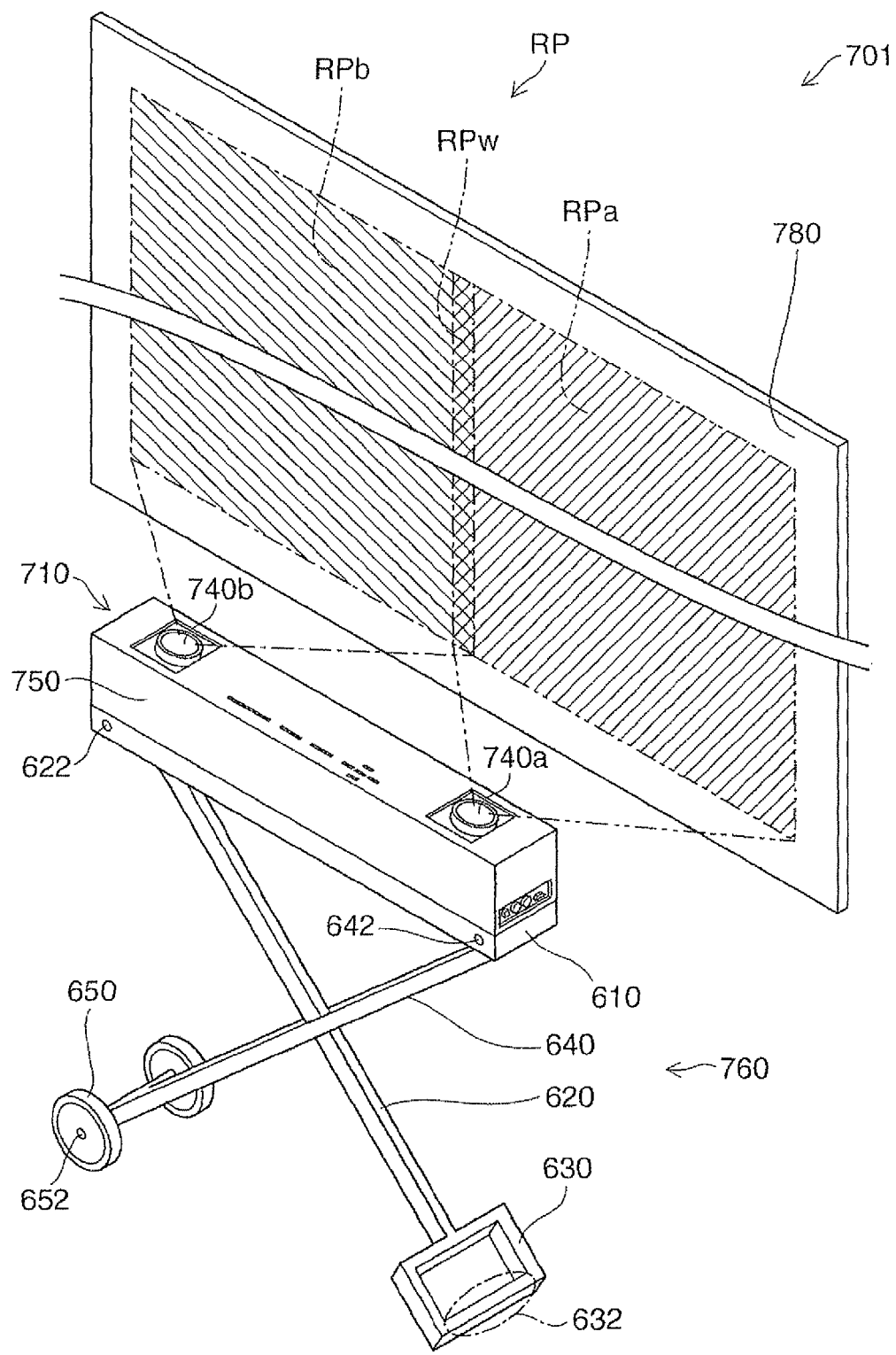
FIG. 22 is a diagram for explaining a state in which a projector according to a fourth embodiment of the invention is attached to a stand.
Figure 23:
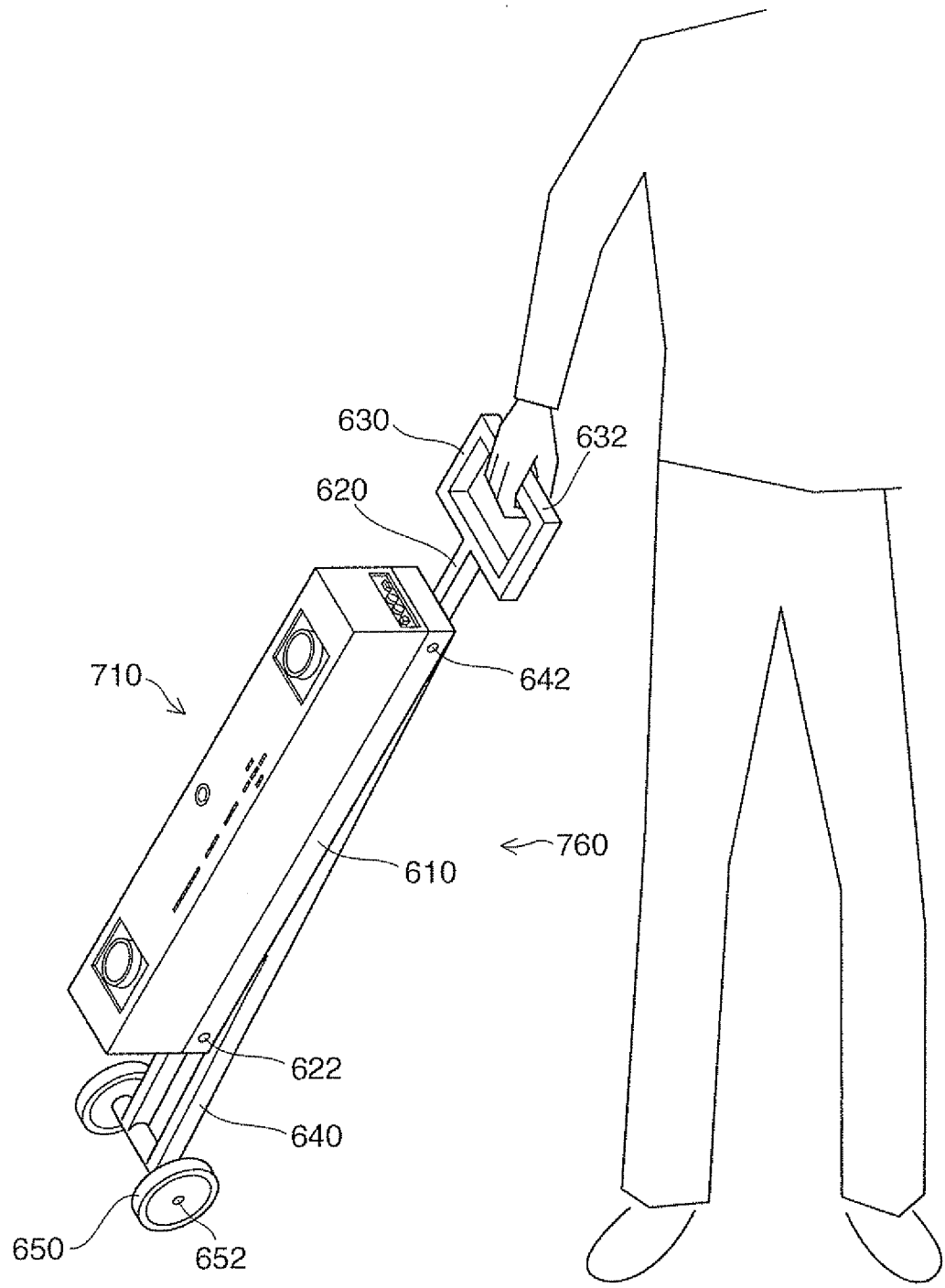
FIG. 23 is a diagram for explaining a state in which the projector attached to the stand is carried.

FIG. 22 is a diagram for explaining a state in which a projector 710 attached to a stand 760 is set. FIG. 23 is a diagram for explaining a state in which the projector 710 attached to the stand 760 is carried. A projector system 701 includes the projector 710, the stand 760, and a screen 780.

The projector 710 of the projector system 701 is set on the stand 760 and projects the image RP on the screen 780. The screen 780 of the projector system 701 is a plane on which the image RP is displayed. The screen 780 may be a movie screen or may be a wall surface. The projector 710 includes a main body housing 750 that houses various components of the projector 710. The main body housing 750 is integrally connected to the stand 760. In this example, the main body housing 750 of the projector 710 has a substantially square pole shape. The image RP is projected on the screen 780 in a state in which the square pole lies sideways. The detailed configuration of the projector 710 is explained later.

The stand 760 of the projector system 701 can be transformed into a setting form and a carrying form. As shown in FIG. 22, in the setting form, the stand 760 functions as a projector table on which the projector 710 is set. As shown in FIG. 23, in the carrying form, the stand 760 functions as a carrying device for carrying the projector 710. The stand 760 includes a pedestal 610 on which the projector 710 is installed, a first support leg 620 that supports the pedestal 610, a handle 630 provided in the first support leg 620, a second support leg 640 that supports the pedestal 610 in cooperation with the first support leg 620, and wheels 650 provided in the second support leg 640.

In the stand 760, the first support leg 620 and the second support leg 640 are connected to be foldable to the pedestal 610. In the setting form shown in FIG. 22, the first support leg 620 and the second support leg 640 are fixed in a state drawn out from the pedestal 610, the first support leg 620 is set in contact with the ground via the handle 630 to support the pedestal 610, and the second support leg 640 is set in contact with the ground via the wheels 650 to support the pedestal 610. In the carrying form shown in FIG. 23, the first support leg 620 and the second support leg 640 are fixed in a state folded to the pedestal 610 and the handle 630 and the wheels 650 project from the pedestal 610. In a state in which the stand 760 is transformed into the carrying form, it is possible to carry the projector 710 by gripping the handle 630 and tugging the stand 760 while keeping the wheels 650 set in contact with the ground.

A2. Detailed Configuration of the Stand

Figure 24:
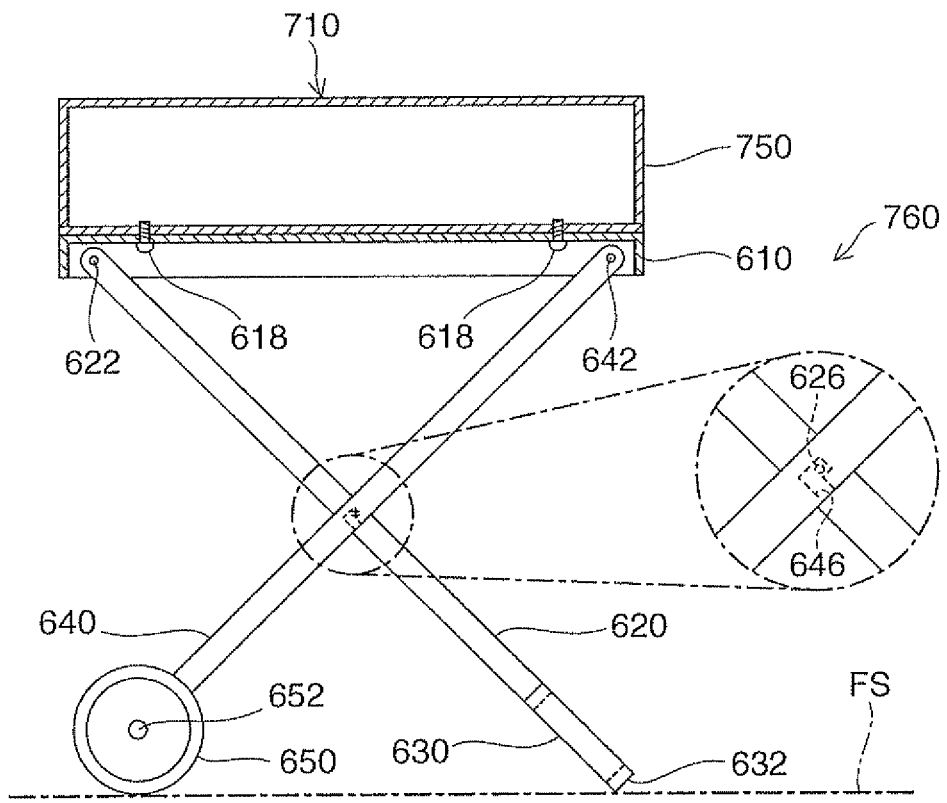
FIG. 24 is a diagram for mainly explaining the detailed configuration of the stand in a setting form viewed from a direction opposed to a screen.
Figure 25:
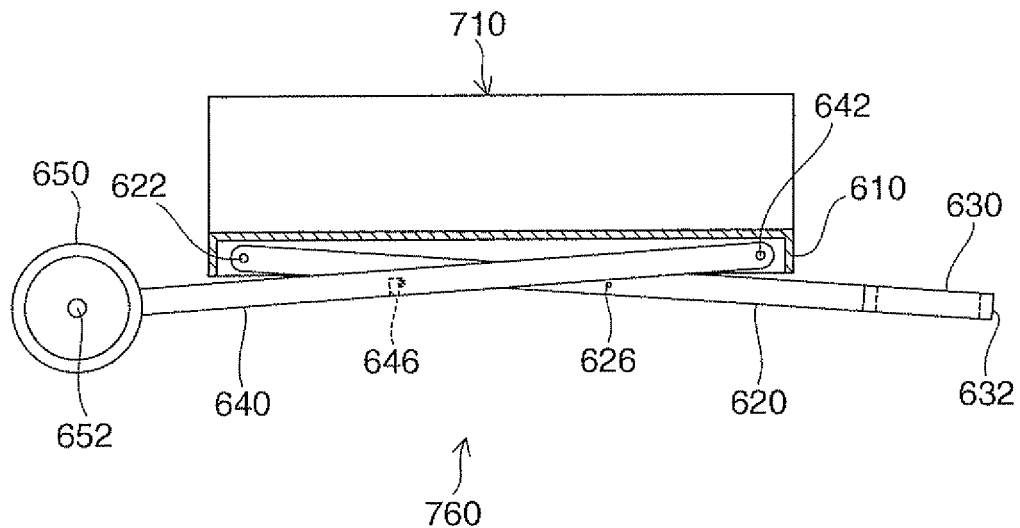
FIG. 25 is a diagram for mainly explaining the detailed configuration of the stand transformed into a carrying form from the state shown in FIG. 24.
Figure 26:
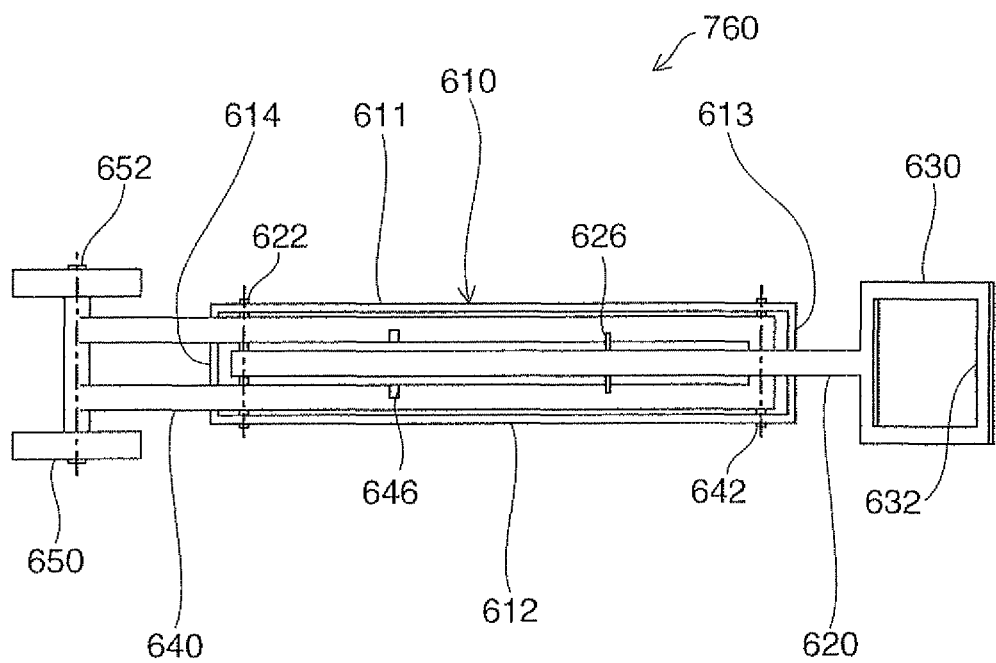
FIG. 26 is a diagram for explaining the detailed configuration of the stand in the carrying form shown in FIG. 25 viewed from a floor surface.

FIG. 24 is a diagram for explaining the detailed configuration of the stand 760 in the setting form viewed from a direction opposed to the screen 780. FIG. 25 is a diagram for mainly explaining the detailed configuration of the stand 760 transformed from the state shown in FIG. 24 into the carrying form. FIG. 26 is a diagram for explaining the detailed configuration of the stand 760 in the carrying form shown in FIG. 25 viewed from a floor surface FS.

As shown in FIG. 24, the pedestal 610 of the stand 760 is fixed to the main body housing 750 of the projector 710 by screws 618. The pedestal 610 has a shape matching the main body housing 750 of the projector 710. In this example, as shown in FIG. 26, the pedestal 610 has a substantially rectangular shape including long side surfaces 611 and 612 and short side surfaces 613 and 614. The first support leg 620 is rotatably connected to the short side surface 614 side in the pedestal 610 via a connecting shaft 622 substantially parallel to the short side surfaces 613 and 614. The second support leg 640 is rotatably connected to the short side surface 613 side opposed to the short side surface 614 via a connecting shaft 642 substantially parallel to the short side surfaces 613 and 614.

As shown in FIG. 24, the first support leg 620 and the second support leg 640 of the stand 760 rise from the floor surface FS and support the pedestal 610 in cooperation with each other. The first support leg 620 is a columnar member, at one end of which the handle 630 is formed. The end on the opposite side of the handle 630 is rotatably connected to the pedestal 610 via the connecting shaft 622. The first support leg 620 is foldable to the connecting shaft 642, which is a second connecting unit, generally along the long side surfaces 611 and 612 in a longitudinal direction of the pedestal 610.

The second support leg 640 is a structure formed by connecting two columnar members at ends thereof. The wheels 650 are formed at one end of the second support leg 640. The end on the opposite side of the wheels 650 is rotatably connected to the pedestal 610 via the connecting shaft 642. The second support leg 640 is foldable to the connecting shaft 622, which is a first connecting unit, generally along the long side surfaces 611 and 612 in the longitudinal direction of the pedestal 610.

The first support leg 620 and the second support leg 640 cross each other in both the setting form and the carrying form in a state in which the columnar member of the first support leg 620 is held between the two columnar members in the second support leg 640. In the first support leg 620, a fixing pin 626 projecting to the second support leg 640 is formed in a region where the first support leg 620 crosses the second support leg 640 in the setting form. In the second support leg 640, a fixing groove 646 that fits with the fixing pin 626 of the first support leg 620 is formed in a region where the second support leg 640 crosses the first support leg 620 in the setting form. By fitting the fixing pin 626 of the first support leg 620 and the fixing groove 646 of the second support leg 640 each other, it is possible to fix the first support leg 620 and the second support leg 640 in a position where the handle 630 and the wheels 650 are set away from the pedestal 610.

As shown in FIG. 24, the handle 630 of the stand 760 comes into contact with the floor surface FS when the pedestal 610 is supported in the setting form. As shown in FIGS. 25 and 26, the handle 630 projects from the short side surface 613 in the pedestal 610 in a state in which the first support leg 620 is folded in the carrying form. The handle 630 has a bar-like section 632 having thickness that a human can grip by hand. In this example, the handle 630 is a square frame member. However, in other embodiments, the handle 630 may be other polygonal and circular frame members or may be a T-shaped frame member. The bar-like section 632 of the handle 630 is formed substantially parallel to the short side surfaces 613 and 614 of the pedestal 610.

As shown in FIG. 24, the wheels 650 of the stand 760 come into contact with the floor surface FS when the pedestal 610 is supported in the setting form. As shown in FIGS. 25 and 26, the wheels 650 project from the short side surface 614 in the pedestal 610 in a state in which the second support leg 640 is folded in the carrying form. The wheels 650 have a wheel shaft 652 that rotatably connects the wheels 650 to the second support leg 640. The wheel shaft 652 of the wheels 650 is provided substantially parallel to the short side surfaces 613 and 614 of the pedestal 610 and is also substantially parallel to the bar-like section 632 of the handle 630.

A3. Detailed Configuration of the Projector

Figure 27:
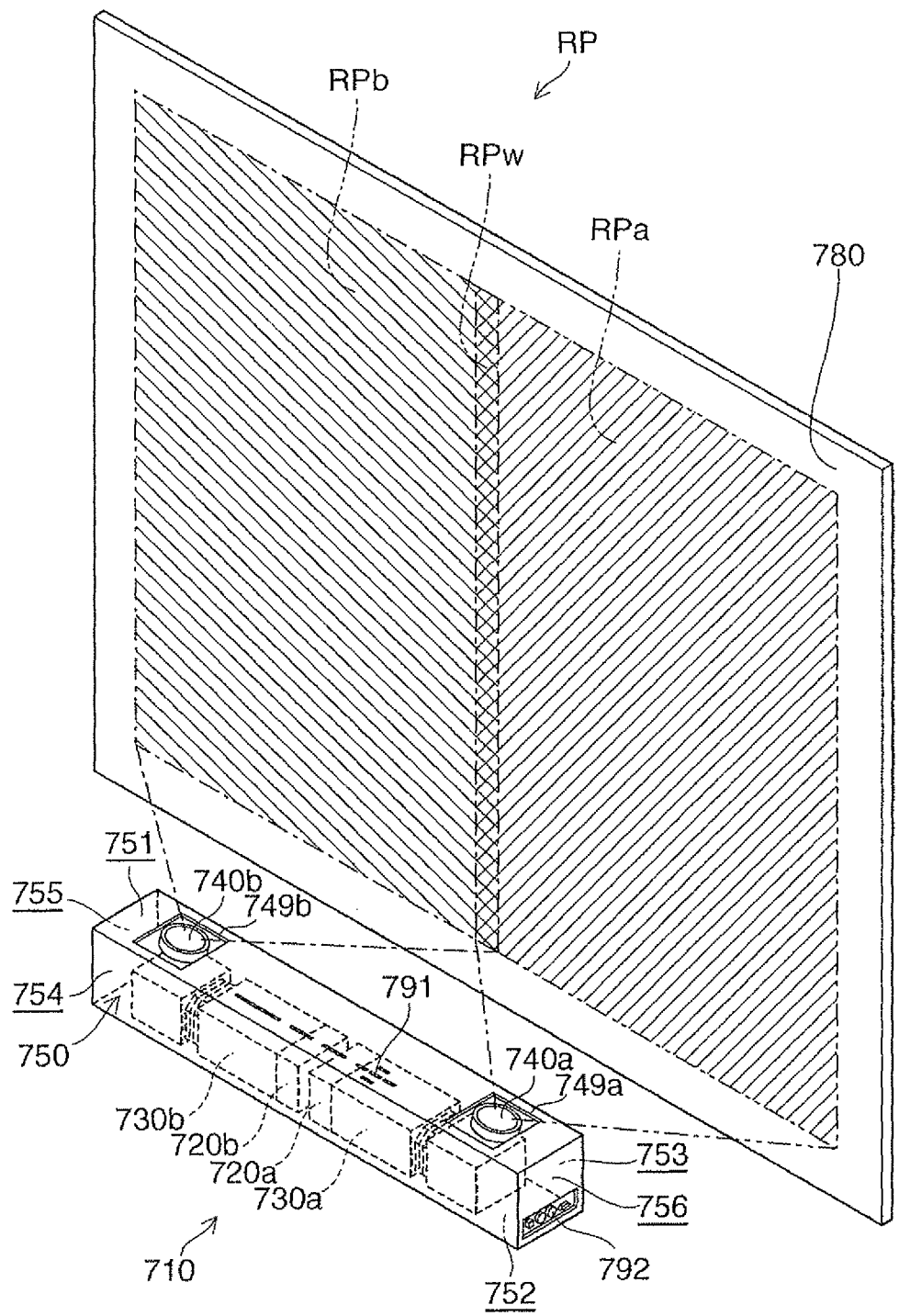
FIG. 27 is a diagram for mainly explaining the external configuration of the projector.

FIG. 27 is a diagram for mainly explaining an external configuration of the projector 710. The projector 710 includes light source units 720a and 720b that radiate light, imaging optical units 730a and 730b that generate projection lights representing the image RP, and projecting units 740a and 740b that project the projection lights representing the image RP on the screen 780.

The light source units 720a and 720b of the projector 710 include ultra-high pressure mercury lamps (UHF lamps) as light sources. In other embodiments, the light source units 720a and 720b may include light emitting diodes (LEDs) as light sources instead of the ultra-high pressure mercury lamps.

In this example, the imaging optical units 730a and 730b of the projector 710 are color separating and combining optical units. The imaging optical units 730a and 730b separate light radiated by the light source units 720a and 720b into red light, green light, and blue light, modulates the respective lights, and then combines these lights as one light again to thereby generate projection light. In this example, spatial light modulators that modulate light in the imaging optical units 730a and 730b are transmissive liquid crystal panels that modulate transmitted light. However, in other embodiments, a reflective liquid crystal panel that modulates reflective light may be used or a micro-mirror type light modulating device such as a digital micro-mirror device (DMD (registered trademark)) may be used.

The projecting units 740a and 740b of the projector 710 include projection lens units in which plural lenses such as a front lens, a zoom lens, a master lens, and a focus lens are arrayed. In other embodiments, the projecting units 740a and 740b may be optical units that reflect projection lights generated by the imaging optical units 730a and 730b to the screen 780 using at least one of an aspherical lens, a magnifying lens, a diffusion glass, an aspherical mirror, and a reflection mirror.

The image RP projected by the projector 710 is an image formed by joining the two partial images RPa and RPb. The overlapping area RPw where the two partial images RPa and RPb overlap each other is formed in the seam of the partial image RPa and the partial image RPb. The partial image RPa in the image RP is projected by using the light source unit 720a, the imaging optical unit 730a, and the projecting unit 740a. Specifically, light radiated from the light source unit 720a is projected on the screen 780 from the projecting unit 740a after being modulated into projection light representing the partial image RPa by the imaging optical unit 730a. The partial image RPb in the image RP is projected by using the light source unit 720b, the imaging optical unit 730b, and the projecting unit 740b. Specifically, light radiated from the light source unit 720b is projected on the screen 780 from the projecting unit 740b after being modulated into projection light representing the partial image RPb by the imaging optical unit 730b.

The main body housing 750 of the projector 710 houses the light source units 720a and 720b, the imaging optical units 730a and 730b, and the projecting units 740a and 740b. In this example, the main body housing 750 is a hexahedron. Outer surfaces forming the hexahedron include a top surface 751, a bottom surface 752, a front surface 753, a back surface 754, a left side 755, and a right side 756.

The top surface 751 of the main body housing 750 is an upper end located in an upper part in the main body housing 750. The bottom surface 752 of the main body housing 750 is a bottom end as a surface opposed to the top surface 751. The front surface 753 of the main body housing 750 is a front end facing the screen 780 in the main body housing 750. The back surface 754 of the main body housing 750 is a surface opposed to the front surface 753 and is a rear end with the back thereof facing the screen 780 in the main body housing 750. The left side 755 of the main body housing 750 is a side end located on the left side in front of the screen 780. The right side 756 of the main body housing 750 is a side end located on the right side in front of the screen 780.

In this example, the top surface 751, the bottom surface 752, the front surface 753, and the back surface 754 of the main body housing 750 are rectangles having long sides extending from the left side 755 to the right side 756. In this example, the projecting unit 740b, the imaging optical unit 730b, the light source unit 720b, the light source unit 720a, the imaging optical unit 730a, and the projecting unit 740a line up substantially in a straight line in this order from the left side 755 to the right side 756 of the main body housing 750.

In this example, the stand 760 is attached to the bottom surface 752 of the main body housing 750.

In the main body housing 750, openings 749a and 749b for exposing the projecting units 740a and 740b to the outside of the main body housing 750 are provided such that projection lights from the projecting units 740a and 740b reach the screen 780. In this example, the main body housing 750 houses the entire projecting units 740a and 740b. However, in other embodiments, the main body housing 750 may house the projecting units 740a and 740b with a part thereof projecting from the openings 749a and 749b. In this example, both the openings 749a and 749b are provided in the top surface 751 of the main body housing 750. The projecting units 740a and 740b are also provided on the top surface 751 as the same plane in the main body housing 750.

The projector 710 further includes a user interface 791 and an image input unit 792. The user interface 791 of the projector 710 receives instruction input from a user of the projector 710. In this example, the user interface 791 includes, in addition to plural buttons for receiving pressing input from the user, an infrared interface that receives infrared input from a remote controller. The image input unit 792 of the projector 710 is connected to an external apparatus such as a personal computer and a digital image camera and receives the input of image data representing the image RP projected on the screen 780.

A4. Effects

With the stand 760 explained above, as shown in FIG. 23, it is possible to easily carry a projector set including the stand 760 by folding the first support leg 620 and the second support leg 640 to the pedestal 610, bringing the wheels 650 provided in the second support leg 640 into contact with the ground, and gripping the handle 630 provided in the first support leg 620 to tug the projector set.

The first support leg 620 and the second support leg 640 are foldable generally along the longitudinal direction of the pedestal 610. The handle 630 projects from the short side surface 613 at one end in the longitudinal direction of the pedestal 610. The wheels 650 project from the short side surface 614 at an end on the opposite side of the short side surface 613 in the longitudinal direction of the pedestal 610. This makes it possible to secure sufficient height from the floor surface FS to the projector 710 in drawing out the first support leg 620 and the second support leg 640 from the pedestal 610 to set the projector 710. Further, this makes it possible to secure sufficient length from the wheels 650 to the handle 630 in folding the first support leg 620 and the second support leg 640 to the pedestal 610 to carry the projector 710.

The first support leg 620 is foldable to the connecting shaft 642 that connects the second support leg 640 to the pedestal 610. The second support leg 640 is foldable to the connecting shaft 622 that connects the first support leg 620 to the pedestal 610. This makes it possible to reduce a load applied to the connecting shafts 622 and 642 in folding the first support leg 620 and the second support leg 640 to the pedestal 610 to carry the projector 710.

The handle 630 has the bar-like section 632 substantially parallel to the wheel shaft 652 connected to the wheels 650. This makes it possible to bring the bar-like section 632 into contact with the floor surface FS to halt the rotation of the wheels 650 in drawing out the first support leg 620 and the second support leg 640 from the pedestal 610 to set the projector 710. Further, this makes it possible to grip the bar-like section 632 and easily tug the projector 710 in folding the first support leg 620 and the second support leg 640 to the pedestal 610 to carry the projector 710.

A5. First Modification

Figure 28:
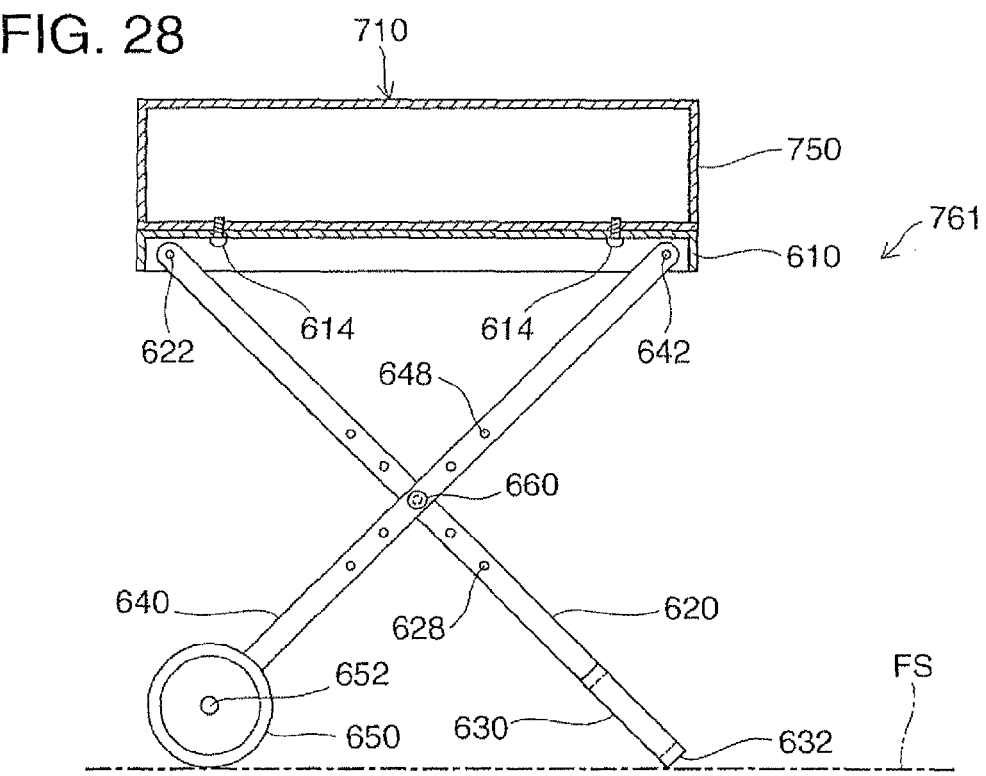
FIG. 28 is a diagram for mainly explaining the detailed configuration of a stand in the setting form in a first modification viewed from the direction opposed to the screen.

FIG. 28 is a diagram for mainly explaining the detailed configuration of a stand 761 in the setting form in a first modification viewed from the direction opposed to the screen 780. The stand 761 in the first modification is the same as the stand 760 except that a mechanism for fixing the first support leg 620 and the second support leg 640 in the setting form is different.

In the stand 761 in the first modification, plural position fixing holes 628 and 648 are respectively formed in positions corresponding to each other in the first support leg 620 and the second support leg 640. The first support leg 620 and the second support leg 640 can be fixed in multiple stages by inserting position fixing pins 660 into one position fixing hole 628 and one position fixing hole 648 corresponding to each other among the plural position fixing holes 628 and 648. Specifically, the plural position fixing holes 628 and 648 and the position fixing pins 660 configure a position fixing unit that fixes, in multiple stages, positions in which the handle 630 and the wheels 650 are set farther away from the pedestal 610 stepwise. In this example, there are five position fixing holes 628 and five position fixing holes 648, i.e., five pairs of fixing holes 628 and 648. The first support leg 620 and the second support leg 640 can be fixed in five stages. However, the number of stages for fixing the first support leg 620 and the second support leg 640 only has to be equal to or larger than two and is not limited to five.

With the stand 761 in the first modification explained above, since the positions where the handle 630 and the wheels 650 are set farther away from the pedestal 610 stepwise can be fixed in multiple stages, it is possible to adjust, in multiple stages, the height at which the projector 710 is set.

A6. Second Modification

Figure 29:
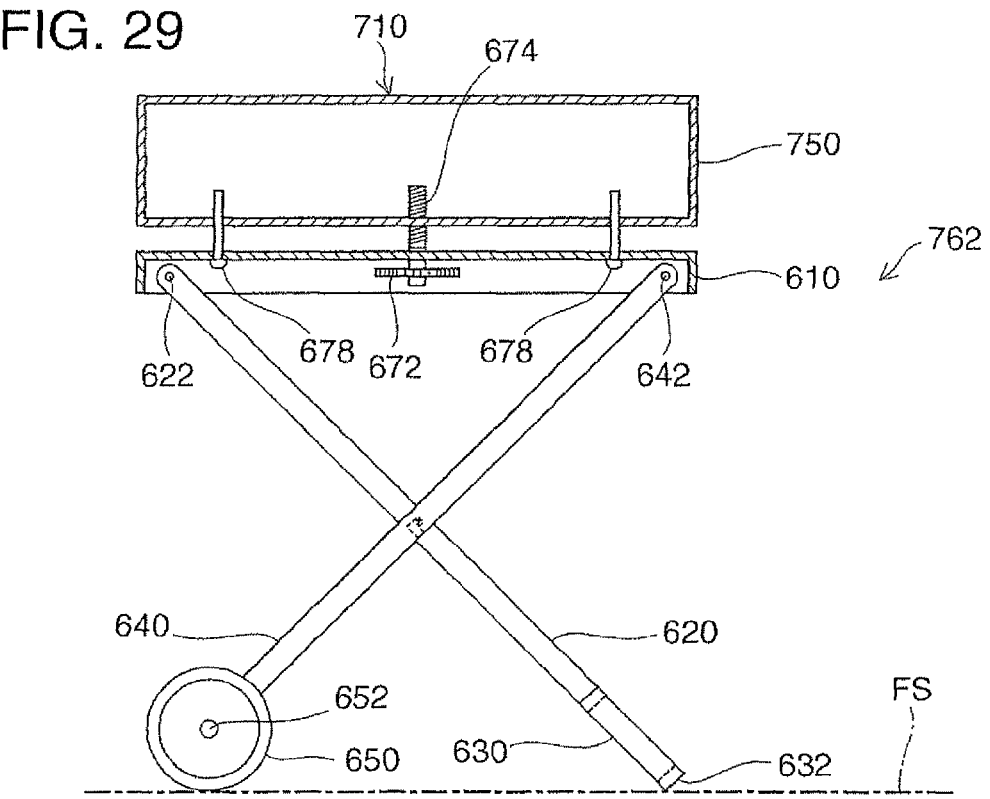
FIG. 29 is a diagram for mainly explaining the detailed configuration of a stand in the setting form in a second modification viewed from the direction opposed to the screen.

FIG. 29 is a diagram for mainly explaining the detailed configuration of a stand 762 in the setting form in a second modification viewed from the direction opposed to the screen 780. The stand 762 in the second modification is the same as the stand 760 except that a mechanism for attaching the projector 710 to the pedestal 610 is different.

The stand 762 in the second modification includes a rotary dial 672, an elevating screw 674, and an elevation guide 678. The rotary dial 672 of the stand 762 is connected to the elevating screw 674. The elevating screw 674 of the stand 762 is rotatably provided in the pedestal 610. The main body housing 750 of the projector 710 is attached to a screw section of the elevating screw 674. The elevation guide 678 of the stand 762 prevents positional deviation of the main body housing 750 of the projector 710 and the pedestal 610. When the rotary dial 672 is rotated, the elevating screw 674 rotates and the main body housing 750 of the projector 710 moves up and down relatively to the pedestal 610. In other words, the rotary dial 672, the elevating screw 674, and the elevation guide 678 configure a height adjusting unit that adjusts height at which the projector 710 is installed on the pedestal 610.

With the stand 762 in the second modification explained above, it is possible to adjust height at which the projector 710 is set while keeping the first support leg 620 and the second support leg 640 fixed.

B. Other Embodiments

The embodiment of the invention is explained above. However, the invention is not limited to such an embodiment. It goes without saying that the invention can be carried out in various forms without departing from the spirit of the invention.

Figure 30:
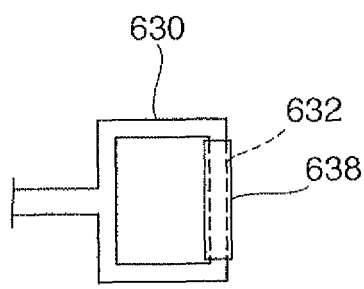
FIG. 30 is a diagram for explaining a handle in another embodiment.

For example, the handle 630 of the stand 760 may come into contact with the ground via a non-slip member having a coefficient of friction higher than that of the first support leg 620. FIG. 30 is a diagram for explaining the handle 630 in another embodiment. The bar-like section 632 of the handle 630 shown in FIG. 30 is covered with a non-slip member 638. The pedestal 610, the first support leg 620, and the second support leg 640 in the stand 760 are made of metal. The non-slip member 638 is formed of a material having a coefficient of friction higher than that of a metal surface. In this example, the non-slip member 638 is formed of elastomer resin such as rubber or thermoplastic elastomer. With the handle 630 shown in FIG. 30, it is possible to prevent the stand 760 from shifting from the floor surface FS.

The stand 760 may include a stopper that halts the rotation of the wheels 650. This makes it possible to easily perform work for transforming the stand 760 between the setting form and the carrying form and prevent the stand 760 from shifting from the floor surface FS in the setting form. The wheel shaft 652 of the wheels 650 may be provided to cross the bar-like section 632 of the handle 630 rather than being provided substantially in parallel to the bar-like section 632 of the handle 630.

The fixing of the first support leg 620 and the second support leg 640 is not limited to the mechanism for fitting pins in grooves or holes. Other well-known mechanisms employing a spring and an engaging member may be used. The wheels 650 may be provided in the first support leg 620 and the handle 630 may be provided in the second support leg 640. The projector 710 attached to the stand 760 is not limited to the projector including the two projecting units. The projector 710 may be a projector including one projecting unit or may be a projector including three or more projecting units.

Fifth Embodiment

A. Example E1

Figure 31:
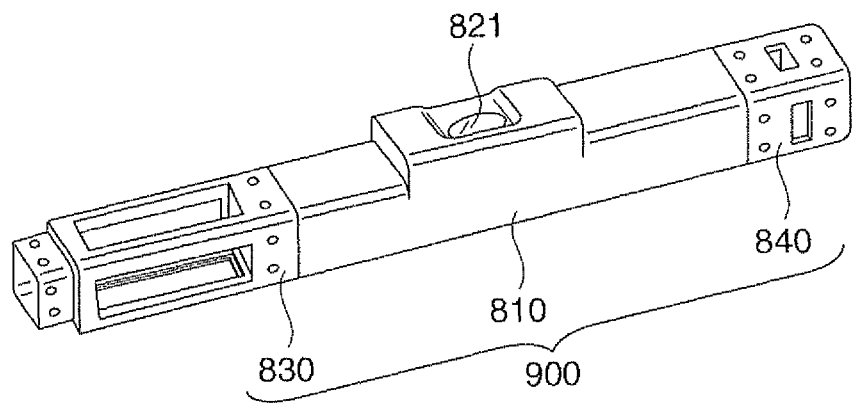
FIG. 31 is a schematic diagram for explaining the configuration of a projector in an example E1 of a fifth embodiment.

FIG. 31 is a schematic diagram for explaining the configuration of a projector 900. The projector 900 includes a projector main body 810, a first connecting unit 830, and a second connecting unit 840 and assumes a substantially square columnar shape as a whole.

The projector main body 810 includes an image processing unit (not shown in the figure), an illumination optical unit (not shown in the figure), a liquid crystal panel (not shown in the figure), a projection optical unit 821, and the like and a housing (explained later) that houses the foregoing therein. The projector main body 810 generates, on the basis of image data input from a personal computer, an optical disk player, or the like, image light representing an image indicated by the image data. The projector main body 810 projects the image lights on a projection surface and displays the image on the projection surface.

When plural projectors 900 are connected, the first connecting unit 830 and the second connecting unit 840 fix a distance and a tilt (i.e., a positional relation) between the projectors 900 adjacent to each other. As explained later, the first connecting unit 830 and the second connecting unit 840 are detachably attachable to the projector main body 810.

Figure 32:
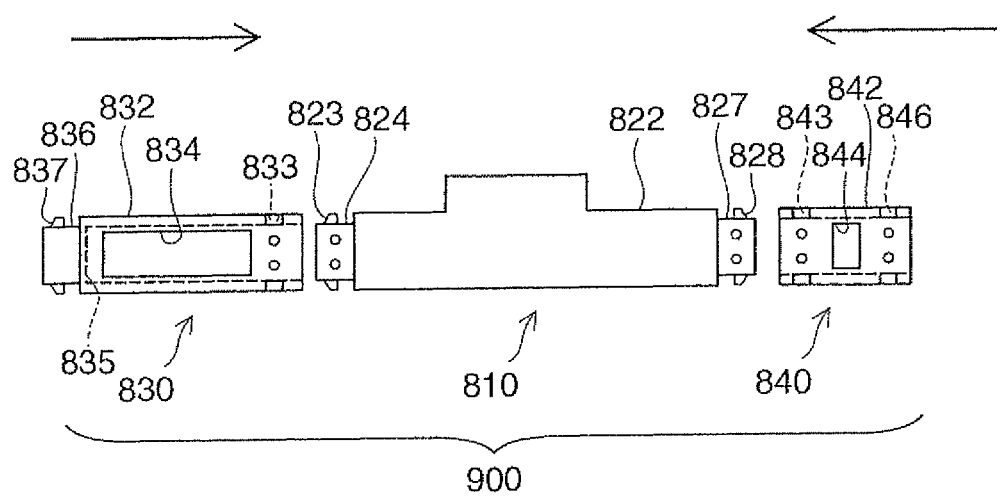
FIG. 32 is a schematic diagram of a state in which first and second connecting units are removed from a projector main body.

FIG. 32 is a schematic diagram of a state in which the first connecting unit 830 and the second connecting unit 840 are removed from the projector main body 810. A housing 822 included in the projector main body 810 includes a fitting section 823 and a fitting section 827 at both the ends thereof.

An external shape of the housing 822 is a substantial rectangular parallelepiped shape. The fitting section 823 fits with the first connecting unit 830. The fitting section 823 has projections 824 for maintaining a state of fitting with the first connecting unit 830. The projections 824 are configured to recess when pressed and return to the original state (project) when pressing force stops being applied. Therefore, when the fitting section 823 is inserted in the first connecting unit 830, the projections 824 fit in through holes for fixing 833 (explained later) of the first connecting unit 830. The first connecting unit 830 is attached to the projector main body 810 and fixed.

On the other hand, the fitting section 827 fits with the second connecting unit 840. Like the fitting section 823, the fitting section 827 has projections 828 for maintaining a state of fitting with the second connecting unit 840. Therefore, when the fitting section 827 is inserted in the second connecting unit 840, the projections 828 fit in through holes for fixing 843 (explained later) of the second connecting unit 840. The second connecting unit 840 is attached to the projector main body 810 and fixed.

The first connecting unit 830 includes a cylindrical unit 832 and a fitting section 836. The cylindrical unit 832 assumes a substantially square cylindrical shape. One end of the cylindrical unit 832 is opened and the other end thereof is sealed by a sealing unit 835. Exhaust ports 834 for discharging the air, which is discharged from the projector main body 810, to the outside of the projector 900 are provided in the cylindrical unit 832. The exhaust ports 834 are provided in all surfaces (four surfaces) of the cylindrical unit 832 that assumes the substantially square cylindrical shape. At the opened one end of the cylindrical unit 832, the through holes for fixing 833 for fixing a state of fixing of the projector main body 810 with the fitting section 823 are provided. As explained above, the projections 824 of the projector main body 810 are fit in the through holes for fixing 833.

The fitting section 836 fits with the second connecting unit 840 of another projector. The fitting section 836 has projections 837 for fixing a state of fitting with the second connecting unit 840. The projections 837 have structure same as that of the projections 824 of the projector main body 810.

The second connecting unit 840 assumes a substantially square cylindrical shape same as that of the cylindrical unit 832. Both the ends of the second connecting unit 840 are opened. Inlet ports 844 for supplying the air to the projector main body 810 are provided in the second connecting unit 840. The inlet ports 844 are provided in all surfaces (four surfaces) of the second connecting unit 840 that assumes the substantially square cylindrical shape.

Through holes for fixing 843 for maintaining a state of fitting of the projector main body 810 with the fitting section 827 are provided at one end of the second connecting unit 840. As explained above, the projections 824 of the projector main body 810 are fit in the through holes for fixing 843. On the other hand, through holes for fixing 846 for maintaining a state of fitting of the other projector with the first connecting unit 830 is provided at the other end of the second connecting unit 840.

The first connecting unit 830 and the second connecting unit 840 assume the substantially square cylindrical shape. When attached to the projector main body 810 as explained above, the first connecting unit 830 and the second connected unit 840 change to a shape formed by extending the housing 822, which assumes the substantially rectangular parallelepiped shape, in a longitudinal direction thereof. In other words, the projector 900 assumes a substantially square cylindrical shape as a whole.

In this example, each of the projections 824 and 828 are configured to recess when pressed and return to the original state (project) when pressing force stops being applied. Therefore, in attaching the first connecting unit 830 and the second connecting unit 840 to the projector main body 810, it is possible to easily attach the first connecting unit 830 and the second connecting unit 840 simply by inserting the fitting section 823 and the fitting section 827 in the first connecting unit 830 and the second connecting unit 840, respectively.

As explained above, the first connecting unit 830 includes the fitting section 836 that fit with the second connecting unit 840 of another projector and the projections 837. The second connecting unit 840 has the through holes for fixing 846 in which the projections 837 of the other projector fit. Therefore, when two projectors 900 (e.g., a first projector 900A and a second projector 900B) are connected, the fitting section 836 of the second projector 900B is inserted into the second connecting unit 840 of the first projector 900A. Then, the projections 837 of the second projector 900B fit in the through holes for fixing 846 of the second connecting unit 840 of the first projector 900A. The first connecting unit 830 of the second projector 900B and the second connecting unit 840 of the first projector 900A are connected. As a result, the first projector 900A and the second projector 900B are connected.

Figure 33:
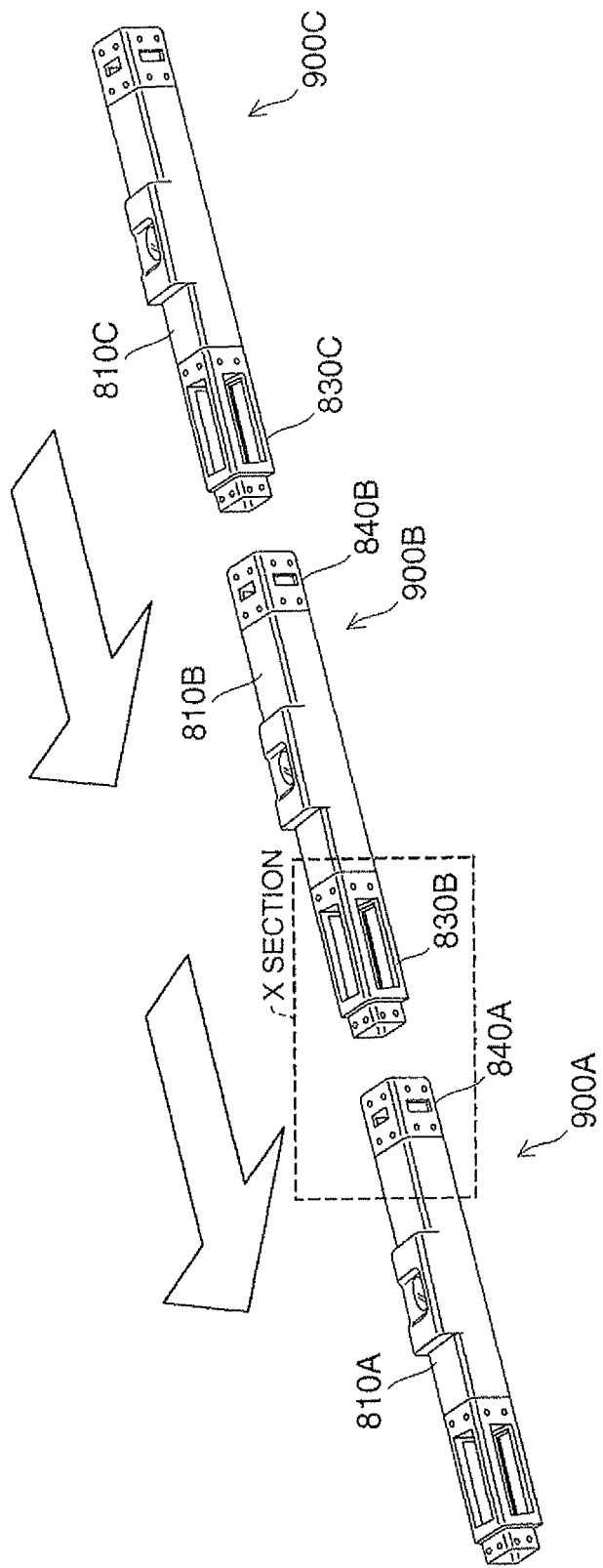
FIG. 33 is a diagram for explaining a connection process for three projectors.

FIG. 33 is a diagram for explaining a connection process for three projectors 900. In FIG. 33, the three projectors 900 are the same projectors. However, to clarify the explanation, the projector 900 shown on the left side on the paper surface is referred to as projector 900A, the projector 900 shown in the center is referred to as projector 900B, and the projector 900 shown on the right side is referred to as projector 900C. Similarly, projector main bodies 810, the first connecting units 830, and the second connecting units 840 included in the projectors 900 are referred to with A, B, and C affixed to the ends of the reference numerals.

As explained above, the projections 837 (FIG. 32) are configured to recess when pressed and return to the original state (project) when pressing force stops being applied. Therefore, as shown in FIG. 33, it is possible to easily connect the first projector 900A and the second projector 900B simply by inserting the fitting section 836A of the second projector 900E into the second connecting unit 840A of the first projector 900A. Similarly, it is possible to easily connect the second projector 900E and the third projector 900C simply by inserting the fitting section into the connecting section. In this way, the first projector 900A, the second projector 900B, and the third projector 900C are easily connected.

The first projector 900A, the second projector 900B, and the third projector 900C are the same projectors. The length of the first connecting units 830B and 830C and the second connecting units 840A and 840E are fixed. Therefore, a distance between the projector main body 810A and the projector main body 810E and a distance between the projector main body 810E and the projector main body 8100 are the same.

As explained above, the projectors 900A, 900B, and 900C assume the substantially square cylindrical shape and are connected. Therefore, the projectors 900A, 900B, and 900C can be stably set without causing a tilt with respect to a setting surface. As a result, fluctuation in a tilt relatively less easily occurs among the projector main bodies 810A, 810B, and 810C. In other words, the first projector 900A, the second projector 900B, and the third projector 900C are accurately connected.

Figure 34:
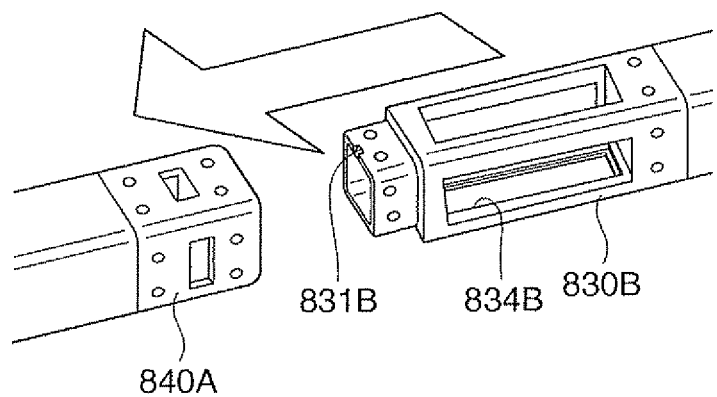
FIG. 34 is an enlarged diagram of an X section in FIG. 33.

FIG. 34 is an enlarged diagram of an X section in FIG. 33. Wiring 831B is applied to the first connecting unit 8308 of the second projector 900E in order to electrically connect the second projector 900E to the first projector 900A. Wiring (not shown in the figure) is also applied to the second connecting unit 840 of the first projector 900A in order to electrically connect the first projector 900A to the second projector 900B. Therefore, when the first projector 900A and the second projector 900B are connected via the second connecting unit 840A and the first connecting unit 830B, the first projector 900A and the second projector 900B are electrically connected.

Therefore, for example, unless the first projector 900A and the second projector 900B are connected by using a separate cable, image data, control signals, and the like can be communicated between the first projector 900A and the second projector 900B. The first projector 900A can be connected to a commercial power supply to supply power to the second projector 900E via the projector main body 810A. The same holds true for the third projector 9000. Therefore, the first projector 900A, the second projector 900B, and the third projector 900C are electrically connected as well.

Figure 35:
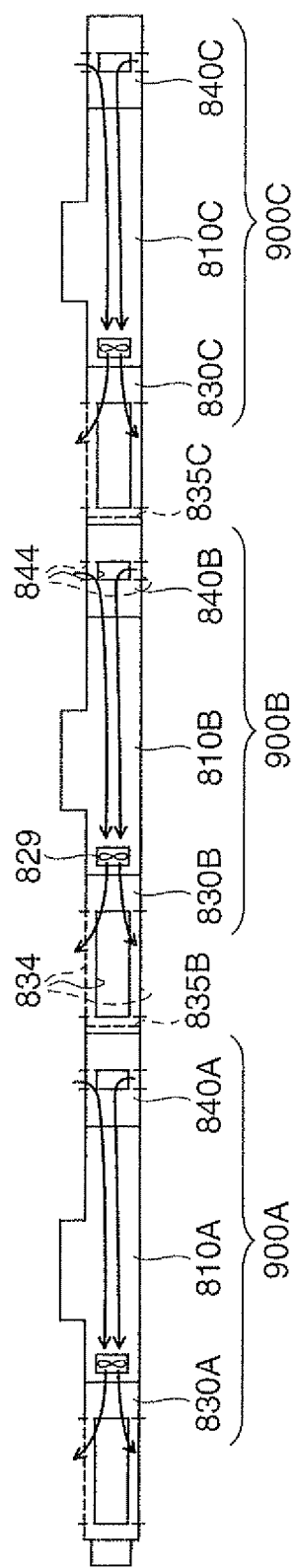
FIG. 35 is a diagram for explaining a flow of the air flowing through the three projectors when the projectors are connected and used.

FIG. 35 is a diagram for explaining a flow of the air flowing through the three projectors 900 when the projectors 900 are connected and used. When attention is paid to the second projector 900B, the projector main body 810B includes, in the inside of a housing 822, an exhaust fan 829 for drawing out the air. As explained above, the first connecting unit 830B of the second projector 900B includes a sealing unit 835B at an end on a side connected to the second connecting unit 840A of the first projector 900A. Similarly, the first connecting unit 830C of the third projector 900C includes a sealing unit 835C. Therefore, when the first projector 900A, the second projector 900B, and the third projector 900C are connected, both the ends of the second projector 900B are sealed by the sealing unit 835B of the first connecting unit 830B and the sealing unit 835C of the first connecting unit 830C included in the third projector 900C.

Therefore, as indicated by an arrow in FIG. 35, the air is led into the projector main body 810 via the inlet ports 844 of the second connecting unit 840B during operation of the exhaust fan 829. The air led into the projector main body 810E passes through the projector main body 810B while depriving the heat of heat generating components in the projector main body 810B. The air is discharged to the outside of the second projector 900E via the exhaust ports 834 of the first connecting unit 830B.

The second projector 900E and the first projector 900A are separated by the sealing unit 835B. Therefore, it is less likely that the air warmed in the projector main body 810B is led into the projector main body 810A through the first connecting unit 830E and the second connecting unit 840A of the first projector 900A. As a result, it is possible to reduce the likelihood that the first projector 900A is heated by the exhaust of the second projector 900B and the components in the projector main body 810E fail because of overheating.

Figure 36:
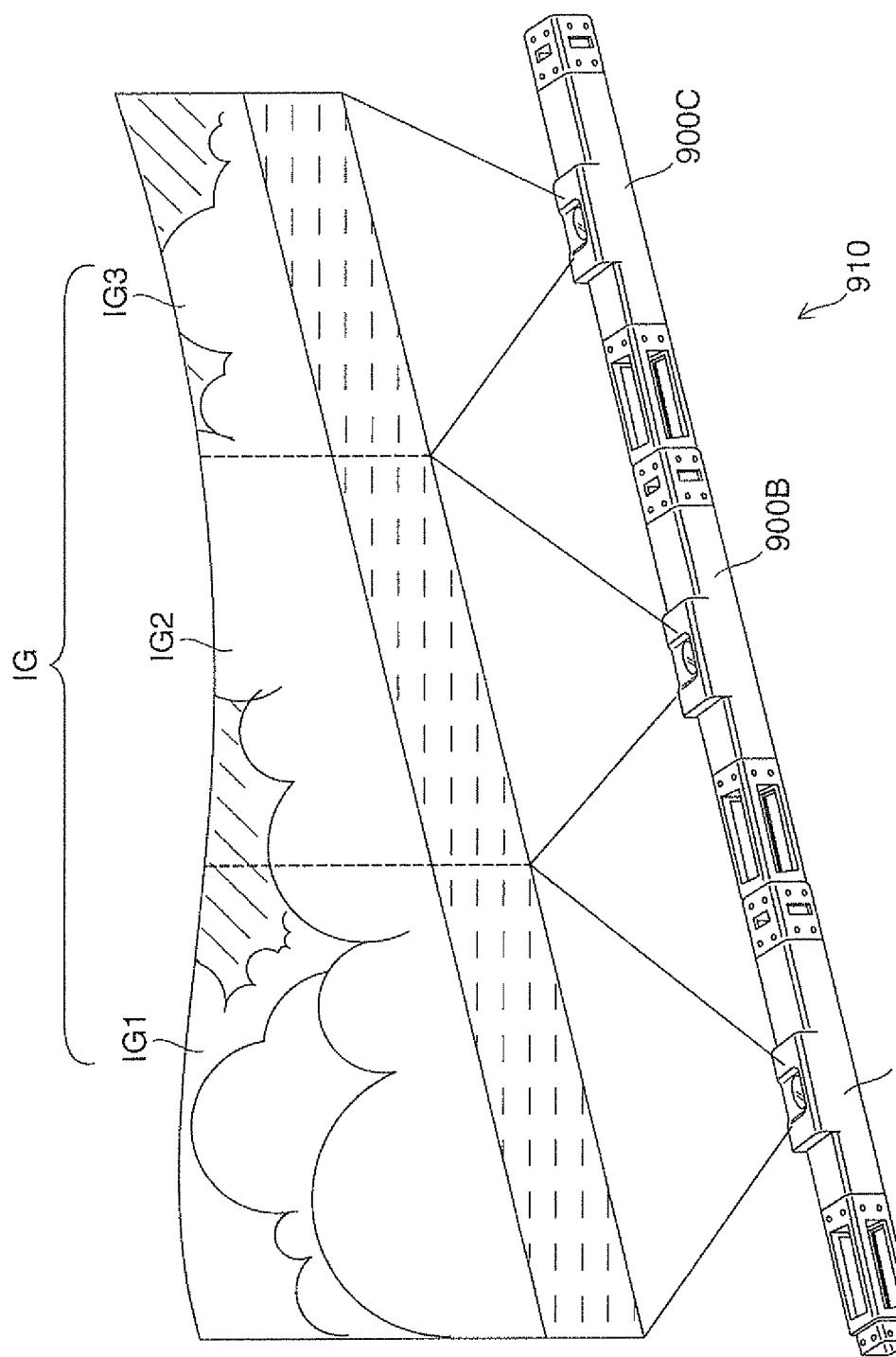
FIG. 36 is a diagram of an example in which the three first projectors are connected and used.

FIG. 36 is a diagram of an example in which the three projectors 900 are connected and used. The first projector 900A, the second projector 900B, and the third projector 900C are linearly connected as shown in FIG. 33 to configure a projector system 910. As shown in FIG. 36, on a huge horizontally-long screen SC, the first projector 900A displays a first image IG1, the second projector 900B displays a second image IG2, and the third projector 900C displays a third image IG3. As a result, a horizontally-long image IG is displayed on the screen SC.

Image data representing an image to be displayed on the screen SC is supplied, for example, from a not-shown personal computer to the first projector 900A. The first projector 900A recognizes that the three projectors 900 are connected, generates divided data obtained by dividing the image represented by the input image data, and transfers the divided data to the second projector 900B and the third projector 900C.

For example, when a large-area image is displayed over the entire wall surface of an event hall by using plural projectors, in the past, a dedicated shelf is prepared and the plural projectors are placed on the shelf. Since the dedicated shelf is huge, it is very hard to set the shelf. When the projectors are placed on the dedicated shelf, the projectors have to be accurately arranged with distances, tilts, and the like among the projectors fixed. Therefore, work is complicated and consumes labor and time.

On the other hand, the projector 900 in this example includes the first connecting unit 830 and the second connecting unit 840. Therefore, if the plural projectors 900 are prepared, it is possible to easily connect the plural projectors 900 unless a shelf and instruments are used besides the projectors 900.

Since distances between the first connecting units 830 and the second connecting units 840 are fixed, distances among the projection optical units 821, from which image lights projected on the screen SC are emitted, are fixed. Therefore, it is possible to display an accurate large-area image using the plural projectors 900.

For example, when a large-area image is displayed by using a FPD (Flat Panel Display) such as a liquid crystal display, plural FPDs are arranged to display the image. Therefore, a viewer may feel that seams among the FPDs are disturbing. On the other hand, if the plural projectors 900 in this example are connected to display a large-area image, as a projection surface such as a screen or a wall surface, a large projection surface without a seam can be used.

B. Example E2

Figure 37:
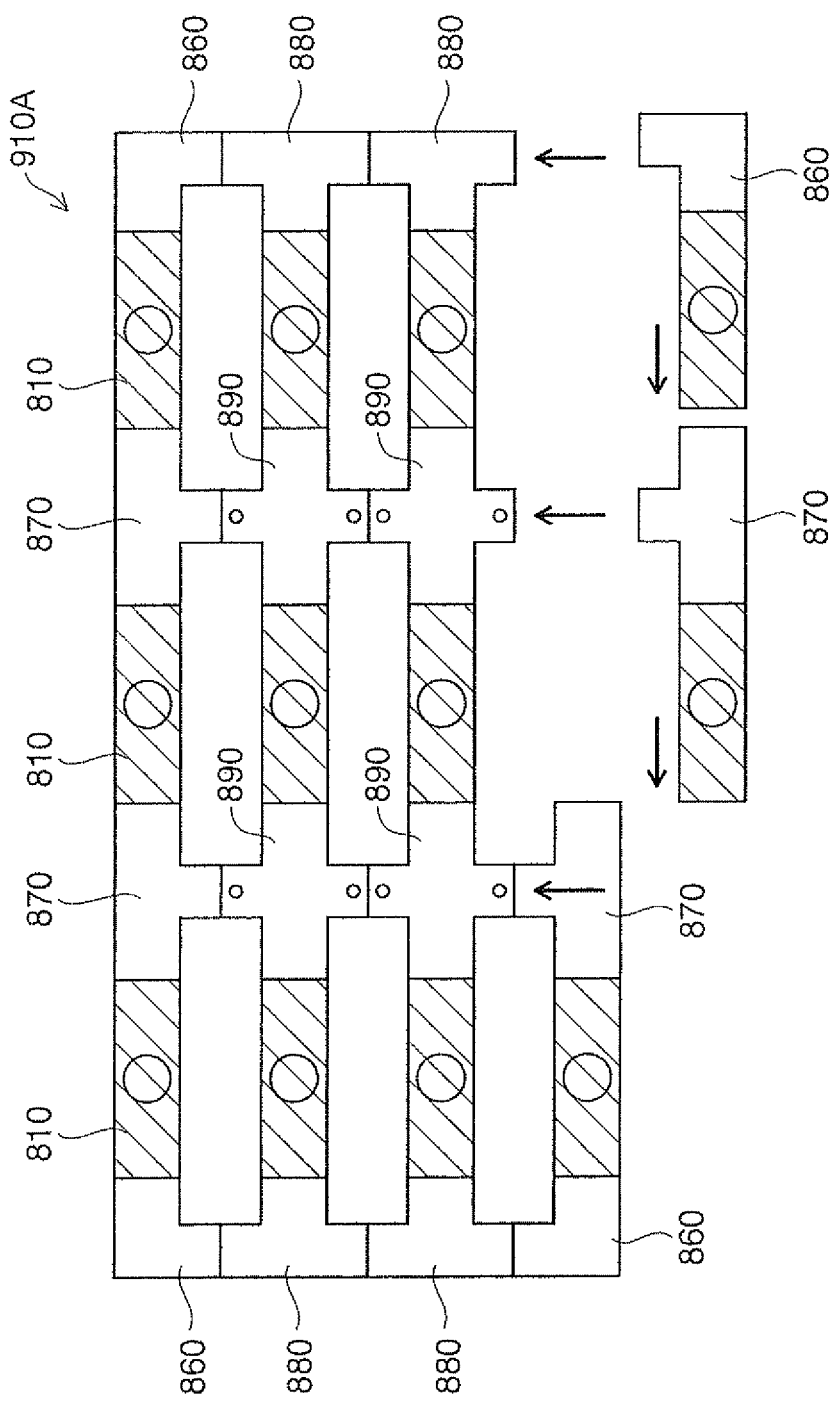
FIG. 37 is a schematic diagram for explaining the configuration of a projector system in an example E2.

FIG. 37 is a schematic diagram for explaining the configuration of a projector system 910A. The projector system 910A includes plural projector main bodies 810 and plural connecting units 860, 870, 880, and 890. In the figure, the projector main bodies 810 are hatched. In the projector system 910A in this example, three projector main bodies are connected horizontally and four projector main bodies are connected vertically via the connecting units 860 to 890, i.e., twelve projector main bodies 810 are connected in total to form a lattice shape as a whole.

The projector main bodies 810 are the same as that in the example E1. All the connecting units 860, 870, 880, and 890 are connecting units for connecting the projector main bodies 810, although shapes thereof are different. Like the connecting units 830 and 840 in the example E1, fitting sections (including projections) and through holes for fixing for connection with the projector main bodies 810 and other connecting units are provided at leading ends of the connecting units 860, 870, 880, and 890.

As shown in FIG. 37, a projector system including the plural projector main bodies 810 and assuming a lattice shape as a whole can be constructed by using the connecting units 860 to 890 having the different shapes.

In this way, in the projector system 910A the projector main bodies 810 are connected via the connecting units 860 and the like. Therefore, for example, distances among the projector main bodies 810 can be changed by changing connecting units. For example, the distances among the projector main bodies 810 can be adjusted by using connecting units corresponding to the size of a display image and a projection distance. Therefore, a user can cope with various situations by preparing plural kinds of connecting units and changing the distances among the projector main bodies 810 without preparing projectors having different projection abilities according to setting places, purposes of use, and the like.

C. Modifications

The invention is not limited to the examples explained above and can be carried out in various forms without departing from the spirit of the invention.

(1) In the example E1 explained above, the first connecting unit 830 and the second connecting unit 840 are detachably attachable to the projector main body 810. However, the first connecting unit 830 and the second connecting unit 840 may be integrally formed with the projector main body 810 and configured unremovable.

Figure 38:
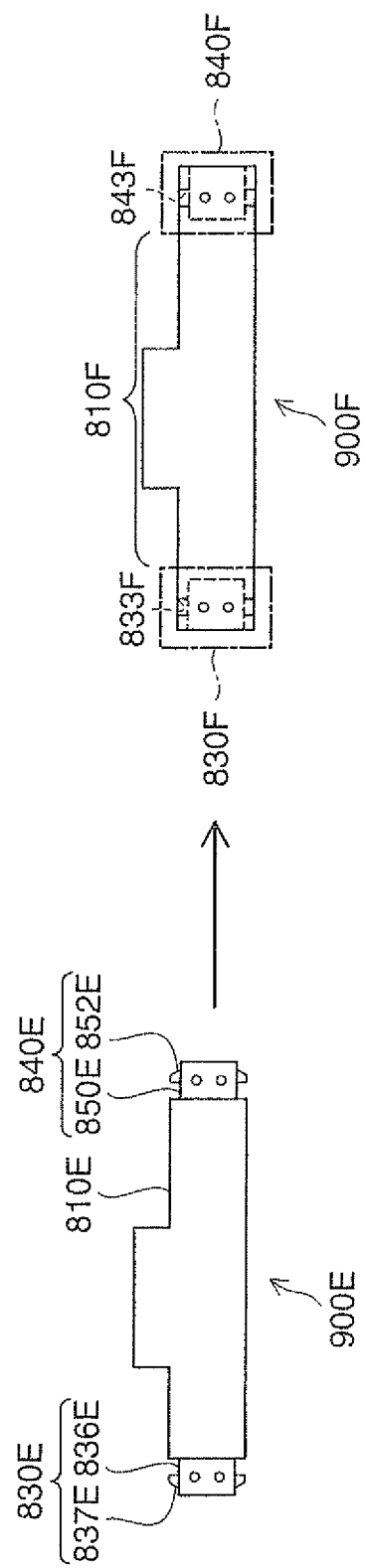
FIG. 38 is a schematic diagram of projectors in a modification.

For example, FIG. 38 is a schematic diagram of projectors in a modification. A projector 900E in the modification includes a projector main body 810E, a first connecting unit 830E, and a second connecting unit 840E. The second connecting unit 840E includes a fitting section 850E that fits in a first connecting unit 830F of a projector 900F and projections 852E for maintaining a state of fitting with the first connecting unit 830F. The projections 852E are configured to recess when pressed and return to the original state (project) when pressing force stops being applied.

The projector 900F includes a projector main body 810F, a first connecting unit 830F, and a second connecting unit 840F. Through holes for fixing 833F that fit with the projections 852E are provided in the first connecting unit 830F of the projector 900F.

Therefore, as indicated by an arrow in the figure, when the second connecting unit 840E of the projector 900E is inserted into the first connecting unit 830F of the projector 900F, the projections 852E fit in the through holes for fixing 833F of the first connecting unit 830F. The projector 900E and the projector 900F are connected and fixed.

Similarly, when the first connecting unit 830E of the projector 900E is inserted into the second connecting unit 840F of the projector 900F, projections 837E fit in through holes for fixing 843F of the second connecting unit 840F. The projector 900E and the projector 900F are connected and fixed. It is possible to easily connect plural projectors by connecting the projector 900E and the projector 900F each other in this way.

Only one of the first connecting unit 830 and the second connecting unit 840 may be detachably attachable. Effects same as those in the example E1 explained above can be obtained even when only one of the connecting units is detachably attachable.

The shape of the first connecting unit 830 and the second connecting unit 840 is not limited to that explained in the example E1. For example, the connecting units 860 explained in the example E2 may be provided on both the sides of the projector main body 810 instead of the first connecting unit 830 and the second connecting unit 840. This makes it possible to vertically arrange and connect the two projectors.

(2) The transfer method for image data is not limited to the example E1 explained above. For example, one personal computer may be connected to each of the three projectors 900 and divided image data indicating divided images obtained by dividing a displayed image into three may be supplied from the personal computer to correspond to a display position of each of the projectors 900. This also makes it possible to display a large-area image as in the example explained above.

Figure 39A:
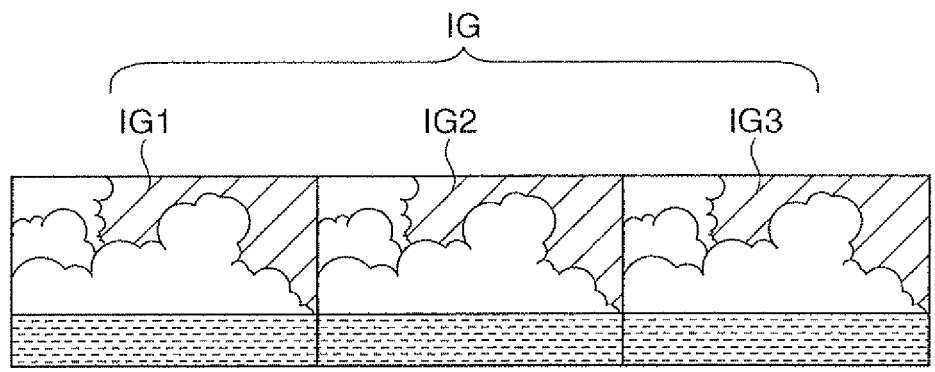
FIG. 39A is a diagram of a modification of an image displayed by the three projectors.
Figure 39B:
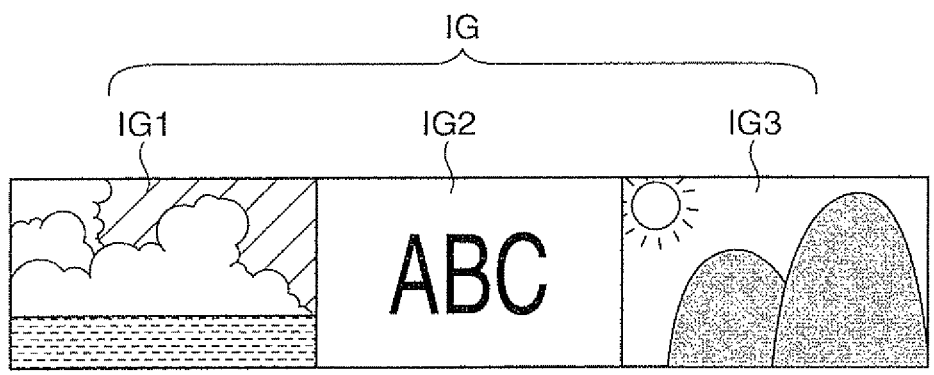
FIG. 39B is a diagram of a modification of the image displayed by the three projectors.
Figure 39C:
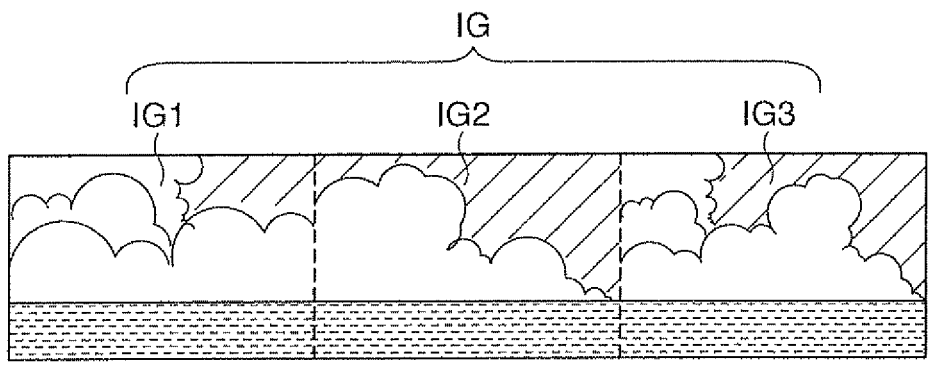
FIG. 39C is a diagram of a modification of the image displayed by the three projectors.

In the example explained above, each of the projectors 900 displays the image obtained by dividing one horizontally-long image. However, images displayed by the plural projectors 900 are not limited to those explained in the example. FIGS. 39A to 39C are diagrams of modifications of an image displayed by the three projectors in the example E1. For example, the projectors 900 may display the same image and, as a result, three same images may be displayed side by side on the screen SC (FIG. 39A). The projectors 900 may display different independent images (FIG. 39B). The first projector 900A and the second projector 900E may form one image and the third projector 900C may display an image same as the image formed by the first projector 900A and the second projector 900E (FIG. 39C).

(3) In the example E1 explained above, the first connecting unit 830 in the projector 900 includes the sealing unit 835 and the exhaust port 834. However, the projector 900 does not have to include the sealing unit 835 and the exhaust port 834. When the projector 900 does not include the sealing unit 835 and the exhaust port 834, the projector 900 inhales the air discharged from the adjacent projector 900 connected thereto. Therefore, the projector 900 may include a device that cools the discharged air, a device that cools the entire projector 900, or the like. An air inlet (e.g., a mesh port) for cooling may be provided in the housing 822 included in the main body of the projector 900.

(4) In the example E1 explained above, the wiring is applied to the first connecting unit 830 and the second connecting unit 840. When the two projectors 900 are connected to each other via the first connecting unit 830 and the second connecting unit 840, the two projectors 900 can be electrically connected as well. However, the wiring does not have to be applied to the first connecting unit 830 and the second connecting unit 840.

Figure 40A:
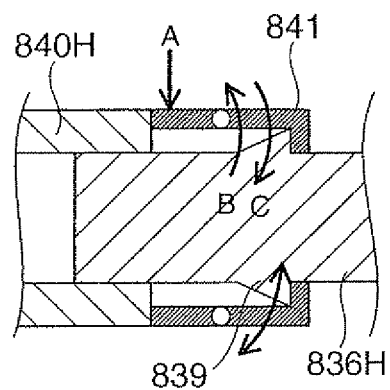
FIG. 40A is a sectional view of a modification of a second connecting unit of a first projector.
Figure 40B:
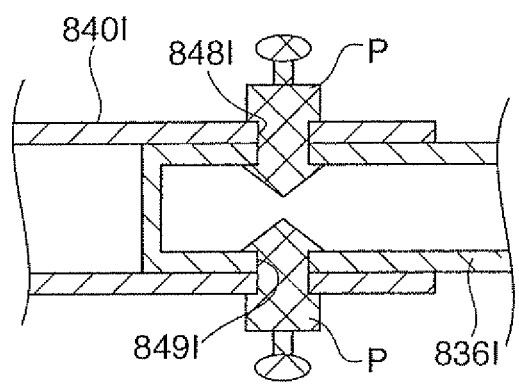
FIG. 40B is a sectional view of a modification of a first connecting unit of a second projector.

(5) The structure for connecting the first connecting unit 830, the second connecting unit 840, and the projector main body 810 is not limited to that explained in the example E1. The first connecting unit 830, the second connecting unit 840, and the projector main body 810 can be connected by various publicly-known methods. FIG. 40A is a sectional view of a modification of the second connecting unit 840A of the first projector 900A. FIG. 40B is a sectional view of a modification of the first connecting unit 830B of the second projector 900B.

As shown in FIG. 40A, a second connecting unit 840H in a modification A includes a pawl section 841. The pawl section 841 is urged to the inner side of the second connecting unit 840H by a spring (an arrow C). When the pawl section 841 is pressed as indicated by an arrow A in the figure, the pawl section 841 rotates as indicated by an arrow B in the figure. A fitting section 836H of a first connecting unit 830H in the modification A has a pawl section 839. The fitting section 836H of the first connecting unit 830H is inserted into the second connecting unit 840H while the pawl section 841 of the second connecting unit 840H is pressed (an arrow A). When the force applied to the pawl section 841 (the arrow A) is released, the pawl section 841 is urged by the spring (an arrow C), meshes with the pawl section 839 of the first connecting unit 830H, and the first connecting unit 830H and the second connecting unit 840H are connected. This also makes it possible to easily connect the first connecting unit 830H and the second connecting unit 840H simply by inserting the first connecting unit 830H into the second connecting unit 840H.

As shown in FIG. 40B, a fitting section 836I of a first connecting unit 830I and a second connecting unit 840I in a modification B respectively include through holes 848I and 849I. The fitting section 836I of the first connecting unit 830I is inserted into the second connecting unit 840I, positions of the through holes 848I and 849I are adjusted, and a connection pin P is pressed into the through holes 848I and 849I, whereby the first connecting unit 830I and the second connecting unit 840I are connected and do not come off. This also makes it possible to easily connect the first connecting unit 830I and the second connecting unit 840I.

(6) In the example explained above, the projector 900 modulates light from the illumination optical unit 825 using the transmissive liquid crystal panel 826. However, a light modulating device is not limited to the transmissive liquid crystal panel 826. For example, the projector 900 may modulate light from the illumination optical unit 825 using a digital micro-mirror device (DMD (registered trademark)), a reflective liquid crystal panel (liquid crystal on silicon (LCOS (registered trademark)), or the like.

The examples and the modifications in the first to fifth embodiments explained above may be applied to examples and modifications in other embodiments. For example, at least one of the stand in the fourth embodiment and the connecting unit in the fifth embodiment may be combined with the projectors according to the first to third embodiments.

The entire disclosure of Japanese Patent Application Nos. 2008-300435, filed Nov. 26, 2008 and 2008-309777, filed Dec. 4, 2008 and 2008-306290, filed Dec. 1, 2008 and 2008-314174, filed Dec. 10, 2008 and 2008-319164, filed Dec. 16, 2008 and 2009-203400, filed Sep. 3, 2009 are expressly incorporated by reference herein.

What is claimed is:

1. A projector that projects an image on a screen, comprising:
   plural image generating units that generate image lights representing the image;
   a main body housing that houses the plural image generating units; and
   plural projection optical units that are provided in the main body housing to respectively correspond to the plural image generating units and project the image lights generated by the plural image generating units on the screen, each of the plural image generating units is a separate unit from each of the plural projection optical units, and each of the plural image generating units and the plural projection optical units being disposed adjacent to each other, substantially in a straight line, wherein under the condition that the projector is projecting the image on the screen, the straight line is parallel to the screen.

2. The projector according to claim 1, wherein
   each of the plural image generating units generates the image light representing a partial image corresponding to a part of a display area in an image projected on the screen, and
   each of the plural projection optical units projects the image light generated by each of the plural image generating units on the display area corresponding to the partial image on the screen.

3. The projector according to claim 1, wherein
   the main body housing has plural planes that form an outer surface, and
   the plural projection optical units are provided on a same plane in the main body housing.

4. The projector according to claim 1, further comprising:
plural light source units,
the plural image generating units, the plural projection optical units and the plural light source units being disposed adjacent to each other, substantially in a straight line.

5. The projector according to claim 1, wherein an optical axis of image light projected from one of the plural projection optical units located at an end of the line of the plural projection optical units inclines in a direction opposite to a direction in which the other projection optical units adjacent to the one of the plural projection optical units are located.

6. The projector according to claim 1, further comprising:
a light source and
a light distributing unit that distributes the light from the light source to the respective plural image generating units.

7. The projector according to claim 1, wherein an extending and retracting unit that extends and retracts the main body housing in a direction in which the plural projection optical units are connected.

8. The projector according to claim 7, wherein the extending and retracting unit includes a holding unit that holds a state in which the main body housing is extended or retracted.

9. The projector according to claim 7, further comprising:
an extension and retraction detecting unit that detects an extension/retraction distance of the extended or retracted main body housing; and
an image adjusting unit that adjusts, according to the extension/retraction distance detected by the extension and retraction detecting unit, an image projected on the screen.

10. The projector according to claim 9, wherein the image adjusting unit includes an expansion and reduction adjusting unit that expands and reduces, according to the extension/retraction distance detected by the extension and retraction detecting unit, an image projected on the screen.

11. The projector according to claim 9, wherein the image adjusting unit includes an optical-axis adjusting unit that moves, according to the extension/retraction distance detected by the extension and retraction detecting unit, optical axes of image lights projected from the plural projection optical units.

12. The projector according to claim 9, wherein the image adjusting unit includes an autofocus unit that moves, according to the extension/retraction distance detected by the extension and retraction detecting unit, focuses of projection lights projected from the plural projection optical units.

13. The projector according to claim 9, wherein the image adjusting unit includes a keystone-distortion correction unit that corrects, according to the extension/retraction distance detected by the extension and retraction detecting unit, a keystone distortion of an image projected on the screen.

14. The projector according to claim 7, wherein
each of the plural image generating units generates the image light representing a partial image corresponding to a part of a display area in an image projected on the screen, and
each of the plural projection optical units projects the image light generated by the image generating unit on the display area corresponding to the partial image on the screen.

15. A projector that projects an image on a screen, comprising:
plural image generating units that generate image lights representing the image;
a main body housing that houses the plural image generating units;
plural projection optical units in the main body housing to respectively correspond to the plural image generating units, each of the plural image generating units is a separate unit from each of the plural projection optical units, and each of the plural image generating units and the plural projection optical units being disposed adjacent to each other, substantially in a straight line, wherein under the condition that the projector is projecting the image on the screen, the straight line is parallel to the screen; and
an imaging sensor that is provided between the plural projection optical units.

16. The projector according to claim 7, wherein
the extending and contracting unit includes a first section, a second section and a third section, and
the first section housing a first projection optical unit, the second section housing a second projection optical unit and the third section disposed between the first section and second section and slidably connected to each of the first section and second section.

17. A projector that projects an image on a screen, comprising:
plural image generating units that generate image lights representing the image;
a main body housing that houses the plural image generating units;
plural projection optical units that are provided in the main body housing to respectively correspond to the plural image generating units and project the image lights generated by the plural image generating units on the screen, each of the plural image generating units and the plural projection optical units being disposed adjacent to each other, substantially in a straight line; and
an extending and retracting unit that extends and retracts the main body housing in a direction in which the plural projection optical units are connected, wherein
the extending and contracting unit includes a first section, a second section and a third section, and
the first section housing a first projection optical unit, the second section housing a second projection optical unit and the third section disposed between the first section and second section and slidably connected to each of the first section and second section.

* * * * *